US010428493B2

(12) United States Patent
Omelchenko et al.

(10) Patent No.: US 10,428,493 B2
(45) Date of Patent: Oct. 1, 2019

(54) AUTOMATIC BLADE CONTROL SYSTEM FOR A MOTOR GRADER

(71) Applicant: Topcon Positioning Systems, Inc., Livermore, CA (US)

(72) Inventors: Alexander Nikolaevich Omelchenko, Moscow (RU); Alexey Vladislavovich Zhdanov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 15/523,543

(22) PCT Filed: Oct. 6, 2015

(86) PCT No.: PCT/RU2015/000645
§ 371 (c)(1),
(2) Date: May 1, 2017

(87) PCT Pub. No.: WO2017/061888
PCT Pub. Date: Apr. 13, 2017

(65) Prior Publication Data
US 2018/0016769 A1    Jan. 18, 2018

(51) Int. Cl.
*E02F 9/20*  (2006.01)
*E02F 3/76*  (2006.01)
(Continued)

(52) U.S. Cl.
CPC ............ *E02F 9/2037* (2013.01); *E02F 3/764* (2013.01); *E02F 3/7645* (2013.01);
(Continued)

(58) Field of Classification Search
CPC ........ E02F 9/2037; E02F 3/764; E02F 3/7645
See application file for complete search history.

(56) References Cited
U.S. PATENT DOCUMENTS 4,157,118 A    6/1979    Suganami et al.
5,860,480 A    1/1999    Jayaraman et al.
(Continued)

FOREIGN PATENT DOCUMENTS

WO    2012028916 A1    3/2012
WO    2012028916 A8    3/2012
(Continued)

OTHER PUBLICATIONS

International Search Report and Written Opinion dated Aug. 11, 2016 in connection with international patent application No. PCT/RU2015/000645, 6 pages.
(Continued)

*Primary Examiner* — Anne M Antonucci
*Assistant Examiner* — Renee LaRose
(74) *Attorney, Agent, or Firm* — Chiesa Shahinian & Giantomasi PC

(57) ABSTRACT

Disclosed is a method for automatically controlling a blade of a motor grader. At least one global navigation satellite system (GNSS) antenna and at least one inertial measurement unit (IMU) are mounted on the motor grader. No GNSS antenna is mounted on the blade; and no pole is used for mounting. With each GNSS antenna, GNSS navigation signals are received, and a position of each GNSS antenna is computed. With each IMU, three orthogonal accelerations and three orthogonal angular rotation rates are measured. With at least one processor, a blade position and a blade orientation are computed, based at least in part on the GNSS and IMU measurements. The blade elevation and the blade slope angle (and, in some embodiments, the blade side shift) are automatically controlled, based at least in part on the computed blade position, the computed blade orientation, and a digital job site model.

42 Claims, 36 Drawing Sheets

(51) Int. Cl.
   *G01S 19/14* (2010.01)
   *G01S 19/55* (2010.01)
   *G05D 1/02* (2006.01)

(52) U.S. Cl.
   CPC .......... *E02F 3/7659* (2013.01); *E02F 3/7677* (2013.01); *G01S 19/14* (2013.01); *G01S 19/55* (2013.01); *G05D 1/0278* (2013.01)

(56) References Cited

U.S. PATENT DOCUMENTS

| | | | |
|---|---|---|---|
| 5,951,613 | A | 9/1999 | Sahm et al. |
| 6,112,145 | A | 8/2000 | Zachman |
| 7,588,088 | B2 | 9/2009 | Zachman |
| 8,145,391 | B2 | 3/2012 | Omelchenko et al. |
| 8,352,132 | B2 | 1/2013 | Omelchenko et al. |
| 8,738,242 | B2 | 5/2014 | Konno et al. |
| 9,052,391 | B2 | 6/2015 | Friend et al. |
| 9,145,144 | B2 | 9/2015 | Friend et al. |
| 9,347,205 | B2 | 5/2016 | Kosarev et al. |
| 9,618,338 | B2 | 4/2017 | Fehr |
| 9,624,650 | B2 | 4/2017 | Stratton |
| 2004/0162668 | A1 | 8/2004 | Rawlinson et al. |
| 2013/0255977 | A1 | 10/2013 | Braunstein et al. |
| 2013/0261902 | A1 | 10/2013 | Zhdanov et al. |
| 2014/0326471 | A1 | 11/2014 | Zhu et al. |

FOREIGN PATENT DOCUMENTS

| | | |
|---|---|---|
| WO | 2012125134 A1 | 9/2012 |
| WO | 2013148148 A1 | 10/2013 |

OTHER PUBLICATIONS

Extended European Search Report dated Apr. 18, 2019 in connection with European Patent Application No. 15905912.0; 8 pgs.

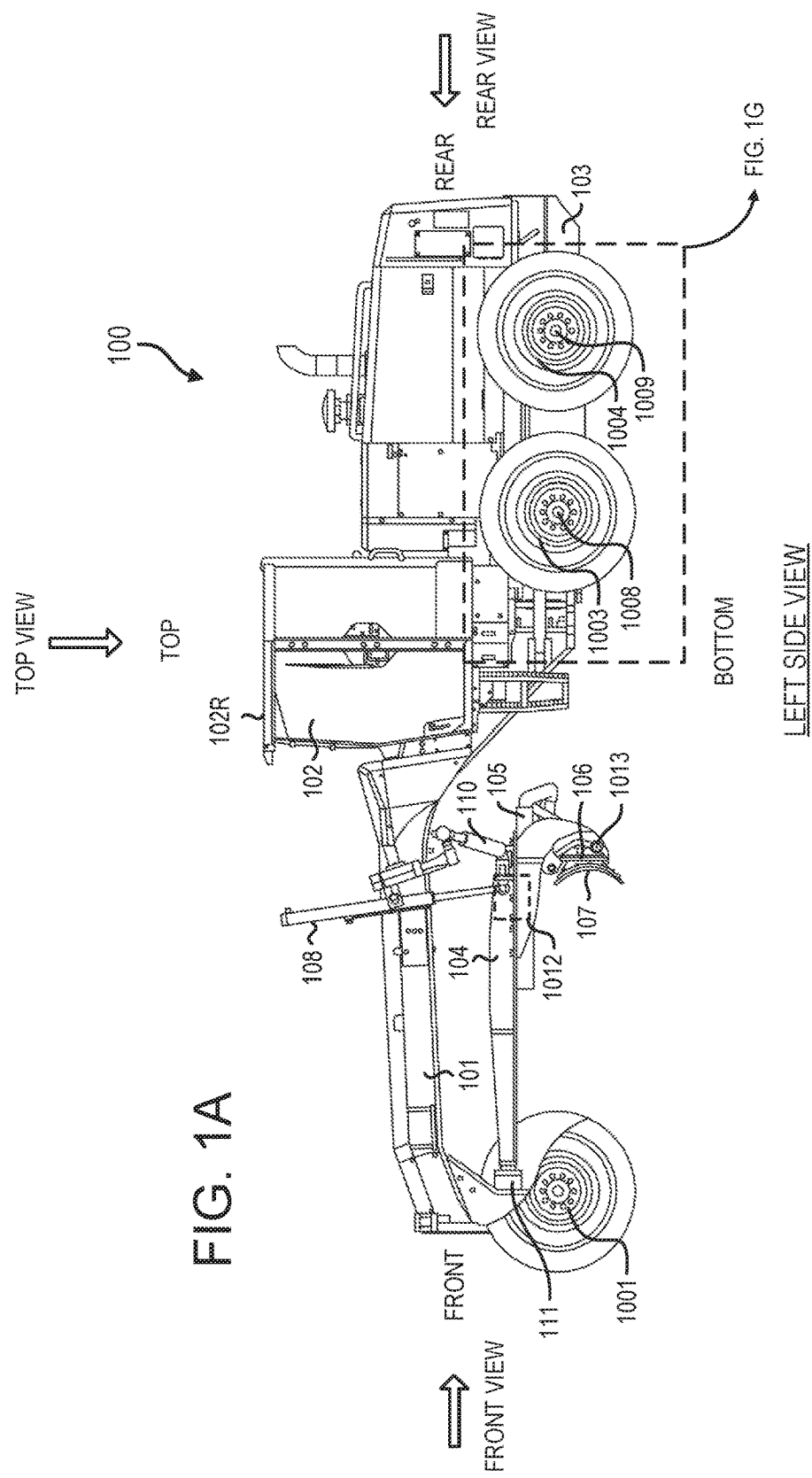

LEFT SIDE VIEW

LEFT SIDE VIEW

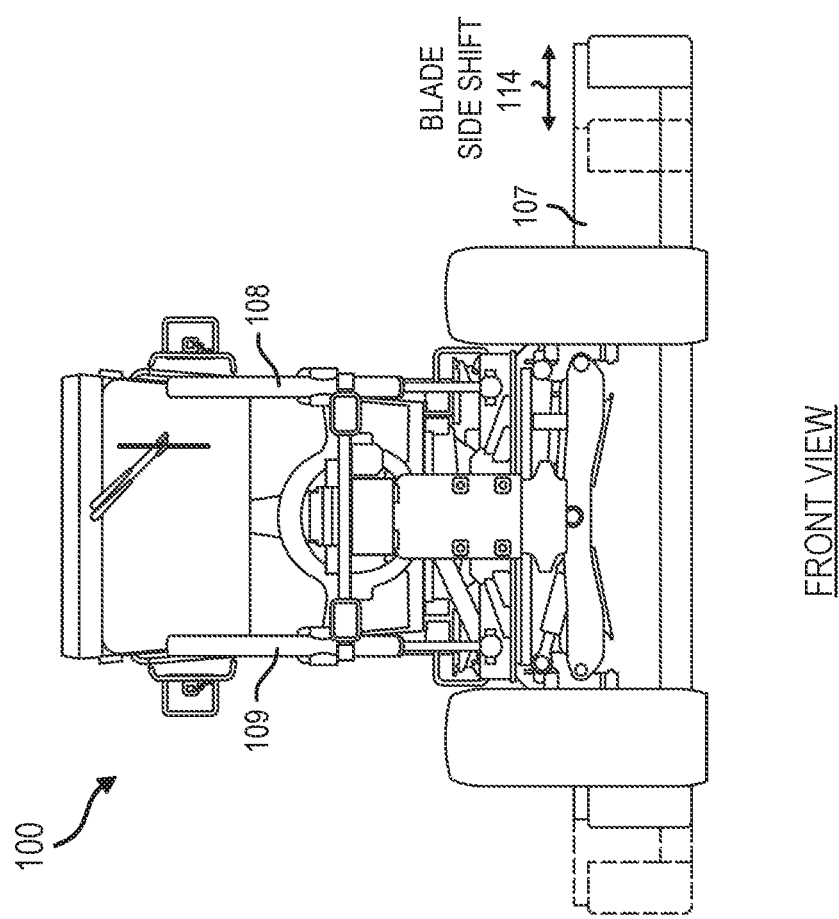

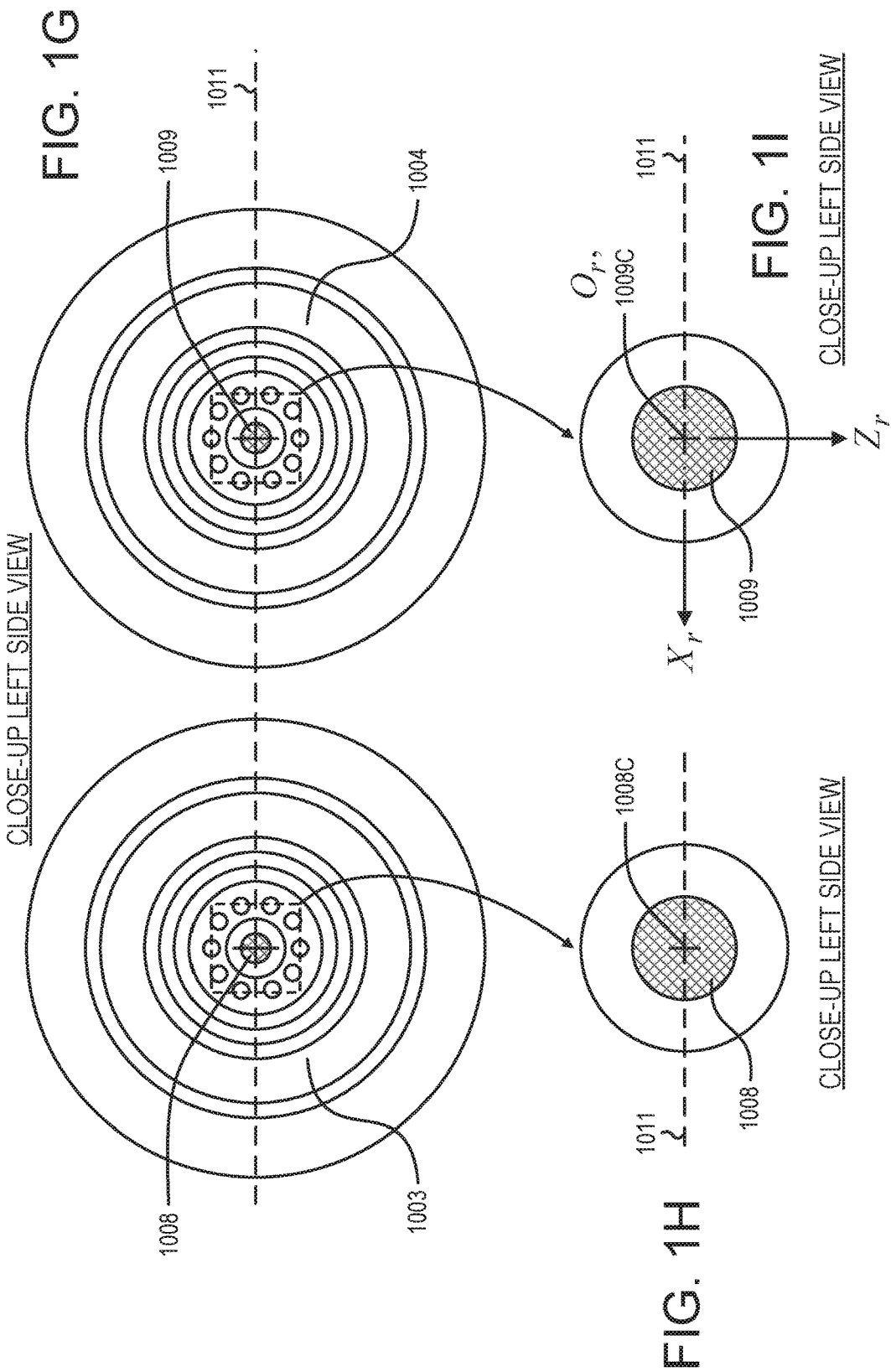

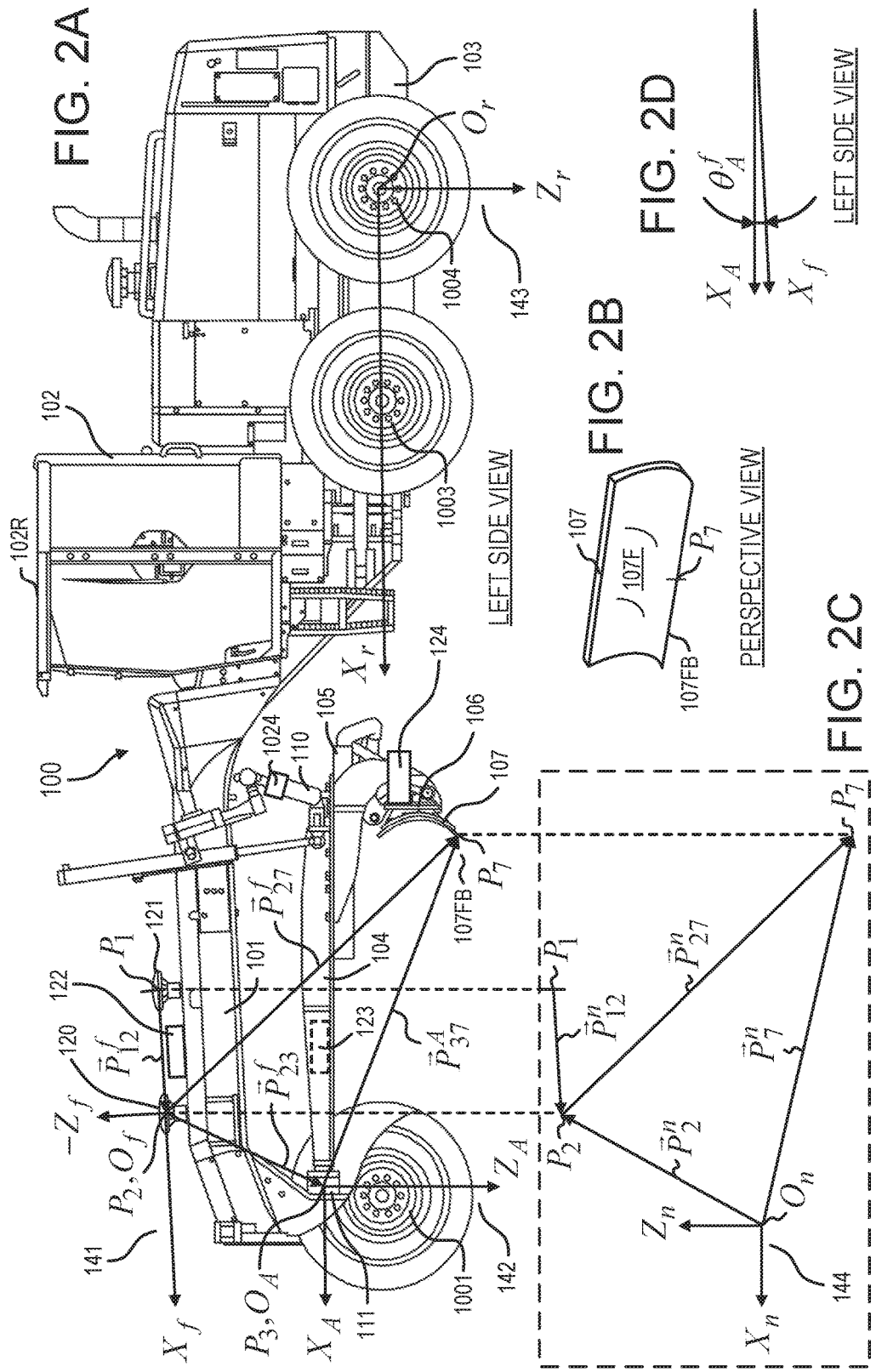

LEFT SIDE VIEW

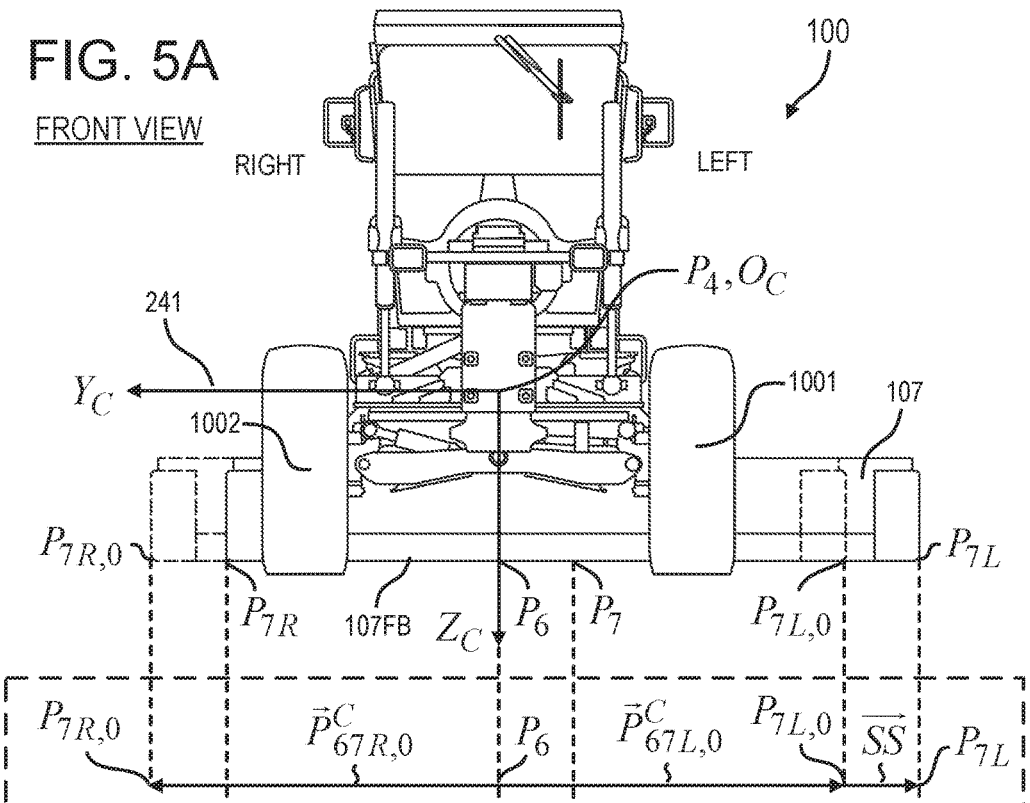
FIG. 5A FRONT VIEW
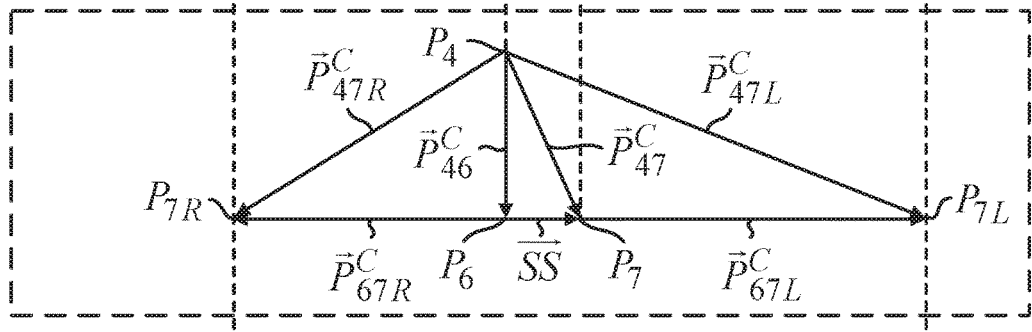
FIG. 5B
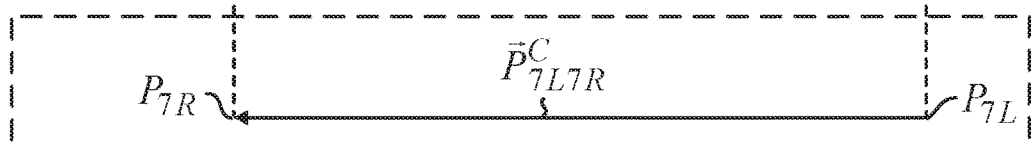
FIG. 5C
FIG. 5D

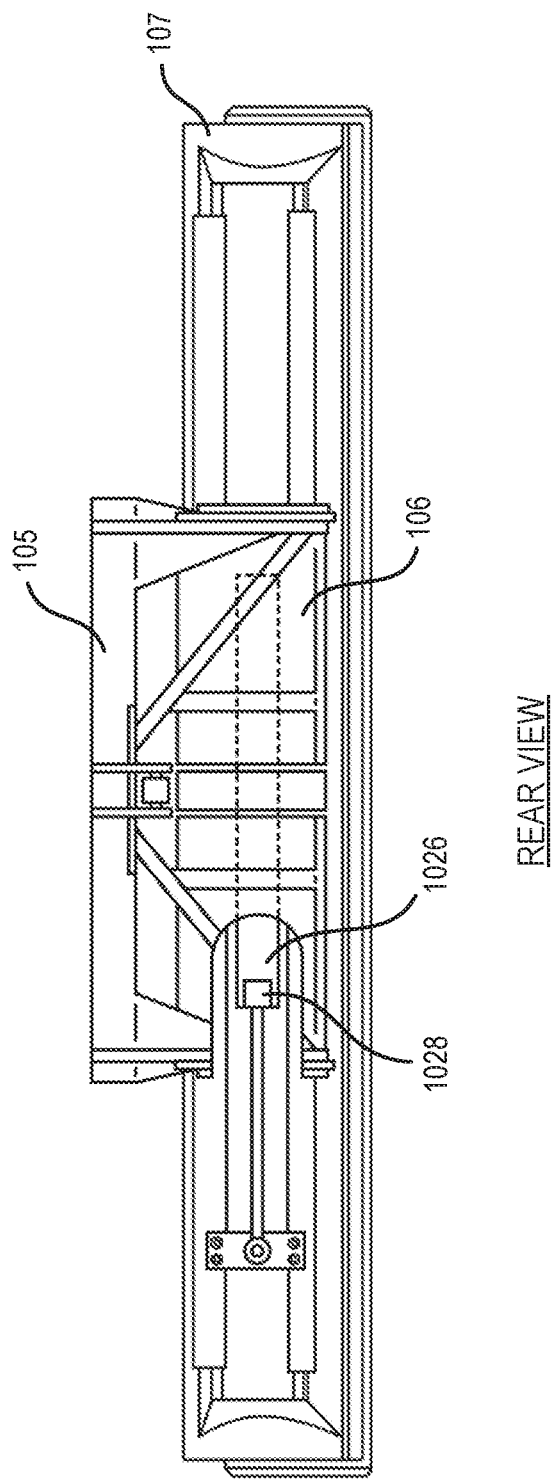

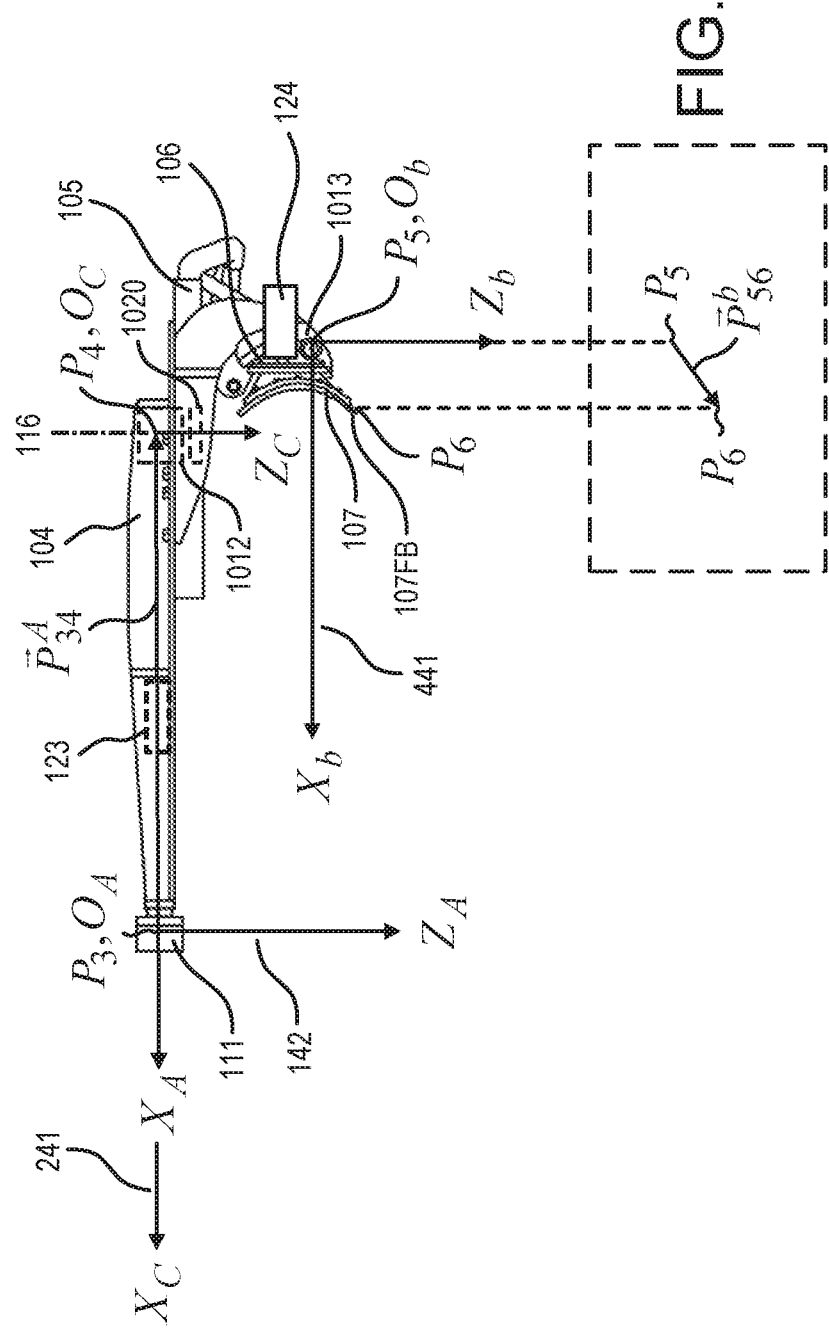

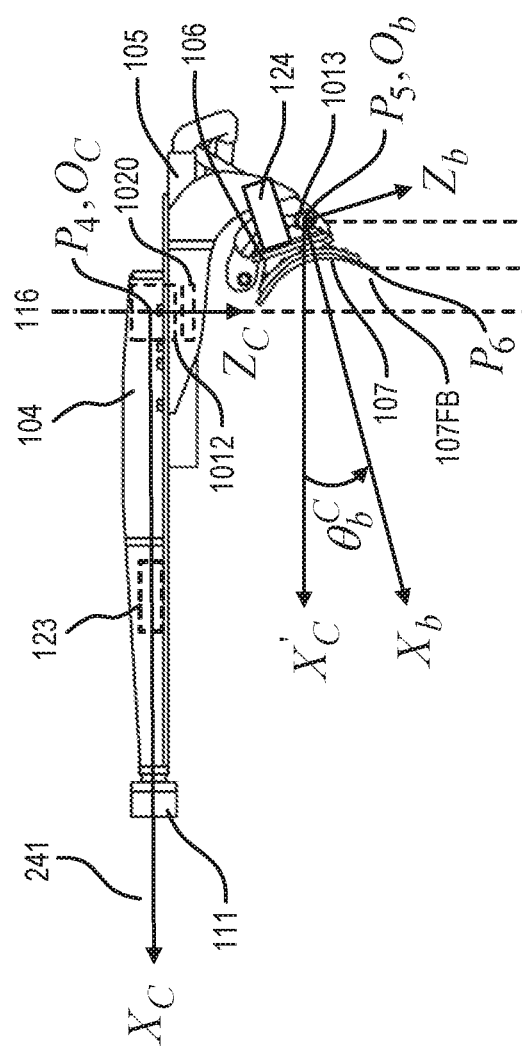

TOP VIEW

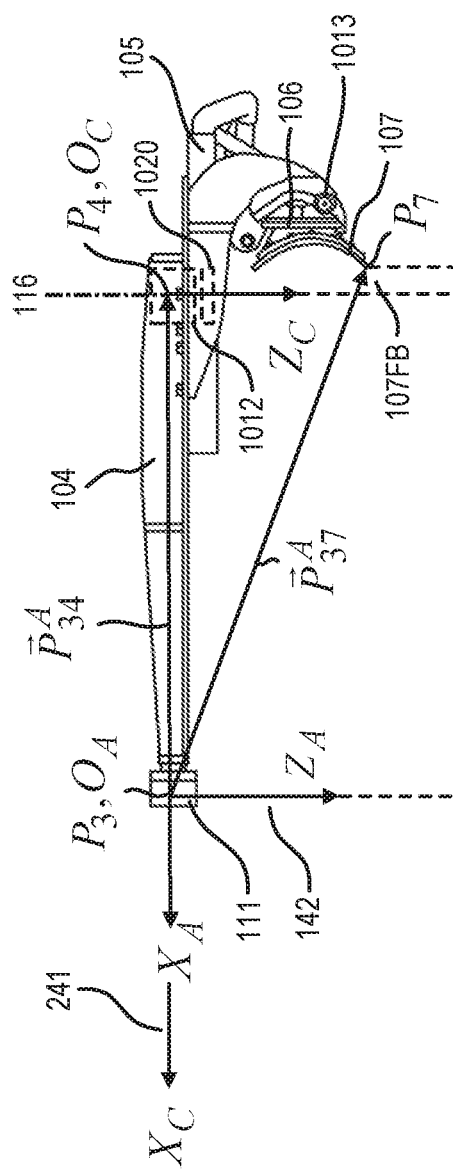

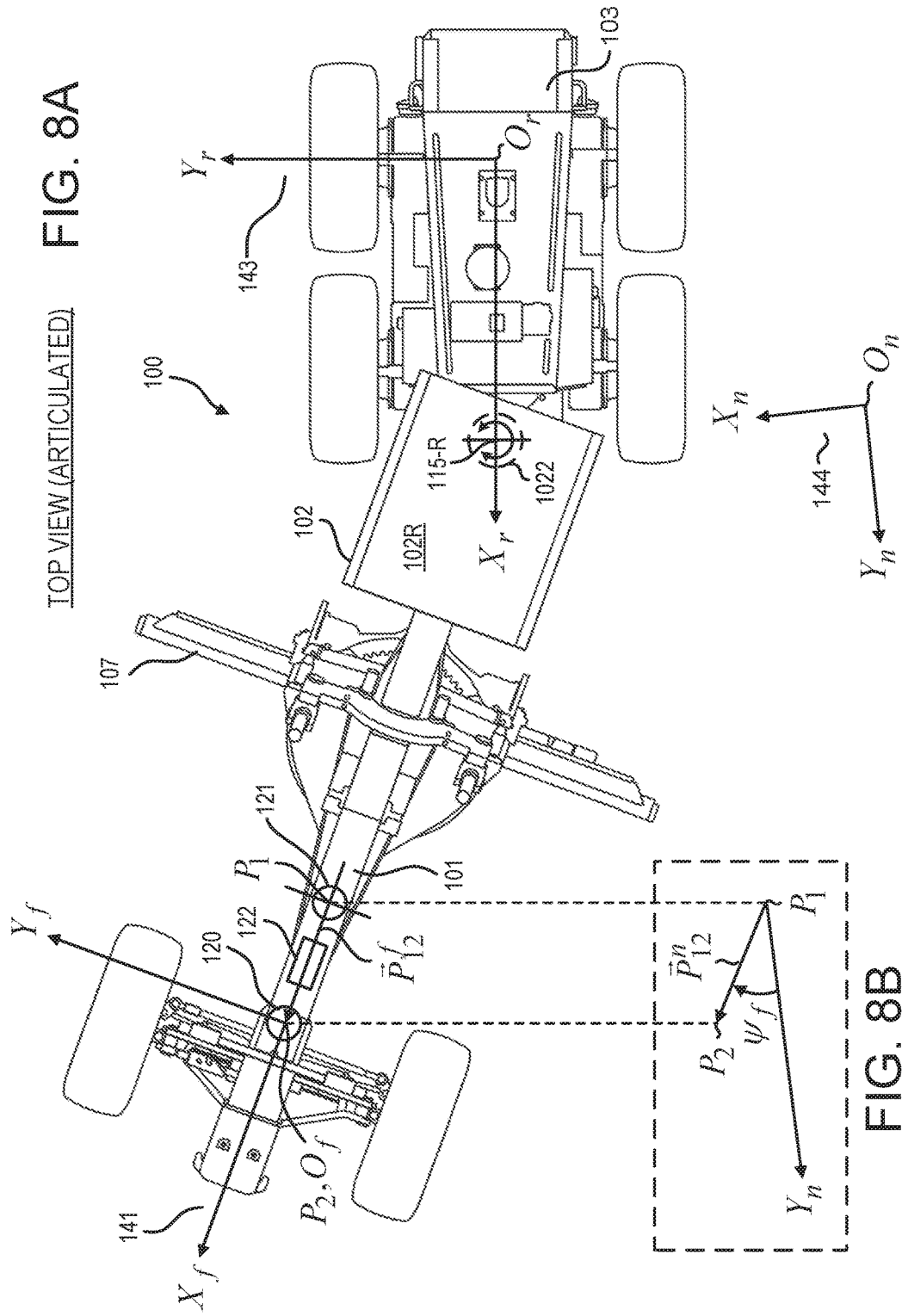

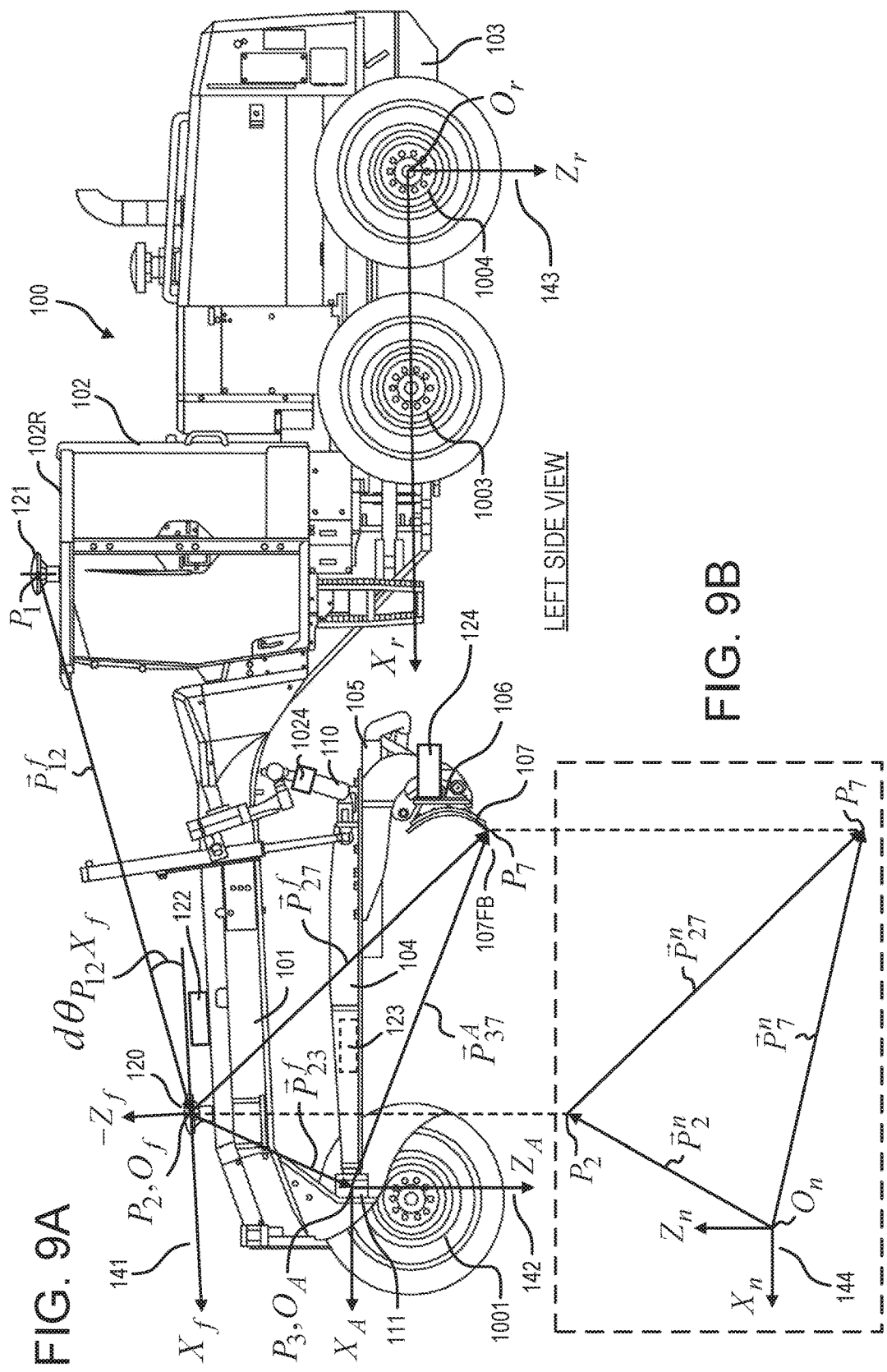

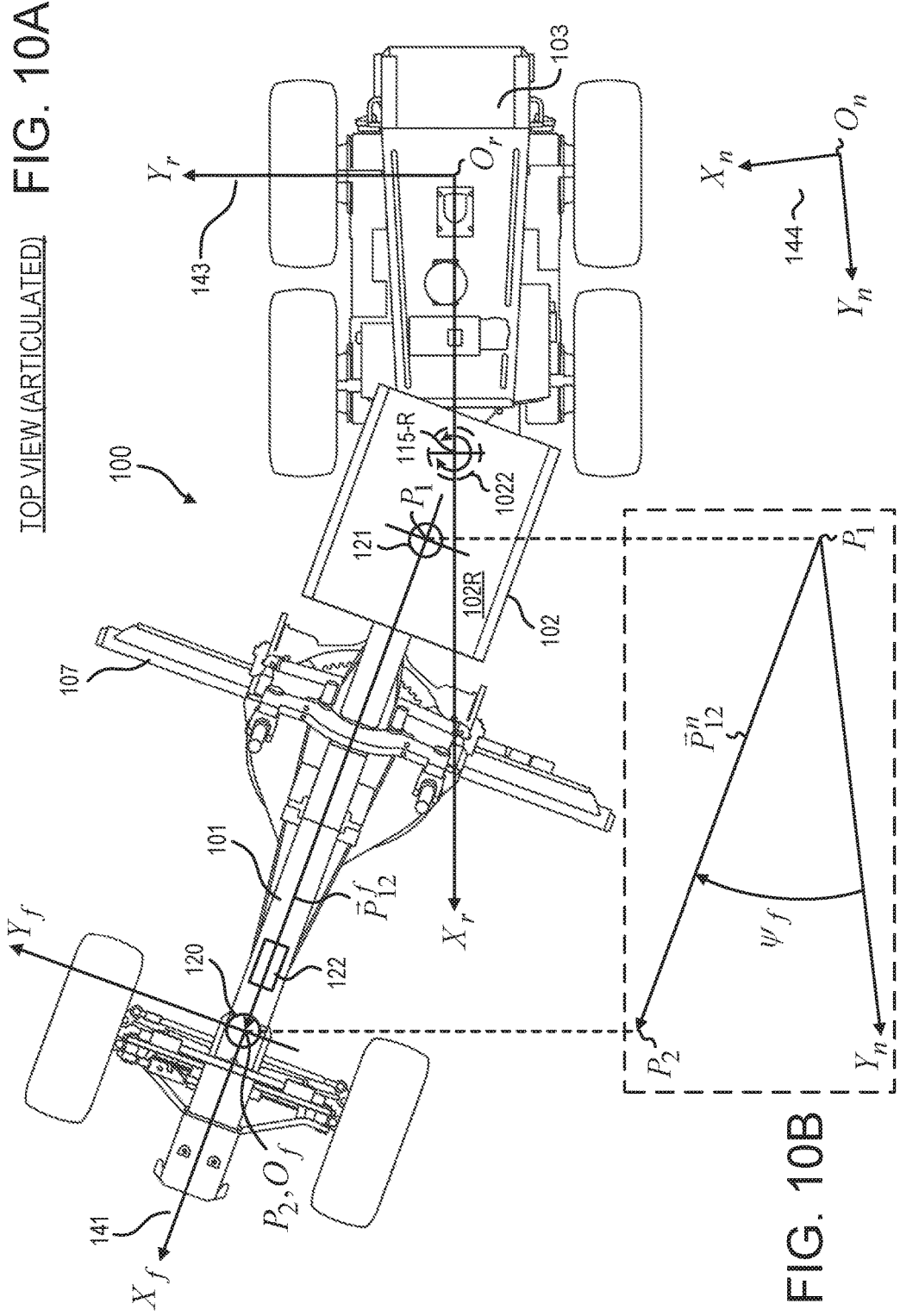

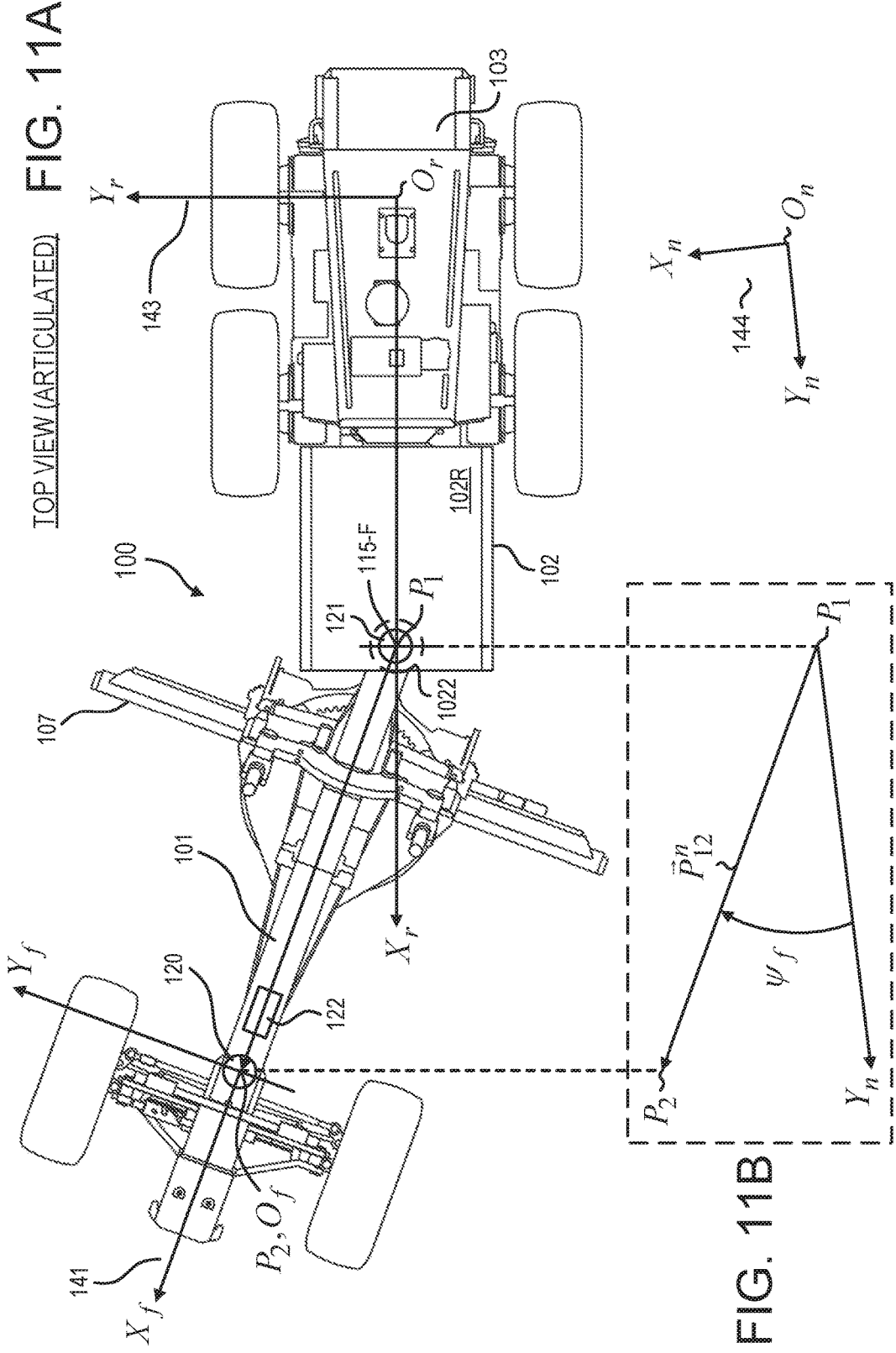

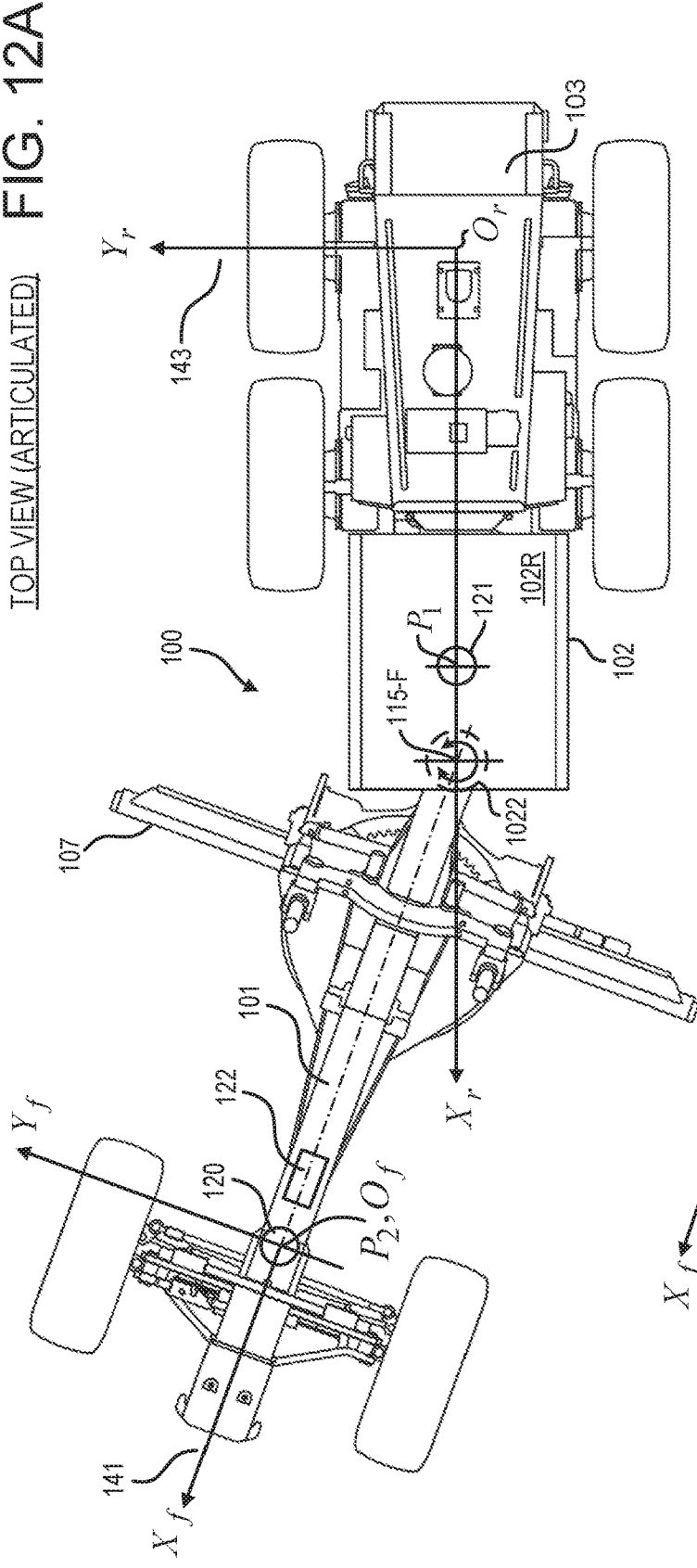
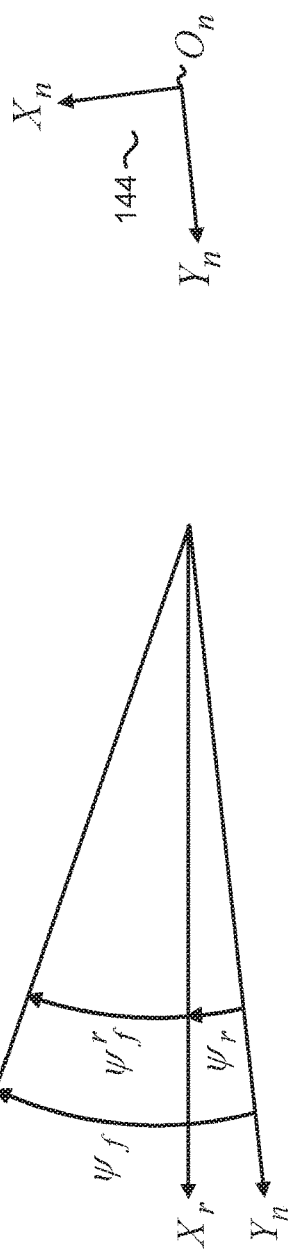
FIG. 12A TOP VIEW (ARTICULATED)
FIG. 12B

LEFT SIDE VIEW

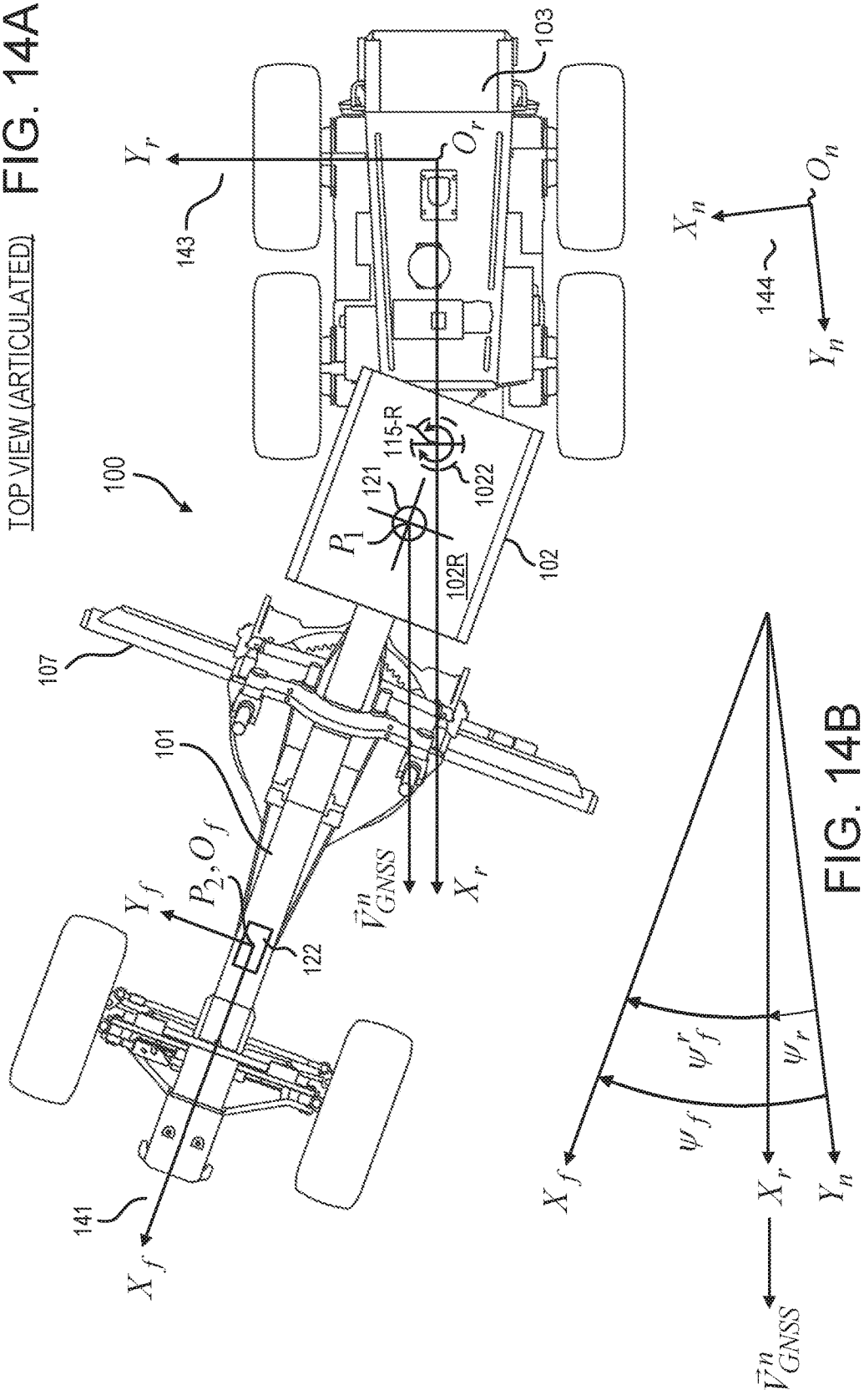

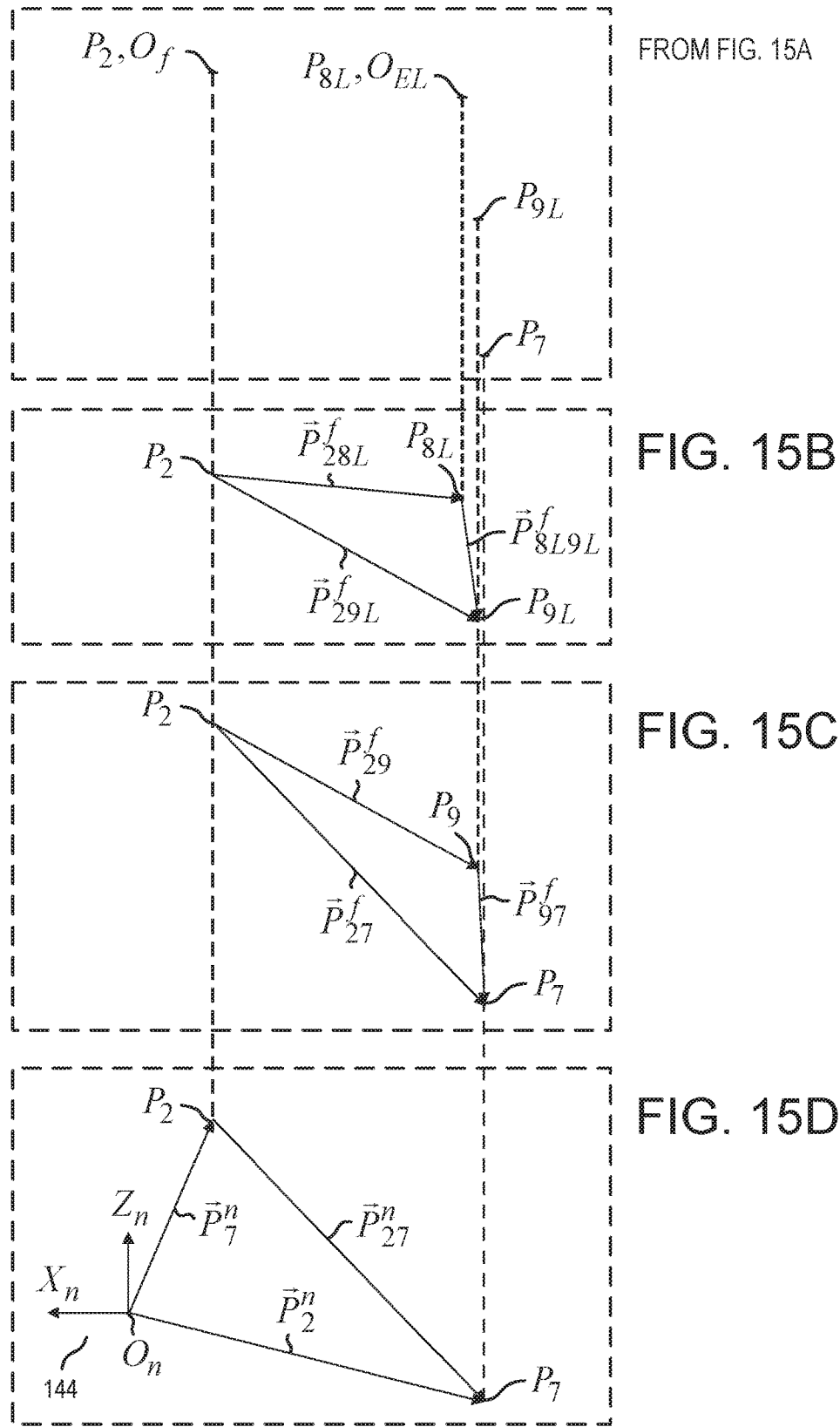

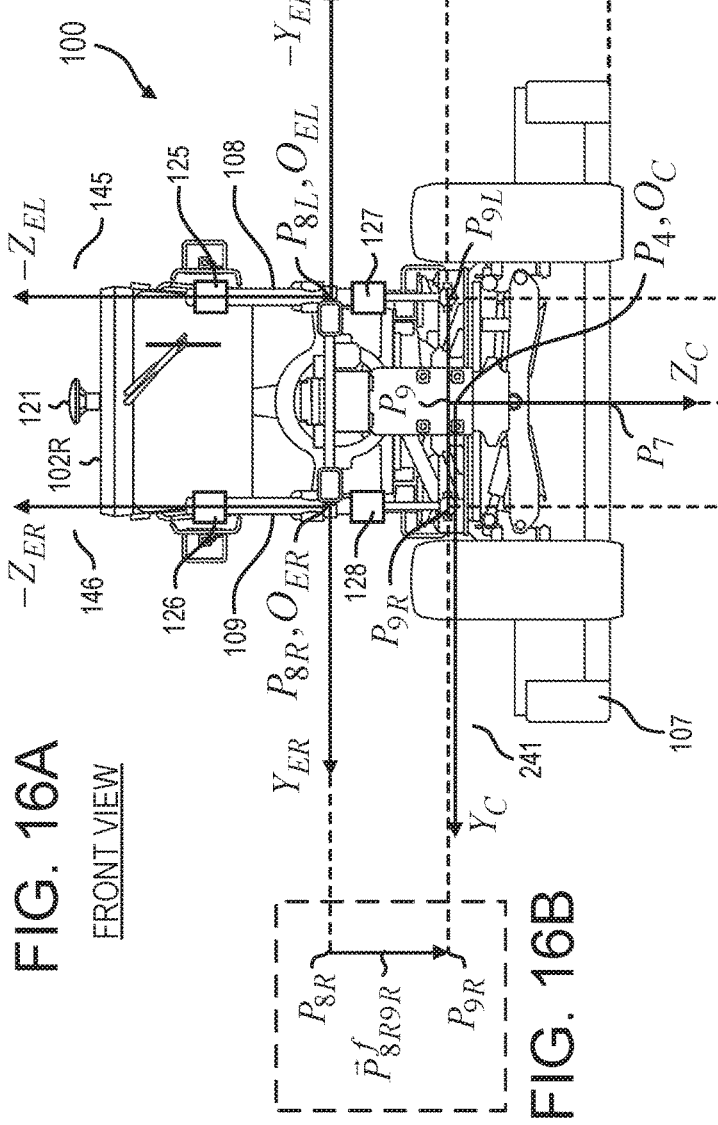

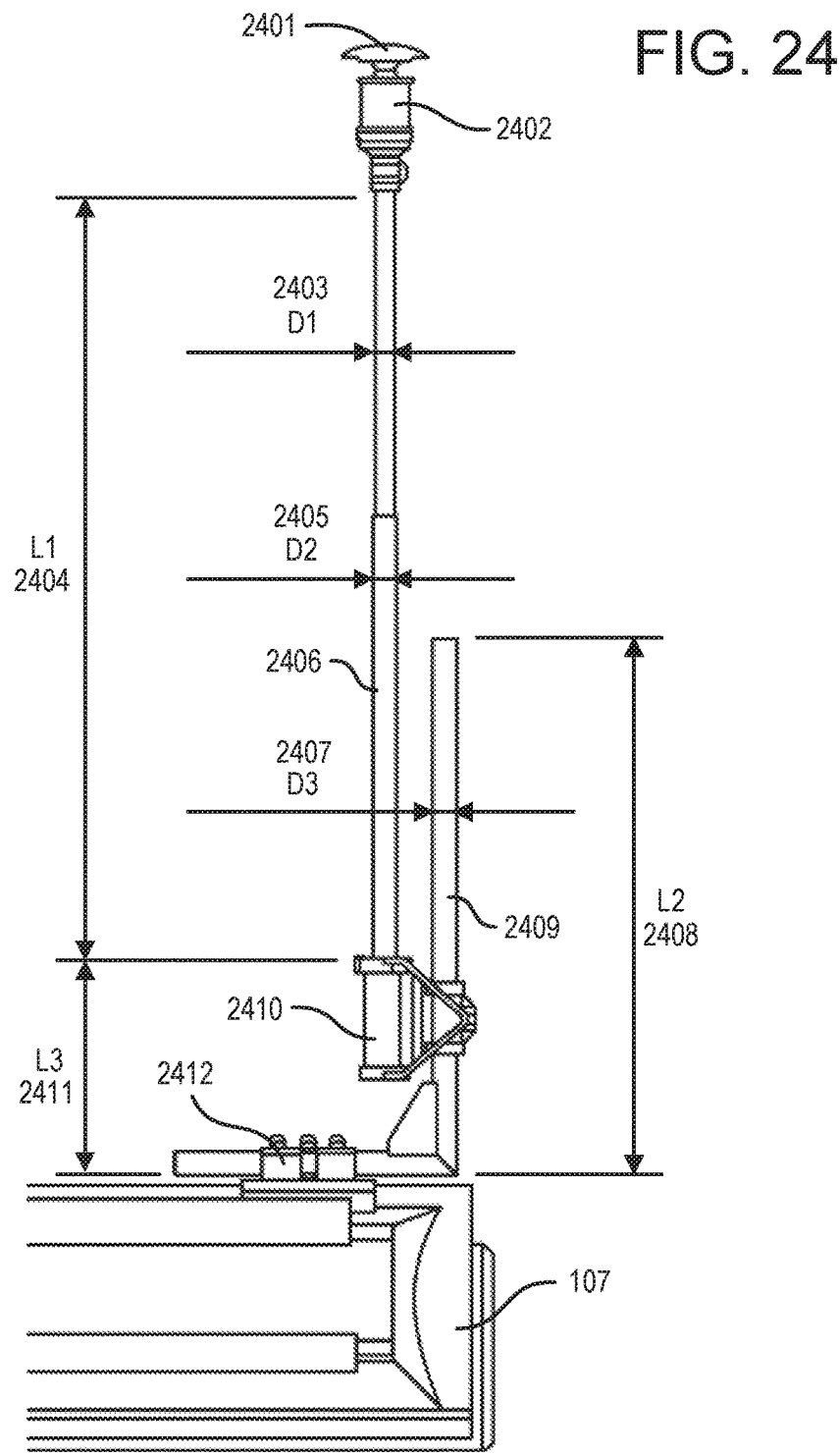

AUTOMATIC BLADE CONTROL SYSTEM FOR A MOTOR GRADER

CROSS-REFERENCE TO RELATED APPLICATIONS

This application is a national stage (under 35 U.S.C. 371) of International Patent Application No. PCT/RU2015/000645, filed Oct. 6, 2015, which is herein incorporated by reference in its entirety.

BACKGROUND OF THE INVENTION

The present invention relates generally to earth-grading machines and more specifically to three-dimensional grading control of motor graders.

Global navigation satellite system (GNSS) sensors have been extensively used in the construction industry for automatic blade control of earthmoving machines, such as dozers and motor graders. In a typical blade control system of a motor grader, one or two GNSS antennas are mounted on the motor grader blade; each GNSS antenna is mounted on the motor grader blade via a corresponding pole. Motor graders are traditionally used for fine grading, removing small amounts of soil with high precision. Requirements for grading accuracy are therefore high. In order to achieve high grading accuracy, laser sensors are commonly used on motor graders in combination with GNSS sensors. Laser receivers are usually also installed on top of the poles, together with the GNSS antennas.

BRIEF SUMMARY OF THE INVENTION

In an embodiment of the invention, a method for controlling a blade of a motor grader includes the steps described below.

With each of at least one global navigation satellite system (GNSS) antenna, GNSS navigation signals from a constellation of GNSS satellites are received. Each of the at least one GNSS antenna is mounted on the motor grader; and each of the at least one GNSS antenna is not mounted on the blade. Each of the at least one GNSS antenna is operably coupled to a corresponding GNSS receiver.

With each GNSS receiver, the GNSS navigation signals received by the GNSS antenna operably coupled to the GNSS receiver are processed. First measurements are computed. The first measurements include a position of the GNSS antenna operably coupled to the GNSS receiver.

With each of at least one inertial measurement unit, second measurements are measured. Each of the at least one inertial measurement unit is mounted on the motor grader; and each of the at least one inertial measurement unit has three corresponding orthogonal measurement axes. The second measurements include measurements of accelerations along the three orthogonal measurement axes and measurements of angular rotation rates about the three orthogonal measurement axes.

With at least one processor, a blade position and a blade orientation are computed. The blade position and the blade orientation are based at least in part on the first measurements and the second measurements. With the at least one processor, a blade elevation and a blade slope angle are controlled. The control of the blade elevation and the blade slope angle is based at least in part on the computed blade position, the computed blade orientation, and a digital job site model.

In another embodiment of the invention, with the at least one processor, the blade elevation, the blade slope angle, and a blade side shift are controlled. The control of the blade elevation, the blade slope angle, and the blade side shift is based at least in part on the computed blade position, the computed blade orientation, and the digital job site model.

These and other advantages of the invention will be apparent to those of ordinary skill in the art by reference to the following detailed description and the accompanying drawings.

BRIEF DESCRIPTION OF THE DRAWINGS

FIG. 1A-FIG. 1I show schematic views of an embodiment of a motor grader;

FIG. 2A-FIG. 2D show schematic views of a motor grader outfitted with sensors in a first system configuration;

FIG. 5A-FIG. 5D show schematic views of the blade side shift geometry;

FIG. 5E shows a schematic view of the blade side shift hydraulic cylinder and stroke sensor;

FIG. 6A-FIG. 6D show schematic views of the blade pitch rotation geometry;

FIG. 7A and FIG. 7B show schematic views, for the first system configuration, illustrating computation of the location of the midpoint of the blade cutting edge;

FIG. 8A and FIG. 8B show schematic views, for the first system configuration, illustrating computation of the heading angle of the front frame;

FIG. 9A and FIG. 9B show schematic views of a motor grader outfitted with sensors in a second system configuration;

FIG. 10A and FIG. 10B show schematic views, for the second system configuration, illustrating computation of the heading angle of the front frame (articulation joint behind the cabin);

FIG. 11A and FIG. 11B show schematic views, for the second system configuration, illustrating computation of the heading angle of the front frame (articulation joint in front of the cabin; a global navigation satellite system antenna located on the cabin roof top and located above the articulation joint);

FIG. 12A and FIG. 12B show schematic views, for the second system configuration, illustrating computation of the heading angle of the front frame (articulation joint in front of the cabin; a global navigation satellite system antenna located on the cabin roof top and not located above the articulation joint);

FIG. 14A and FIG. 14B show schematic views, for the third system configuration, illustrating computation of the heading angle of the front frame (articulation joint behind the cabin);

FIG. 15A-FIG. 15D show schematic views (left side view) of a motor grader outfitted with sensors in a fourth system configuration;

FIG. 16A-FIG. 16E show schematic views (front view) of the motor grader outfitted with sensors in the fourth system configuration;

FIG. 24 shows a schematic of a prior-art pole mount.

DETAILED DESCRIPTION

Figure 1B:
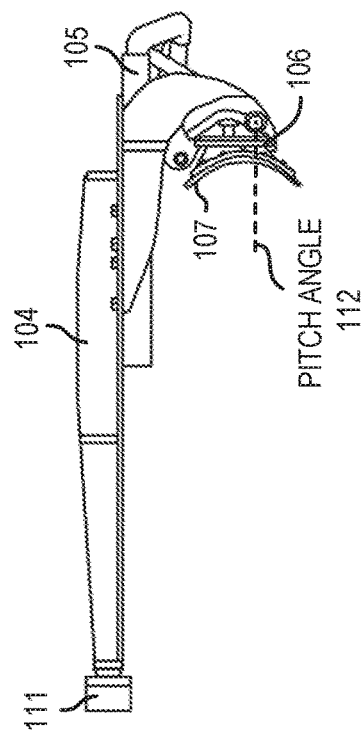

FIG. 1A-FIG. 1I show schematic views of an embodiment of a motor grader 100. Refer to FIG. 1A, which shows a left side view. The motor grader 100 includes the front frame 101, the cabin 102, the rear frame 103, and the A-frame 104. The roof top of the cabin 102 is referenced as the cabin roof top 102R. The front, rear, left, and right directions are viewed from the perspective of an operator seated in the cabin 102. The bottom direction faces towards the ground upon which the motor grader travels; the up direction faces away from the ground (towards the sky in an open-air environment). The motor grader 100 includes various joints that permit various translational and rotational degrees of freedom for various components. A summary of the principal joints is first provided; more details of the degrees of freedom are provided below.

The A-frame 104 is coupled to the front frame 101 by the ball-and-socket coupling 111. The circle 105 is coupled to the A-frame 104 by the circle/A-frame swivel joint 1012 (represented schematically by a dashed rectangular box). The blade support structure 106 is coupled to the circle 105 by the pivot joint 1013. The motor grader blade (also referred to simply as the blade) 107 is coupled to the blade support structure 106. [Note: As used herein, "circle" in "the circle 105" and in "the circle/A-frame swivel joint 1012" (and in "circle/A-frame swivel joint" below) is a standard engineering term referring to a well-known structural component of the motor grader. It does not refer to a geometrical figure.]

The various couplings and joints allow the position and orientation of the blade 107 to be varied. The ball-and-socket coupling 111 allows for three rotational degrees of freedom of the A-frame 104 relative to the front frame 101: about the pitch axis, the roll axis, and the yaw axis (see further discussion below for details of rotation axes). The motion of the A-frame 104 relative to the front frame 101 can by actuated by the left elevation hydraulic cylinder 108, the right elevation hydraulic cylinder 109, and the drawbar hydraulic cylinder 110. The right elevation hydraulic cylinder 109 is not visible in FIG. 1A but is visible in FIG. 1D (front view). Control systems for the hydraulic cylinders are described below.

Figure 1C:
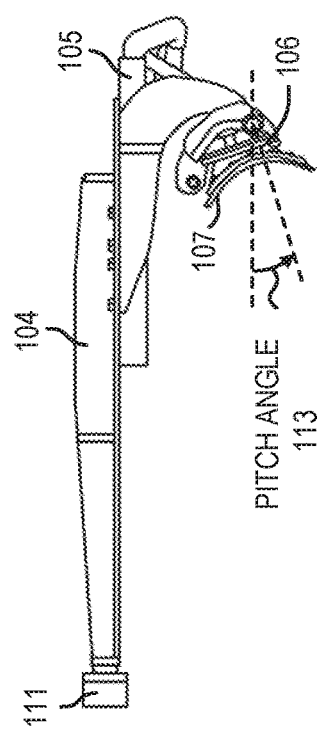

Refer to FIG. 1B and FIG. 1C. The blade support structure 106 can be rotated about its pitch axis relative to the circle 105. In FIG. 1B, the pitch angle is the pitch angle 112, shown here as 0 degrees. In FIG. 1C, the pitch angle is the pitch angle 113, shown here as greater than 0 degrees. More detailed discussions of the pitch angle are provided below.

Refer to FIG. 1D (front view). The blade 107 can be side shifted relative to the blade support structure 106; in FIG. 1D, the blade support structure is behind the blade and hidden from view. The blade side shift 114 represents the translation between the blade 107 in a first position (represented by the dashed lines) and the blade 107 in a second position (represented by the solid lines) or the translation between the blade 107 in the second position and the blade 107 in the first position. More detailed discussions of the blade side shift are provided below.

Figure 1E:
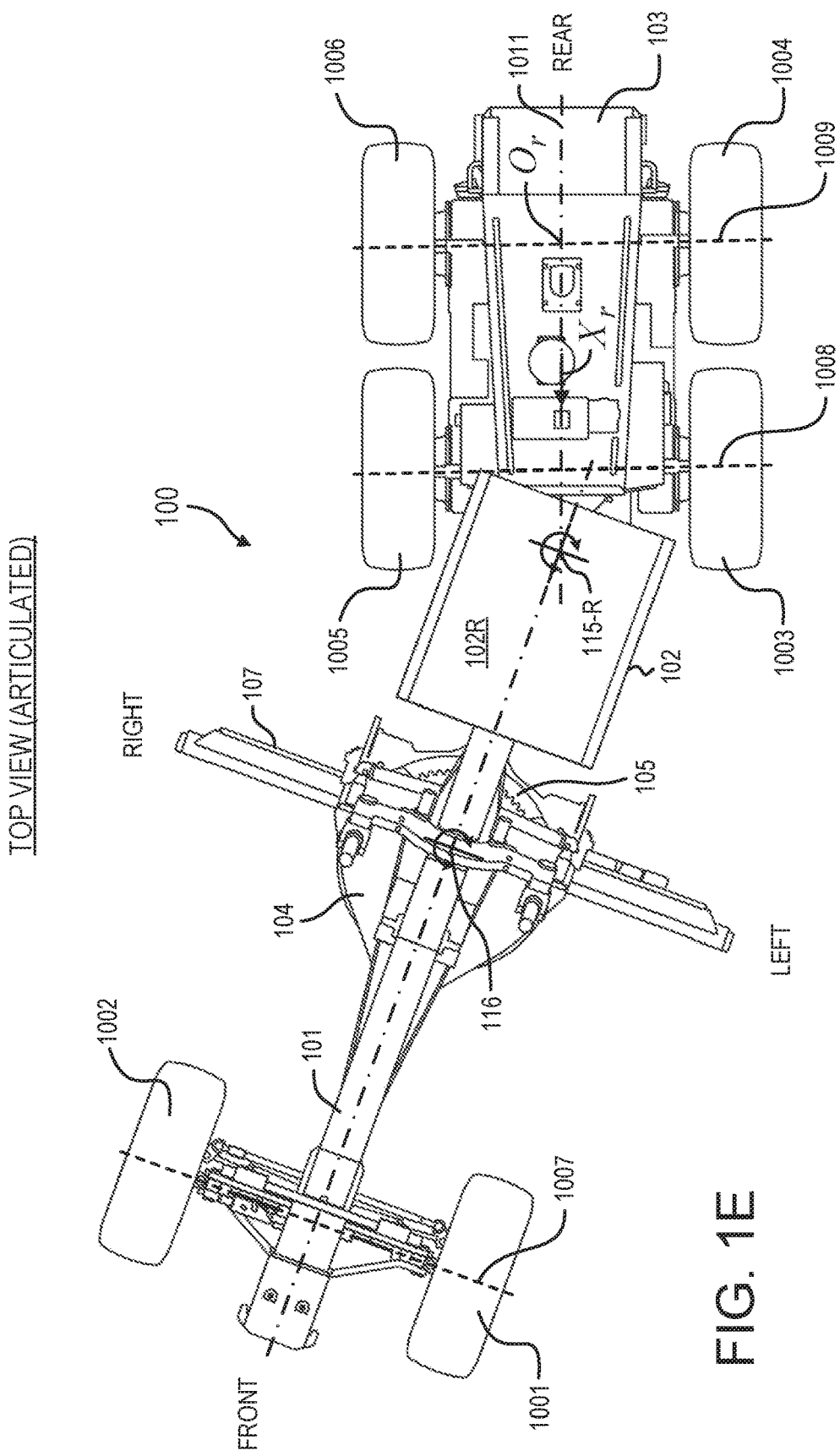
Figure 1F:
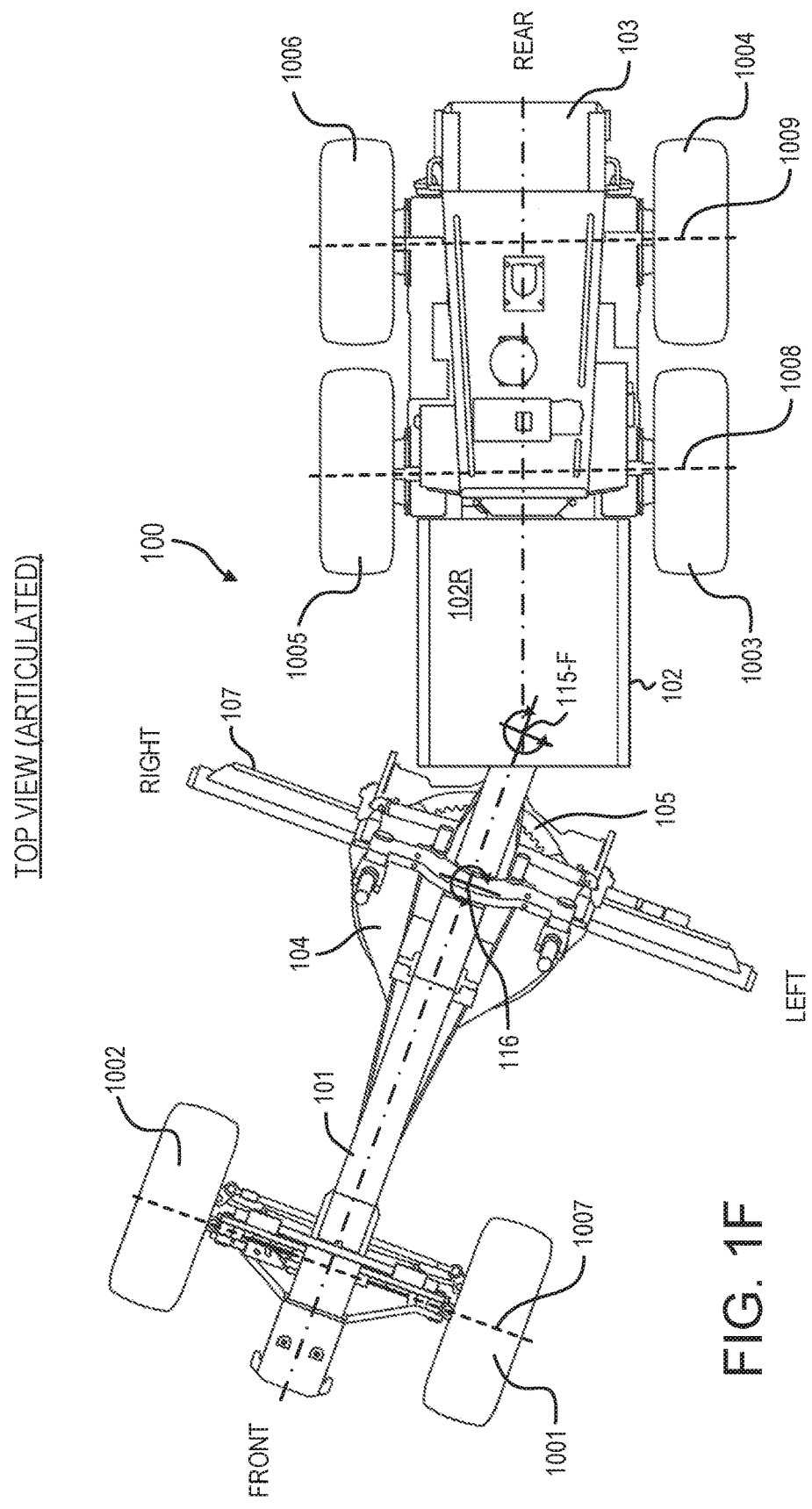

Refer to FIG. 1E (top articulated view) and FIG. 1F (top articulated view). The rear frame 103 can be rotated relative to the front frame 101 about an articulation axis. The articulation axis can be located behind the cabin 102 (referenced as the articulation axis 115-R in FIG. 1E) or in front of the cabin 102 (referenced as the articulation axis 115-F in FIG. 1F). The articulation axes are orthogonal to the plane of the figures. The circle 105 can be rotated about its yaw axis 116 relative to the A-frame 104. The yaw axis 116 is shown in FIG. 1E and FIG. 1F. The yaw axis 116 is orthogonal to the plane of the figures.

A typical automatic grading application involves shaping the surface of the earth in accordance with a digital job site model. A digital job site model is represented by a three-dimensional digital surface that specifies the desired surface profile that should be obtained as a result of a grading job. In three-dimensional grading, the position of the blade is described by a three-dimensional vector computed relative to the origin of a reference coordinate frame. Points of the three-dimensional digital job site model are specified relative to the same reference coordinate frame.

Given a reference blade position vector computed from the digital job site model and the actual blade position vector computed from the measurements of sensors mounted on the machine, a blade position error vector can be computed; the blade position error vector is used in the automatic blade control system. In order to accomplish the automatic grading task, several parameters of the blade can be controlled. These parameters commonly include blade elevation and blade slope angle.

Blade elevation error refers to the distance, along a local normal to a local flat part of the digital job site model, between the reference blade position and the actual blade position. Blade elevation error is computed from the blade position error vector. Details of the computation are given below. Automatic blade elevation control is achieved by automatically controlling the motion of the blade elevation hydraulic cylinders.

Blade slope angle is defined as the angle of the blade cutting edge relative to the horizontal surface of the reference coordinate frame. A reference value of the blade slope angle is computed from the digital job site model. Blade slope angle error, computed as the difference between the reference blade slope angle value and the actual blade slope angle value, is used in the blade slope angle control algorithm. Automatic blade slope angle control in a motor grader is also achieved by automatically controlling the motion of the blade elevation hydraulic cylinders.

Specific to motor graders, blade side shift can also be automatically controlled. Blade side shift error is computed from the blade position error vector. Details of the computation are given below. Automatic blade side shift control is achieved by automatically controlling the motion of the blade side shift hydraulic cylinder.

As discussed above, prior-art blade control systems for motor graders typically use global navigation satellite system (GNSS) antennas or combinations of GNSS antennas and laser receivers mounted onto the blade via poles. The geometry and dimensions of poles can vary widely. One example of a prior-art pole mount is shown in FIG. 24. The GNSS antenna 2401 and the laser receiver 2402 are mounted on top of the pole 2406. The pole 2406 is mounted on the L-bar 2409 via the vibration isolation mechanism 2410. The L-bar 2409 is mounted on the blade 107 via the mounting structure 2412. Typical dimensions illustrated in the figure include the following: the pole diameter D1 2403 is equal to 4.4 cm; the pole diameter D2 2405 is equal to 5.1 cm; the pole length L1 2404 is equal to 2.2 m; the L-bar diameter D3 2407 is equal to 5.1 cm; and the L-bar length L2 2408 is equal to 1.1 m. The distance L3 2411 is variable and can be adjusted by moving the vibration isolation mechanism 2410 up-and-down along the L-bar 2409.

Although such configurations can provide for adequate accuracy and performance in many grading applications, they have certain limitations associated with the use of poles. For example, when the blade is rolled forward through a large angle, or when grading is performed on a bank with a very steep slope and the blade is rotated through a large slope angle, the GNSS antennas and the laser receivers are tilted at a large angle. Consequently, GNSS satellite coverage can become limited and GNSS system accuracy can degrade, and the laser system accuracy can degrade.

Another problem arises from the flexibility of poles. When poles are tilted, precise computation of the position of the motor grader blade relative to the sensors, either GNSS or laser, is difficult due to the unknown amount of the pole curvature. Pole curvature is particularly significant with laser systems because of the substantial weight of the laser receivers mounted on top of flexible poles.

The presence of the poles on the blade also limits the range of various blade maneuvers, such as blade rotations and side shift, because the poles can hit various structural elements of the motor grader, such as the front frame.

When GNSS sensors mounted on poles are used in combination with inertial sensors, more problems can arise in various scenarios; for example, when grading is performed on circular trajectories and precise compensation of centripetal accelerations is necessary. When the blade undergoes various maneuvers, such as rotation, rolling forward, or side shift, precise compensation of centripetal accelerations is difficult because the GNSS antennas on poles are moved and rotated together with the blade; consequently, the GNSS antennas follow complex trajectories, and accurate computation of the vehicle speed from GNSS measurements is difficult.

In embodiments of the invention, sensors are rigidly mounted on various appropriate surfaces of the motor grader. No GNSS sensors are mounted on the blade; however, other sensors, such as IMUs, can be mounted on the blade. GNSS sensors can be mounted at locations such that reception of GNSS navigation signals (see below) is unobstructed. A sensor can be mounted directly on a surface of a motor grader; or a sensor can be mounted on a surface of a motor grader via an auxiliary support structure, such as a mounting bracket or a mounting plate. Mounting can be accomplished by various methods, such as mechanical fasteners, welding, soldering, and adhesives.

Sensors include GNSS antennas, inertial sensors, and other sensors such as stroke sensors and rotation sensors. In some embodiments, multiple inertial sensors are integrated into an inertial measurement unit (IMU). An IMU capable of measuring three linear degrees of freedom and three rotational degrees of freedom includes three orthogonally placed accelerometers and three orthogonally placed rate gyros. Each accelerometer measures the acceleration along a corresponding measurement axis. Similarly, each rate gyro measures the angular rotation rate about a corresponding measurement axis. The measurement axes of an IMU are also referred to as the body axes of the IMU. Various devices can be used for inertial sensors. In some embodiments, micro-electro-mechanical (MEMS) devices that are compact and lightweight and that can operate under a wide range of extreme environmental conditions, such as temperature, humidity, vibration, and shock, are used. In some embodiments, various types of rotation sensors are used to measure angles of rotation of various parts of the motor grader relative to other parts. In some embodiments, various types of stroke sensors are installed on various hydraulic cylinders of the motor grader to measure linear displacements of the extendable rods of the hydraulic cylinders. Measurements of the linear displacement of the extendable rod of a hydraulic cylinder are referred to as measurements of the stroke of the hydraulic cylinder. Measurements are typically outputted from sensors, either directly or via processing units, as digital data.

Figure 23:
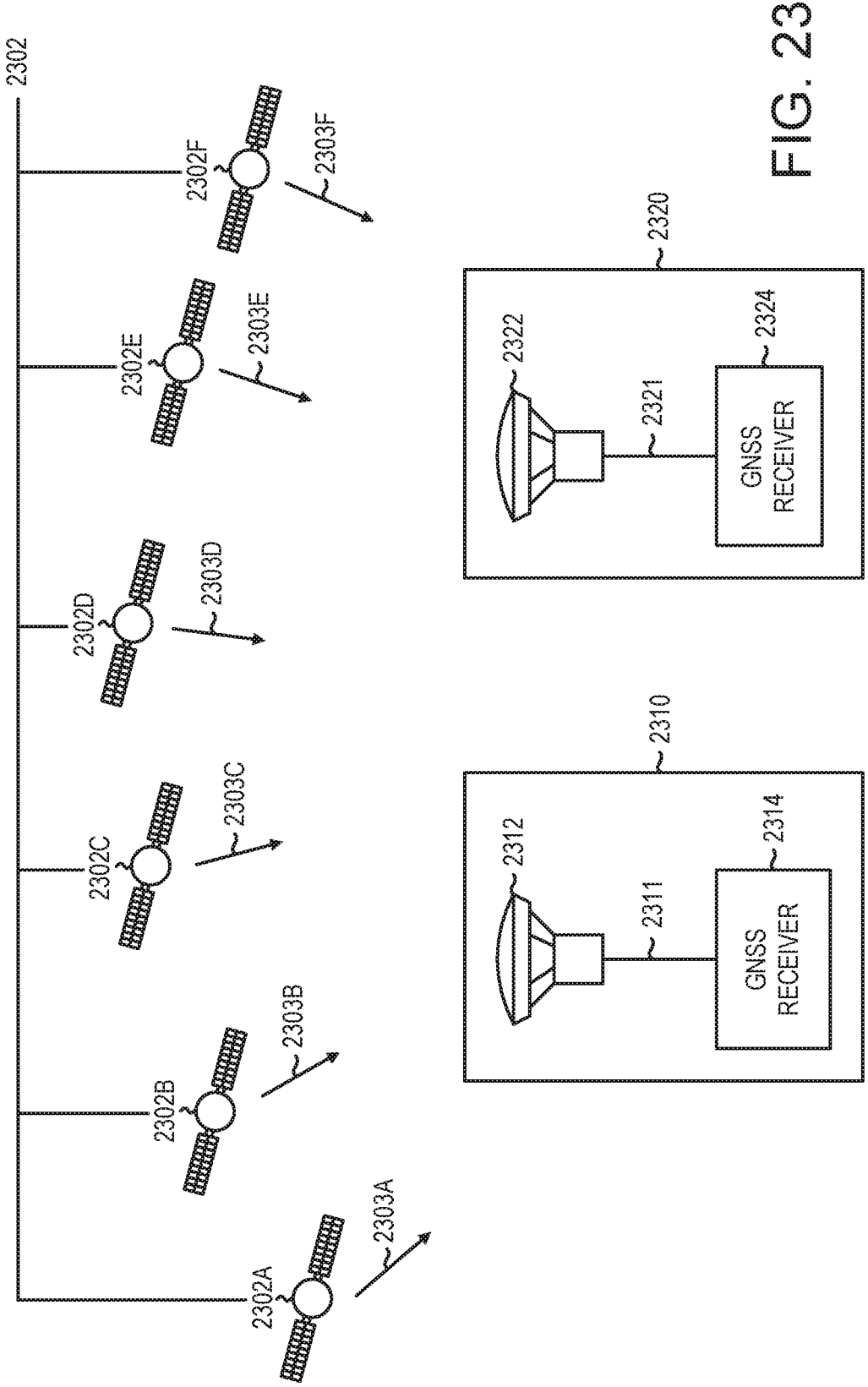
FIG. 23 shows a schematic of a global navigation satellite system.

Global navigation satellite systems (GNSSs) are well-known in the art; a high-level schematic is shown in FIG. 23. A constellation of GNSS satellites 2302 transmits GNSS navigation signals. Shown are six representative GNSS satellites, denoted GNSS satellite 2302A GNSS satellite 2302F, which transmit GNSS navigation signal 2303A GNSS navigation signal 2303F, respectively. The GNSS measurement unit 2310 includes the GNSS sensor (antenna) 2312 and the GNSS receiver 2314. Similarly, the GNSS measurement unit 2320 includes the GNSS sensor (antenna) 2322 and the GNSS receiver 2324. Herein, the GNSS sensor 2312 corresponds to the GNSS receiver 2314, and the GNSS receiver 2314 corresponds to the GNSS sensor 2312; similarly, the GNSS sensor 2322 corresponds to the GNSS receiver 2324, and the GNSS receiver 2324 corresponds to the GNSS sensor 2322.

Refer to the GNSS measurement unit 2310. The GNSS antenna 2312 and the GNSS receiver 2314 are operably coupled. In some embodiments, the GNSS antenna 2312 and the GNSS receiver 2314 are mounted in substantially different locations and are coupled with a long coax cable. For example, the GNSS antenna can be mounted on the front frame of the motor grader, and the GNSS receiver can be mounted in the cabin of the motor grader. In other embodiments, the GNSS antenna is mounted close to or on the GNSS receiver; they are coupled with a short coax cable.

The GNSS antenna 2312 receives GNSS navigation signal 2303A GNSS navigation signal 2303F. The output signal of the GNSS antenna 2312, referenced as the signal 2311, represents the total combined signals received by the GNSS antenna 2312. The signal 2311 is inputted into the GNSS receiver 2314. In some embodiments, a low-noise amplifier (LNA) is the input stage of the GNSS receiver. In other embodiments, the signal 2311 is amplified by an LNA positioned closer to the GNSS antenna; an LNA can be integrated with the GNSS antenna.

The GNSS receiver 2314 processes the GNSS navigation signals and computes the position of the phase center of the GNSS antenna 2312. The velocity of the phase center of the GNSS antenna can be calculated by various methods; for example, by taking the time derivative of the position of the phase center of the GNSS antenna as a function of time, by processing Doppler measurements, or by processing carrier phase measurements over a specific interval of time. In simplified terminology, the position of the phase center of the GNSS antenna is referred to as the position of the GNSS antenna, and the velocity of the phase center of the GNSS antenna is referred to as the velocity of the GNSS antenna. In simplified terminology, the measurements outputted by a GNSS receiver based on the GNSS navigation signals inputted from a corresponding GNSS sensor are referred to as measurements outputted by the GNSS sensor. GNSS measurements are typically outputted from the GNSS receiver as digital data.

Refer to the GNSS measurement unit 2320. The GNSS antenna 2322 and the GNSS receiver 2324 are operably coupled. The GNSS antenna 2322 receives GNSS navigation signal 2303A GNSS navigation signal 2303F. The output signal of the GNSS antenna 2322, referenced as the signal 2321, represents the total combined signals received by the GNSS antenna 2322. The signal 2321 is inputted into the GNSS receiver 2324. The description above of the embodiments and functions for the GNSS measurement unit 2310 apply similarly for the GNSS measurement unit 2320. The GNSS measurement unit 2310 and the GNSS measurement unit 2320 can have the same embodiment or can have different embodiments.

The GNSS navigation signals include carrier signals modulated by pseudo-random binary codes. A GNSS receiver measures the time delays of the received GNSS navigation signals relative to a local reference clock or oscillator. Code measurements enable the GNSS receiver to determine the pseudo-ranges between the GNSS antenna and the GNSS navigation satellites. The pseudo-ranges differ from the actual ranges (distances) between the GNSS antenna and the GNSS navigation satellites due to various error sources and due to variations in the time scales of the GNSS navigation satellites and the GNSS receiver. If GNSS navigation signals are received from a sufficiently large number of GNSS navigation satellites, then the measured pseudo-ranges can be processed to determine the code coordinates at the GNSS antenna and time scales at the GNSS receiver. This operational mode is referred to as a stand-alone mode, since the measurements are determined by a single GNSS receiver. A stand-alone system typically provides meter-level accuracy.

To improve the accuracy, precision, stability, and reliability of measurements, differential navigation (DN) systems have been developed. In a DN system, the position of a user is determined relative to a base station (also referred to as a base) whose coordinates are precisely known (for example, by precision GNSS measurements collected over an extended period of time or by surveying measurements). The base contains a GNSS receiver that receives GNSS navigation signals. The user, whose position is to be determined, can be stationary or mobile and is often referred to as a rover. The rover also contains a GNSS receiver that receives GNSS navigation signals. Signal measurements processed at the base are transmitted to the rover via a communications link. The communications link, for example, can be provided over a cable or optical fiber. To accommodate a mobile rover, the communications link is often a wireless link.

The rover processes the measurements received from the base, along with measurements taken with its own GNSS receiver, to improve the accuracy of determining its position. Accuracy is improved in the differential navigation mode because errors incurred by the GNSS receiver at the rover and by the GNSS receiver at the base are highly correlated. Since the coordinates of the base are accurately known, measurements from the base can be used to improve the accuracy of the coordinates of the rover. A differential global positioning system (DGPS) computes locations based on pseudo-ranges only.

The location determination accuracy of a differential navigation system can be further improved by supplementing the code pseudo-range measurements with measurements of the phases of the satellite carrier signals. If the carrier phases of the signals transmitted by the same GNSS navigation satellite are measured by both the GNSS receiver at the base and the GNSS receiver at the rover, processing the two sets of carrier phase measurements can yield a location determination accuracy to within several percent of the carrier's wavelength. A differential navigation system that computes locations based on real-time carrier signals, in addition to the code pseudo-ranges, is often referred to as a GNSS real-time kinematic (RTK) mode system (GNSS RTK system). In the embodiments described below, GNSS measurement units operating in any desired GNSS mode can be used; the desired operating mode is selected, for an example, by a control engineer based on the required measurement accuracy for a particular application.

Described below are four representative configurations of sensors used in embodiments of the invention; these configurations are referred to as System Configuration 1, System Configuration 2, System Configuration 3, and System Configuration 4. These configurations of sensors provide measurements that are used to compute three blade parameters: the blade elevation, the blade slope angle, and the blade side shift. In some applications, only the blade elevation and the blade slope angle are automatically controlled; the blade side shift can be manually controlled. In other applications, the blade elevation, the blade slope angle, and the blade side shift are automatically controlled. Details of the control algorithms that use measurements from the sensors are described further below. Note: To simplify the drawings, the GNSS receivers corresponding to the GNSS antennas are not shown.

Herein, when geometrical conditions are specified, the geometrical conditions are satisfied within specified tolerances depending on available manufacturing tolerances and acceptable accuracy. For example, two axes are orthogonal if the angle between them is 90 degrees within a specified tolerance; two axes are parallel if the angle between them is 0 degrees within a specified tolerance; two lengths are equal if they are equal within a specified tolerance; and a straight line segment is a straight line segment if it is a straight line segment within a specified tolerance. Tolerances can be specified, for example, by a control engineer.

System Configuration 1 is now described. Refer to FIG. 2A. FIG. 2A shows a left side view of the motor grader 100 with sensors outfitted in the System Configuration 1. The global navigation satellite system (GNSS) antenna 120 is mounted on the top side of the front frame 101. The GNSS antenna 121 is also mounted on the top side of the front frame 101. In the embodiment shown, the Inertial Measurement Unit (IMU) 122 is mounted on the top side of the front frame 101; in particular, the IMU 122 is mounted between the GNSS antenna 120 and the GNSS antenna 121. In other embodiments, the IMU 122 can be mounted on other locations on the front frame 101. In the embodiment shown, the IMU 123 is mounted on the top side of the A-frame 104. In other embodiments, the IMU 123 can be mounted on other locations on the A-frame 104. The IMU 124 is mounted on the blade support structure 106 that supports the blade 107. Unless otherwise stated, an IMU refers to an inertial measurement unit with three orthogonally mounted accelerometers and three orthogonally mounted rate gyros.

The phase center of the GNSS antenna 121 is denoted as the point $P_1$. The phase center of the GNSS antenna 120 is denoted as the point $P_2$. The center of the A-frame ball-and-socket coupling 111 is denoted as the point $P_3$. The point $P_7$ represents the midpoint of the cutting edge 107FB of the blade 107. Refer to FIG. 2B. FIG. 2B shows a perspective view of the blade 107. The blade 107 has a front side 107F. The cutting edge 107FB is the bottom edge of the front side 107F. The point $P_7$ is the midpoint of the cutting edge 107FB.

Refer to FIG. 3A-FIG. 3H. FIG. 3A-FIG. 3H show perspective views of various Cartesian coordinate reference frames. The right-hand rule convention is used.

Figure 3A:
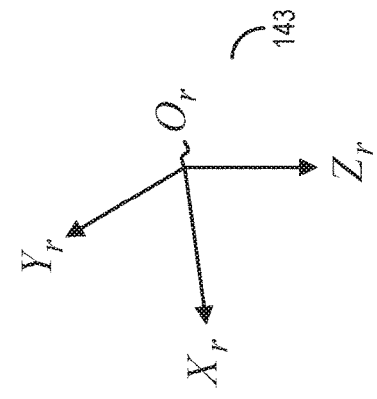
FIG. 3A-FIG. 3H show schematic views of Cartesian coordinate reference frames.

Refer to FIG. 3A. The coordinate frame $O_f X_f Y_f Z_f$ 141 is a Cartesian coordinate frame fixed relative to the front frame 101. It is specified by the origin $O_f$, X-axis $X_f$, Y-axis $Y_f$, and Z-axis $Z_f$. (Note: This coordinate frame will generally be drawn showing the $-Z_f$-axis.) The origin $O_f$ is fixed at the point $P_2$, and the $(X_f, Y_f, Z_f)$-axes are parallel to the body axes of the IMU 122 (FIG. 2A). The orientation of the front frame 101 is defined as the orientation of the coordinate frame $O_f X_f Y_f Z_f$ 141; that is, the orientation of the front frame 101 with respect to an arbitrary reference frame is defined as the orientation of the coordinate frame $O_f X_f Y_f Z_f$ 141 with respect to the arbitrary reference frame.

Figure 3B:
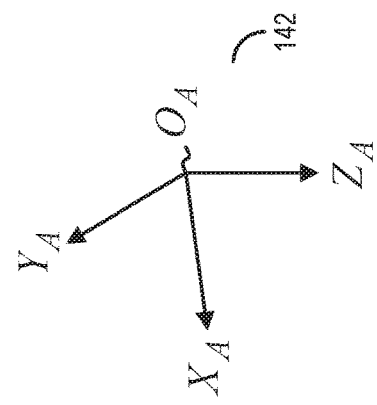

Refer to FIG. 3B. The coordinate frame $O_A X_A Y_A Z_A$ 142 is a Cartesian coordinate frame fixed relative to the A-frame 104. It is specified by the origin $O_A$, X-axis $X_A$, Y-axis $Y_A$, and Z-axis $Z_A$. The origin $O_A$ is fixed at the point $P_3$, and the $(X_A, Y_A, Z_A)$-axes are parallel to the body axes of the IMU 123 (FIG. 2A). The orientation of the A-frame 104 is defined as the orientation of the coordinate frame $O_A X_A Y_A Z_A$ 142.

Figure 3C:
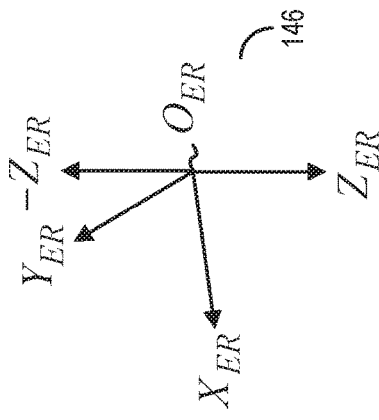

Refer to FIG. 3C. The coordinate frame $O_r X_r Y_r Z_r$ 143 is a Cartesian coordinate frame fixed relative to the rear frame 103. It is specified by the origin $O_r$, X-axis $X_r$, Y-axis $Y_r$, and Z-axis $Z_r$. Further details of this coordinate frame are discussed with reference to FIG. 1A, FIG. 1E, and FIG. 1G-FIG. 1I.

Refer to FIG. 1E. The motor grader 100 includes the front wheel 1001 and the front wheel 1002. The front-wheel axle 1007 passes through the center of the front wheel 1001 and the center of the front wheel 1002. The motor grader 100 also includes the rear wheel 1003, the rear wheel 1005, the rear wheel 1004, and the rear wheel 1006. The rear-wheel axle 1008 passes through the center of the rear wheel 1003 and the center of the rear wheel 1005. The rear-wheel axle 1009 passes through the center of the rear wheel 1004 and the center of the rear wheel 1006. The reference line 1011 passes through the midpoint of the rear-wheel axle 1008 and the midpoint of the rear-wheel axle 1009. The origin $O_r$ is fixed at the midpoint of the rear-wheel axle 1009; and the $X_r$-axis lies along the reference line 1011, with the positive direction pointing towards the midpoint of the rear-wheel axle 1008.

Refer to FIG. 1G-FIG. 1I. FIG. 1G-FIG. 1I show close-up left side views of the rear wheels and rear-wheel axles. The center point 1008C represents the projection of the midpoint of the rear-wheel axle 1008 onto the left end face of the rear-wheel axle 1008. The center point 1009C represents the projection of the midpoint of the rear-wheel axle 1009 onto the left end face of the rear-wheel axle 1009. Also shown is the projection of the reference line 1011 onto the plane of the figure.

Refer to FIG. 1I. In this view, the origin $O_r$ lies at the center point 1009C of the rear-wheel axle 1009; and the $X_r$-axis lies along the reference line 1011, with the positive direction pointing towards the center point 1008C of the rear-wheel axle 1008. Refer to FIG. 2A. FIG. 2A shows the relationship of the coordinate frame $O_r X_r Y_r Z_r$ 143 to the overall motor grader 100.

Figure 3D:
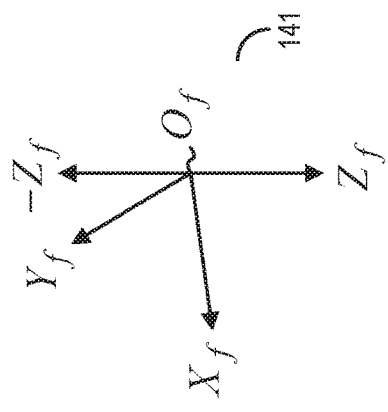

Refer to FIG. 3D. The coordinate frame $O_n X_n Y_n Z_n$ 144 is a local navigation Cartesian coordinate frame. It is specified by the origin $O_n$, X-axis $X_n$, Y-axis $Y_n$, and Z-axis $Z_n$. Various conventions can be used for the local navigation frame. In the convention shown in FIG. 3D, the local navigation coordinate frame $O_n X_n Y_n Z_n$ 144 is an East-North-Up (ENU) Cartesian coordinate frame in which the origin $O_n$ is fixed at a specified local point, the $X_n$-$Y_n$ plane is tangent to the World Geodetic System 1984 (WGS-84) Earth ellipsoid, the $X_n$-axis points to the East, the $Y_n$-axis points to the North, and the $Z_n$-axis points Up along a local vertical axis. The specified local point, for example, can be a local point on the ground specified by a site engineer. In the discussions herein, no particular orientation of the motor grader relative to the local navigation frame is assumed.

For any OXYZ Cartesian coordinate system, orientation is specified by three angles: the roll angle $\phi$ is measured as a rotation angle about the X-axis, the pitch angle $\theta$ is measured as a rotation angle about the Y-axis, and the yaw angle $\psi$ is measured as a rotation angle about the Z-axis. Specific angles are further denoted by subscripts and superscripts in the discussions below.

Refer to FIG. 2C. FIG. 2C shows various points relative to the coordinate frame $O_n X_n Y_n Z_n$ 144. The vector $\vec{P}_{12}{}^n$ is resolved in the coordinate frame $O_n X_n Y_n Z_n$ 144 and is referred to herein as the GNSS baseline vector; it is computed as the vector $\hat{P}_{12}$ from the point $P_1$, the phase center of the GNSS antenna 121, to the point $P_2$, the phase center of the GNSS antenna 120. The coordinates of the point $P_1$ and the coordinates of the point $P_2$ are determined in the coordinate frame $O_n X_n Y_n Z_n$ 144 from GNSS measurements. [Note: A vector without a superscript (such as $\vec{P}_{12}$) refers to a vector independent of a specific coordinate frame; and a vector with a superscript (such as $\vec{P}_{12}{}^n$) refers to a vector resolved in the coordinate frame specified by the superscript.] Refer to FIG. 2A. The vector $\vec{P}_{12}{}^f$ is the vector $\vec{P}_{12}$ from the point $P_1$ to the point $P_2$, resolved in the coordinate frame $O_f X_f Y_f Z_f$ 141. The vector $\vec{P}_{12}{}^f$ can be computed from the vector $\vec{P}_{12}{}^n$ by the following relationship:

$$\vec{P}_{12}{}^f = R_n^f \vec{P}_{12}{}^n, \qquad (E1)$$

where $R_n^f$ represents the rotation matrix for coordinate transformation from the coordinate frame $O_n X_n Y_n Z_n$ 144 to the coordinate frame $O_f X_f Y_f Z_f$ 141.

In the embodiments described herein, coordinate transformations are performed with rotation matrices. In general, coordinate transformations can be performed with other methods, such as quaternions. The elements of the rotation matrix $R_n^f$ are computed from Euler angles, including roll, pitch, and yaw angles, that represent the orientation of the coordinate frame $O_f X_f Y_f Z_f$ 141 relative to the coordinate frame $O_n X_n Y_n Z_n$ 144. As described above, the axes of the coordinate frame $O_f X_f Y_f Z_f$ 141 have the same directions as the body axes of the IMU 122. The roll, pitch, and yaw angles representing the orientation of the coordinate frame $O_f X_f Y_f Z_f$ 141 are therefore the same as the roll, pitch, and yaw angles representing the orientation of the IMU 122.

In one embodiment, the roll angle of the front frame 101, denoted as the angle $\phi_f$, is computed as the roll angle of the IMU 122, computed from measurements of the IMU 122. The pitch angle of the vector $\vec{P}_{12}$ is denoted as the angle $\theta_{P_{12}}$. In one embodiment, the angle $\theta_{P_{12}}$ is computed from GNSS measurements only and is independent of motor grader accelerations. In another embodiment, the angle $\theta_{P_{12}}$ is computed using GNSS measurements and measurements of the Y-gyro of the IMU 122. In this case, the dependence of the angle $\theta_{P_{12}}$ on motor grader accelerations is dependent on the sensitivity of the Y-gyro of the IMU 122 to accelerations; however, the sensitivity for high-end gyros is typically very low. The pitch angle of the front frame 101, denoted as the angle $\theta_f$, is computed as the pitch angle of the vector $\vec{P}_{12}$. This approach allows for computation of the pitch angle of the front frame in which the computation is independent of motor grader accelerations.

The yaw angle of the front frame 101, denoted as the angle $\psi_f$, is also referred to herein as the heading angle of the front frame. It is computed as the heading angle of the vector $\vec{P}_{12}$; further details are discussed below in reference to FIG. 8A and FIG. 8B.

Refer to FIG. 2D. The pitch angle $\theta_A^f$ of the A-frame 104 relative to the front frame 101 is defined as the pitch angle of the coordinate frame $O_A X_A Y_A Z_A$ 142 relative to the coordinate frame $O_f X_f Y_f Z_f$ 141. In one embodiment, the pitch angle $\theta_A^f$ is computed as a relative pitch angle between the IMU 122 and the IMU 123, computed from measurements obtained from the IMU 122 and the IMU 123. During accelerated motion of the motor grader, both the IMU 122 and the IMU 123 will measure the same acceleration due to the accelerated motion of the motor grader; therefore, the relative pitch angle between the IMU 122 and the IMU 123, computed from measurements obtained from the IMU 122 and the IMU 123, will be independent of accelerations of the motor grader.

In one embodiment, the blade elevation is computed relative to the GNSS antenna 120. In another embodiment, the blade elevation is computed relative to the GNSS antenna 121. In the examples herein, computation of the blade elevation relative to the GNSS antenna 120 is described.

Refer to FIG. 2A. The vector $\vec{P}_{23}^f$ is computed from the point $P_2$ to the point $P_3$ and resolved in the coordinate frame $O_f X_f Y_f Z_f$ 141. The vector $\vec{P}_{23}^f$ is constant relative to the coordinate frame $O_f X_f Y_f Z_f$ 141 and is measured during a calibration procedure.

Figure 4A:
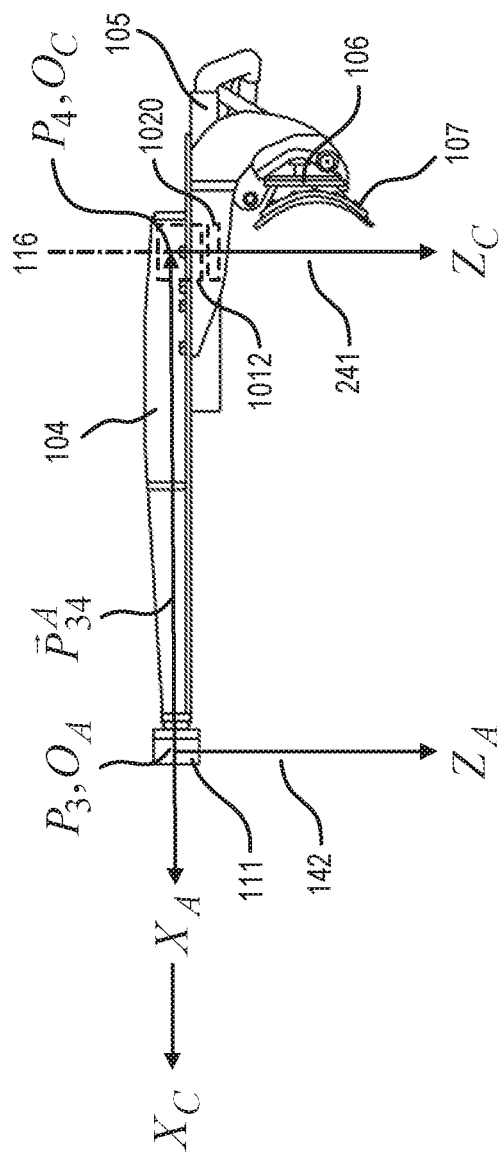
FIG. 4A shows a schematic view of a portion of the motor grader.

Refer to FIG. 4A. FIG. 4A shows a left side view of the A-frame 104, the circle 105, the blade support structure 106, and the blade 107. A portion of the circle 105 can be more clearly seen in the top view of FIG. 1E. The rotation axis 116 passes through the center of the circle/A-frame swivel joint 1012. The circle 105 can rotate relative to the A-frame 104 about the rotation axis 116. The blade 107 is coupled to the circle 105 by the blade support structure 106; the blade 107 rotates relative to the A-frame 104 together with the circle 105.

Figure 3E:
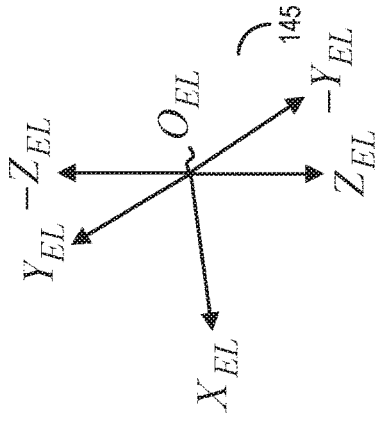
Figure 3F:
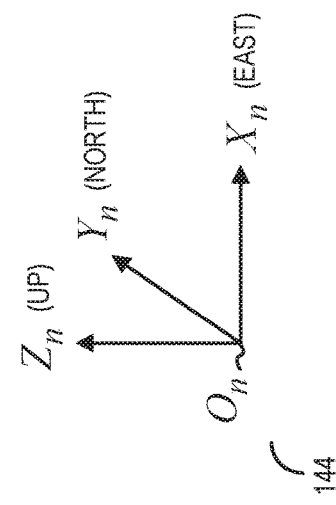
Figure 3G:
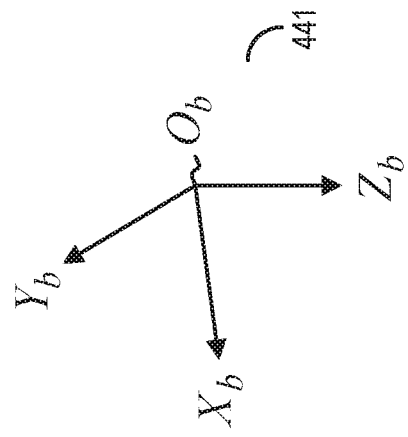

Refer to FIG. 3G. The coordinate frame $O_C X_C Y_C Z_C$ 241 is a Cartesian coordinate frame fixed relative to the circle 105. It is specified by the origin $O_C$, X-axis $X_C$, Y-axis $Y_C$, and Z-axis $Z_C$.

Refer to FIG. 4A. The intersection of the $X_A$-axis with the rotation axis 116 is denoted as the point $P_4$. The origin $O_C$ is fixed at the point $P_4$. For a zero rotation angle of the circle 105 relative to the A-frame 104, as shown in the figure, the $X_C$-axis lies along the $X_A$-axis and points along the same direction as the $X_A$-axis. The vector $\vec{P}_{34}^A$, resolved in the coordinate frame $O_A X_A Y_A Z_A$ 142, represents the location of the origin $O_C$ of the coordinate frame $O_C X_C Y_C Z_C$ 241 relative to the origin $O_A$ of the coordinate frame $O_A X_A Y_A Z_A$ 142. The vector $\vec{P}_{34}^A$ is constant relative to the coordinate frame $O_A X_A Y_A Z_A$ 142 and is measured during a calibration procedure.

Figure 4B:
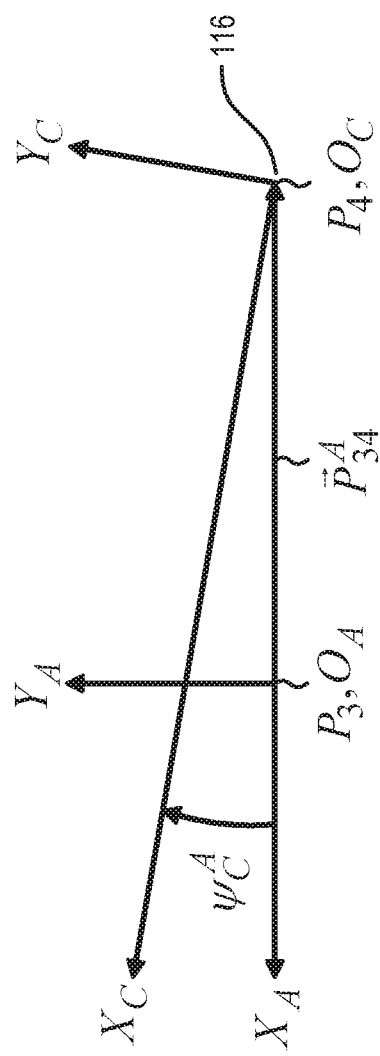
FIG. 4B shows a schematic view of the blade heading angle geometry.

Refer to FIG. 4B (top view). The heading angle $\psi_C^A$ of the blade 107 relative to the A-frame 104 is also referred to herein as the blade angle or the blade rotation angle. The blade rotation angle is defined as the yaw angle of the coordinate frame $O_C X_C Y_C Z_C$ 241 relative to the coordinate frame $O_A X_A Y_A Z_A$ 142. For a zero blade rotation angle, the orientation of the axes of the coordinate frame $O_C X_C Y_C Z_C$ 241 is the same as the orientation of the axes of the coordinate frame $O_A X_A Y_A Z_A$ 142.

In one embodiment, the blade rotation angle is computed as a relative yaw angle between the IMU 123 and the IMU 124, computed from measurements obtained from the IMU 123 and the IMU 124 (FIG. 2A). In other embodiments, the blade rotation angle can be measured by other sensors, such as the rotation sensor 1020, installed on the circle/A-frame swivel joint 1012 (FIG. 4A). Examples of rotation sensors include a potentiometric rotary encoder and a magnetic rotary encoder.

Refer to FIG. 5A-FIG. 5D. FIG. 5A shows a front view of the motor grader 100; FIG. 5A-FIG. 5D illustrate the blade side shift geometry. Refer to FIG. 5A. As previously discussed with reference to FIG. 2B, the cutting edge 107B of the blade 107 is the bottom edge of the front side 107F of the blade 107. The point $P_6$ is defined as the intersection of the cutting edge 107FB and the plane $Y_C$=0. As previously discussed with reference to FIG. 2B, the point $P_7$ is defined as the midpoint of the cutting edge 107FB. The point $P_{7L,0}$ represents the left endpoint of the cutting edge 107FB prior to the blade side shift (as previously discussed, left and right directions are specified relative to the perspective of the operator sitting in the cabin). The point $P_{7R,0}$ represents the right endpoint of the cutting edge 107FB prior to the blade side shift. The point $P_{7L}$ represents the left endpoint of the cutting edge 107FB after the blade side shift. The point $P_{7R}$ represents the right endpoint of the cutting edge 107FB after the blade side shift.

Refer to FIG. 5B. The vector $\overrightarrow{SS}$ represents the side shift of the blade 107 relative to the origin $O_C$ of the coordinate frame $O_C X_C Y_C Z_C$ 241. The vector $\overrightarrow{SS}$ is represented by the vector from the point $P_{7L,0}$ to the point $P_{7L}$. In one embodiment, the length of the vector $\overrightarrow{SS}$ is measured with the stroke sensor 1028 installed on the blade side shift hydraulic cylinder 1026 (FIG. 5E). The blade side shift hydraulic cylinder 1026 controls the length of the vector $\overrightarrow{SS}$.

The vector $\vec{P}_{67L,0}^C$, resolved in the coordinate frame $O_C X_C Y_C Z_C$ 241, represents the location of the point $P_{7L,0}$, the left endpoint of the cutting edge 107FB prior to the blade side shift, relative to the point $P_6$. The vector $\vec{P}_{67L,0}^C$ is constant relative to the coordinate frame $O_C X_C Y_C Z_C$ 241 and is measured during a calibration procedure.

The vector $\vec{P}_{67R,0}^C$, resolved in the coordinate frame $O_C X_C Y_C Z_C$ 241, represents the location of the point $P_{7R,0}$, the right endpoint of the cutting edge 107FB prior to the blade side shift, relative to the point $P_6$. The vector $\vec{P}_{67R,0}^C$ is constant relative to the coordinate frame $O_C X_C Y_C Z_C$ 241 and is measured during a calibration procedure.

Refer to FIG. 5C. The vector $\vec{P}_{67L}{}^C$, resolved in the coordinate frame $O_C X_C Y_C Z_C$ 241, represents the location of the point $P_{7L}$, the left endpoint of the cutting edge 107FB after the blade side shift, relative to the point $P_6$. The vector $\vec{P}_{67L}{}^C$ is computed as follows:

$$\vec{P}_{67L}{}^C = \vec{P}_{67L,0}{}^C + \vec{SS}. \tag{E2}$$

The vector $\vec{P}_{67R}{}^C$, resolved in the coordinate frame $O_C X_C Y_C Z_C$ 241, represents the location of the point $P_{7R}$, the right endpoint of the cutting edge 107FB after the blade side shift, relative to the point $P_6$. The vector $\vec{P}_{67R}{}^C$ is computed as follows:

$$\vec{P}_{67R}{}^C = \vec{P}_{67R,0}{}^C + \vec{SS}. \tag{E3}$$

The vector $\vec{P}_{46}{}^C$, resolved in the coordinate frame $O_C X_C Y_C Z_C$ 241, represents the location of the point $P_6$ relative to the point $P_4$. This vector changes with the blade pitch rotation relative to the circle 105, defined as rotation about the $Y_C$-axis, and is independent of the blade side shift. An algorithm for computation of the vector $\vec{P}_{46}{}^C$ is described below.

The vector $\vec{P}_{47}{}^C$, resolved in the coordinate frame $O_C X_C Y_C Z_C$ 241, represents the location of the point $P_{7L}$, the left endpoint of the cutting edge 107FB after the blade side shift, relative to the point $P_4$. The vector $\vec{P}_{47L}{}^C$ is computed as follows:

$$\vec{P}_{47L}{}^C = \vec{P}_{46}{}^C + \vec{P}_{67L}{}^C. \tag{E4}$$

The vector $\vec{P}_{47R}{}^C$, resolved in the coordinate frame $O_C X_C Y_C Z_C$ 241, represents the location of the point $P_{7R}$, the right endpoint of the cutting edge 107FB after the blade side shift, relative to the point $P_4$. The vector $\vec{P}_{47R}{}^C$ is computed as follows:

$$\vec{P}_{47R}{}^C = \vec{P}_{46}{}^C + \vec{P}_{67R}{}^C. \tag{E5}$$

The vector $\vec{P}_{47}{}^C$, resolved in the coordinate frame $O_C X_C Y_C Z_C$ 241, represents the location of the midpoint $P_7$ of the cutting edge 107FB relative to the point $P_4$. The vector $\vec{P}_{47}{}^C$ is computed as follows:

$$\vec{P}_{47}{}^C = \vec{P}_{46}{}^C + \vec{SS}. \tag{E6}$$

Refer to FIG. 5D. The vector $\vec{P}_{7L7R}{}^C$, resolved in the coordinate frame $O_C X_C Y_C Z_C$ 241, represents the cutting edge 107FB. The vector $\vec{P}_{7L7R}{}^C$ is computed as follows:

$$\vec{P}_{7L7R}{}^C = \vec{P}_{47R}{}^C - \vec{P}_{47L}{}^C. \tag{E7}$$

Depending on the application, either the midpoint of the cutting edge 107FB or the pair of the left and right endpoints of the cutting edge 107FB can be used for blade elevation control. Accordingly, either the vector $\vec{P}_{47}{}^C$ or the pair of vectors $\vec{P}_{47L}{}^C$ and $\vec{P}_{47R}{}^C$ can be used in the blade elevation control algorithm. The vector $\vec{P}_{7L7R}{}^C$ can be used in the blade side shift control algorithm and in the blade slope angle control algorithm. The control algorithms are discussed below.

Refer to FIG. 6A-FIG. 6D. FIG. 6A and FIG. 6C show left side views of the A-frame 104, the circle 105, the blade support structure 106, and the blade 107; FIG. 6A-FIG. 6D illustrate the geometry of the blade pitch rotation.

Figure 3H:
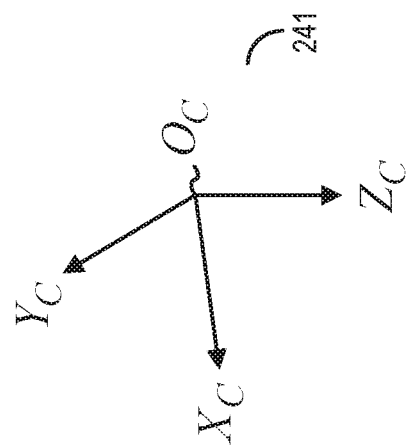

Refer to FIG. 3H. The coordinate frame $O_b X_b Y_b Z_b$ 441 is a Cartesian coordinate frame fixed relative to the blade support structure 106. It is specified by the origin $O_b$, X-axis $X_b$, Y-axis $Y_b$, and Z-axis $Z_b$.

Refer to FIG. 6A. The blade 107 rotates about the axis of the pivot joint 1013. The rotation axis of the pivot joint 1013 is the blade pitch rotation axis. The point $P_5$ represents the intersection of the blade pitch rotation axis and the plane $Y_C=0$. The origin $O_b$ of the coordinate frame $O_b X_b Y_b Z_b$ 441 is fixed at the point $P_5$, and the axes of the coordinate frame $O_b X_b Y_b Z_b$ 441 are parallel to the body axes of the IMU 124. The orientation of the axes of the coordinate frame $O_b X_b Y_b Z_b$ 441 is the same as the orientation of the blade 107. The blade pitch rotation is defined as the rotation of the blade about the $Y_b$-axis.

Figure 6E:
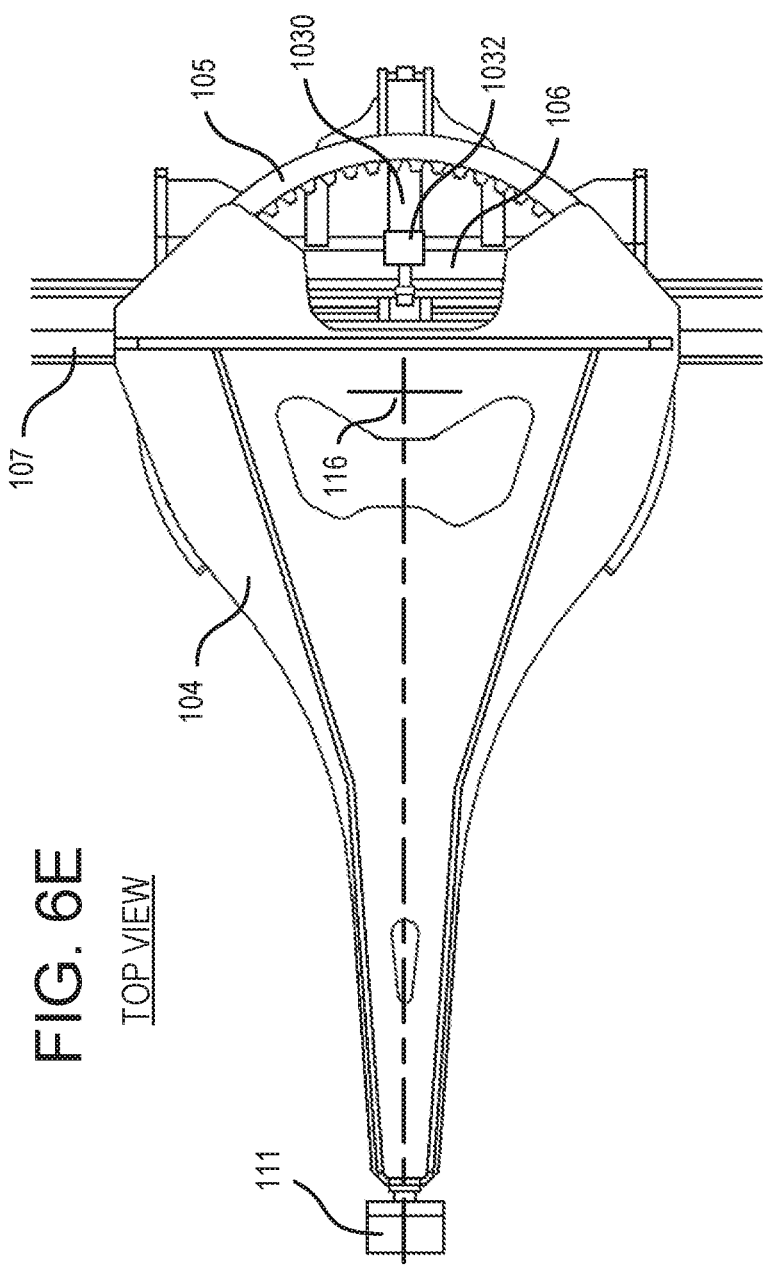
FIG. 6E shows a schematic view of the blade pitch rotation hydraulic cylinder and stroke sensor.

Refer to FIG. 6C. FIG. 6C shows the blade 107 rotated through a non-zero pitch angle relative to the A-frame 104. The pitch angle $\theta_b{}^C$ of the blade 107 relative to the A-frame 104 is defined as the pitch angle of the coordinate frame $O_b X_b Y_b Z_b$ 441 relative to the coordinate frame $O_C X_C Y_C Z_C$ 241. (In FIG. 6C, the $X'_C$-axis is the same as the $X_C$-axis, except the origin of the $X'_C$-axis is shifted to the point $P_5$.) In one embodiment, the pitch angle $\theta_b{}^C$ of the blade 107 relative to the A-frame 104 is computed as a relative pitch angle between the IMU 123 and the IMU 124, computed from measurements obtained from the IMU 123 and the IMU 124. During accelerated motions of the motor grader, both the IMU 123 and the IMU 124 will measure the same acceleration due to the motor grader accelerated motion; therefore, the relative pitch angle between the IMU 123 and the IMU 124, computed from measurements obtained from the IMU 123 and the IMU 124, will be independent of motor grader accelerations. In another embodiment, the pitch angle $\theta_b{}^C$ of the blade 107 relative to the A-frame 104 can be computed from measurements obtained from the stroke sensor 1032 installed on the blade pitch rotation hydraulic cylinder 1030 (FIG. 6E). The pitch angle $\theta_b{}^C$ is varied by varying the stroke of the blade pitch rotation hydraulic cylinder 1030. Therefore, measurements of the stroke of the blade pitch rotation hydraulic cylinder provide measurements of the pitch angle.

Refer to FIG. 6D. The vector $\vec{P}_{45}{}^C$, resolved in the coordinate frame $O_C X_C Y_C Z_C$ 241, represents the location of the point $P_5$ relative to the origin $O_C$ of the coordinate frame $O_C X_C Y_C Z_C$ 241. The vector $\vec{P}_{45}{}^C$ is constant relative to the coordinate frame $O_C X_C Y_C Z_C$ 241 and is measured during a calibration procedure.

Refer to FIG. 6B. The vector $\vec{P}_{45}{}^b$, resolved in the coordinate frame $O_b X_b Y_b Z_b$ 441, represents the location of the point $P_6$ relative to the point $P_5$. The length of the vector $\vec{P}_{56}{}^b$ is equal to the radius of the circle described by the cutting edge 107FB during blade pitch rotation. The vector $\vec{P}_{56}{}^b$ is constant relative to the coordinate frame $O_b X_b Y_b Z_b$ 441 and is measured during a calibration procedure.

Refer to FIG. 6D. The vector $\vec{P}_{56}{}^C$, resolved in the coordinate frame $O_C X_C Y_C Z_C$ 241, is computed as follows:

$$\vec{P}_{56}{}^C = R_b{}^C \vec{P}_{56}{}^C, \tag{E8}$$

where $R_b{}^C$ represents the rotation matrix for coordinate transformation from the coordinate frame $O_b X_b Y_b Z_b$ 441 to the coordinate frame $O_C X_C Y_C Z_C$ 241.

In one embodiment, elements of the rotation matrix $R_b{}^C$ are computed from Euler angles, including the roll angle $\phi_b{}^C$, the pitch angle $\theta_b{}^C$, and the yaw angle $\psi_b{}^C$, that describe the orientation of the coordinate frame $O_bX_bY_bZ_b$ 441 relative to the coordinate frame $O_CX_CY_CZ_C$ 241. The $Y_C$-axis and the $Y_b$-axis are always parallel to each other; therefore, the roll angle $\phi_b{}^C$ and the yaw angle $\psi_b{}^C$ are always equal to zero. The pitch angle $\theta_b{}^C$ can be computed as described above.

The vector $\vec{P}_{46}{}^C$, resolved in the coordinate frame $O_C$-$X_CY_CZ_C$ 241, represents the location of the point $P_6$ relative to the origin $O_C$ of the coordinate frame $O_CX_CY_CZ_C$ 241. The vector $\vec{P}_{46}{}^C$ is computed as follows:

$$\vec{P}_{46}{}^C = \vec{P}_{45}{}^C + \vec{P}_{56}{}^C. \tag{E9}$$

Refer to FIG. 7A and FIG. 7B. FIG. 7A shows a left side view of the A-frame 104, the circle 105, the blade support structure 106, and the blade 107; FIG. 7A and FIG. 7B illustrate the computation of the location of the midpoint $P_7$ of the cutting edge 107FB relative to the origin $O_A$ of the coordinate frame $O_AX_AY_AZ_A$ 142.

Refer to FIG. 7B. The vector $\vec{P}_{34}{}^C$, resolved in the coordinate frame $O_AX_AY_AZ_A$ 142, represents the location of the origin $O_C$ of the coordinate frame $O_CX_CY_CZ_C$ 241 relative to the origin $O_A$ of the coordinate frame $O_AX_AY_AZ_A$ 142. The vector $\vec{P}_{34}{}^A$ is constant relative to the coordinate frame $O_AX_AY_AZ_A$ 142 and is measured during a calibration procedure.

The vector $\vec{P}_{47}{}^A$, resolved in the coordinate frame $O_A$-$X_AY_AZ_A$ 142, represents the location of the midpoint $P_7$ of the cutting edge 107FB relative to the origin $O_C$ of the coordinate frame $O_CX_CY_CZ_C$ 241. The vector $\vec{P}_{47}{}^A$ is computed as follows:

$$\vec{P}_{47}{}^C = R_C{}^A \vec{P}_{47}{}^C, \tag{E10}$$

where $R_C{}^A$ represents the rotation matrix for the coordinate transformation from the coordinate frame $O_CX_CY_CZ_C$ 241 to the coordinate frame $O_AX_AY_AZ_A$ 142. Computation of the vector $\vec{P}_{47}{}^C$ was described previously.

The vector $\vec{P}_{37}{}^A$, resolved the coordinate frame $O_A$-$X_AY_AZ_A$ 142, represents the location of the midpoint $P_7$ of the cutting edge 107FB relative to the origin $O_A$ of the coordinate frame $O_AX_AY_AZ_A$ 142. The vector $\vec{P}_{37}{}^A$ is computed as follows:

$$\vec{P}_{37}{}^A = \vec{P}_{34}{}^A + \vec{P}_{47}{}^A. \tag{E11}$$

The vector $\vec{P}_{37}{}^f$ (not shown), resolved in the coordinate frame $O_fX_fY_fZ_f$ 141, is computed as follows:

$$\vec{P}_{37}{}^A = R_A{}^f \vec{P}_{37}{}^A, \tag{E12}$$

where $R_A{}^f$ represents the rotation matrix for coordinate transformation from the coordinate frame $O_AX_AY_AZ_A$ 142 to the coordinate frame $O_fX_fY_fZ_f$ 141.

Refer to FIG. 8A and FIG. 8B. FIG. 8A shows a top view (articulated) of the motor grader 100; FIG. 8A and FIG. 8B illustrate the computation of the heading angle of the front frame 101. Refer to FIG. 8B. The heading angle $\psi_f$ of the front frame 101 is defined as the yaw angle of the coordinate frame $O_fX_fY_fZ_f$ 141 relative to the local navigation coordinate frame $O_nX_nY_nZ_n$ 144.

As discussed above, two main types of articulated motor graders can be distinguished, depending on the location of the articulation joint: motor graders with the articulation joint in front of the cabin, and motor graders with the articulation joint behind the cabin. (Note: "In front of the cabin" and "behind the cabin" follow standard industry terminology; however, "towards the front of the cabin" and "towards the rear of the cabin" are more accurate descriptors.) For a motor grader with the articulation joint in front of the cabin, the cabin is fixed relative to the rear frame under articulation rotations. For a motor grader with the articulation joint behind the cabin, the cabin is fixed relative to the front frame under articulation rotations. In the embodiment shown in FIG. 8A, the motor grader 100 includes the front frame 101, the cabin 102, and the rear frame 103. The articulation joint 115-R is behind the cabin 102. In an embodiment, the articulation angle (angle of rotation about the articulation joint 115-R) is measured by the sensor 1022 installed on the articulation joint 115-R. In one embodiment, a potentiometric rotation sensor is used. Other types of sensors can be used.

For either of the two motor grader types, in the System Configuration 1, with two GNSS antennas (GNSS antenna 120 and GNSS antenna 121) installed on the top side of the front frame 101, the heading of the front frame is the same as the heading of the vector $\vec{P}_{12}{}''$. Therefore, the heading angle $\psi_f$ of the front frame 101 can be computed as the heading angle of the vector $\vec{P}_{12}{}''$. The vector $\vec{P}_{12}{}''$, described above in reference to FIG. 2C, is also shown in FIG. 8B.

For automated grading applications, the position and the heading angle of the blade should be known relative to a digital job site model. Computation of the heading angle of the blade is first discussed. Computation of the position of the blade is discussed further below.

In one embodiment, the heading angle of the blade is computed as follows:

$$\psi_b = \psi_b{}^f + \omega_f, \tag{E13}$$

where:

$\psi_b$ is the heading angle of the blade 107 relative to the coordinate frame $O_nX_nY_nZ_n$ 144;

$\psi_b{}^f$ is the heading angle of the blade 107 relative to the coordinate frame $O_fX_fY_fZ_f$ 141; and $\psi_f$ is the heading angle of the front frame 101 relative to the coordinate frame $O_nX_nY_nZ_n$ 144.

The computation of the angle $\psi_f$ for the System Configuration 1 was described previously. Algorithms for computation of the angle $\psi_b{}^f$ are described below.

In one embodiment, the angle $\psi_b{}^f$ is computed as a relative heading angle between the IMU 122 and the IMU 124, computed from measurements obtained from the IMU 122 and the IMU 124.

In another embodiment, the angle $\psi_b{}^f$ is computed as follows:

$$\psi_b{}^f = \psi_b{}^A + \psi_A{}^f, \tag{E14}$$

where:

$\psi_b{}^A$ is the heading angle of the blade 107 relative to the coordinate frame $O_AX_AY_AZ_A$ 142; and $\psi_A{}^f$ is the heading angle of the A-frame 104 relative to the coordinate frame $O_fX_fY_fZ_f$ 141.

The angle $\psi_b{}^A$ is computed as follows:

$$\psi_b{}^A = \psi_b{}^C + \psi_C{}^A, \tag{E15}$$

where:

$\psi_b{}^C$ is the heading angle of the blade 107 relative to the coordinate frame $O_CX_CY_CZ_C$ 241; and $\psi_C{}^A$ is the heading angle of the coordinate frame $O_C$-$X_CY_CZ_C$ 241 relative to the coordinate frame $O_AX_AY_AZ_A$ 142.

The $Y_C$-axis and the $Y_b$-axis are always parallel to each other; therefore, the angle $\psi_b^C$ is always equal to zero. In one embodiment, the angle $\psi_C^A$ is computed as a relative heading angle between the IMU 123 and the IMU 124, computed from measurements obtained from the IMU 123 and the IMU 124. In one embodiment, the angle $\psi_A^f$ is computed as a relative heading angle between the IMU 122 and the IMU 123, computed from measurements obtained from the IMU 122 and the IMU 123. In another embodiment, the angle $\psi_A^f$ can be computed from measurements obtained from the stroke sensor 1024 installed on the drawbar hydraulic cylinder 110 (FIG. 2A). The heading angle of the A-frame relative to the front frame is varied by varying the stroke of the drawbar hydraulic cylinder. Therefore, measurements of the stroke of the drawbar hydraulic cylinder provide measurements of the heading angle of the A-frame relative to the front frame. The heading angle of the blade relative to the front frame can be computed from the heading angle of the A-frame relative to the front frame and the blade rotation angle (which is the heading angle of the blade relative to the A-frame).

As discussed above, depending on the application, either the midpoint of the cutting edge of the blade or the pair of the left and right endpoints of the cutting edge of the blade can be used for blade elevation control. In one embodiment, a vector representation of the position of the midpoint of the cutting edge in the local navigation frame is used for blade elevation control.

A vector describing the position of the midpoint of the cutting edge of the blade relative to the origin of the local navigation frame, for System Configuration 1, is computed as follows.

In one embodiment, the position of the midpoint of the cutting edge of the blade in the local navigation frame is computed relative to the phase center of the GNSS antenna 121, installed on the top side of the front frame 101. In another embodiment, the position of the midpoint of the cutting edge of the blade in the local navigation frame is computed relative to the phase center of the GNSS antenna 120, installed on the top side of the front frame 101. Herein, computation of the position of the midpoint of the cutting edge of the blade in the local navigation frame relative to the phase center of the GNSS antenna 120, installed on the top side of the front frame 101, is discussed. Computation of the position of the midpoint of the cutting edge of the blade in the local navigation frame relative to the phase center of the GNSS antenna 121, installed on the top side of the front frame 101, can be performed in a similar fashion.

Refer to FIG. 2A. Computation of the vector $\vec{P}_{37}^f$ (not shown) was described previously. The vector $\vec{P}_{23}^f$ is constant relative to the coordinate frame $O_fX_fY_fZ_f$ 141 and is measured during a calibration procedure. The vector $\vec{P}_{27}^f$, resolved in the coordinate frame $O_fX_fY_fZ_f$ 141, represents the location of the point $P_7$, the midpoint of the cutting edge 107FB, relative to the point $P_2$, the phase center of the GNSS antenna 120. The vector $\vec{P}_{27}^f$ is computed as follows:

$$\vec{P}_{27}^f = \vec{P}_{23}^f + \vec{P}_{37}^f. \tag{E16}$$

The vector $\vec{P}_{27}^n$ (FIG. 2C), resolved in the coordinate frame $O_nX_nY_nZ_n$ 144, is computed as follows:

$$\vec{P}_{27}^n = R_f^n \vec{P}_{27}^f, \tag{E17}$$

where $R_f^n$ represents the rotation matrix for the coordinate transformation from the coordinate frame $O_fX_fY_fZ_f$ 141 to the coordinate frame $O_nX_nY_nZ_n$ 144.

The location of the point $P_2$, the phase center of the GNSS antenna 120, relative to the origin of the coordinate frame $O_nX_nY_nZ_n$ 144, is represented by the vector $\vec{P}_2^n$. The location of the point $P_7$, the midpoint of the cutting edge 107FB, relative to the origin $O_n$ of the coordinate frame $O_nX_nY_nZ_n$ 144 is represented by the vector $\vec{P}_7^n$. The vector $\vec{P}_7^n$ is computed as follows:

$$\vec{P}_7^n = \vec{P}_2^n + \vec{P}_{27}^n. \tag{E18}$$

If the midpoint of the cutting edge is used for blade elevation control, then the vector $\vec{P}_7^n$ is used in the blade elevation control algorithm. If the pair of the left and right endpoints of the cutting edge is used for blade elevation control, a pair of vectors $\vec{P}_{7L}^n$ and $\vec{P}_{7R}^n$, computed in a fashion similar to the computation of the vector $\vec{P}_7^n$, is used in the blade elevation control algorithm.

The blade roll angle, denoted as $\phi_b$ and also referred to herein as the blade slope angle, is defined as the roll angle of the coordinate frame $O_bX_bY_bZ_b$ 441 relative to the coordinate frame $O_nX_nY_nZ_n$ 144. The blade roll angle is the same as the roll angle of the IMU 124 and can be computed from measurements of the IMU 124. The blade roll angle $\phi_b$ is used in the blade slope angle control algorithm described further below.

System Configuration 2 is now described. Refer to FIG. 9A. FIG. 9A shows a left side view of the motor grader 100 with sensors outfitted in the System Configuration 2. The difference between the System Configuration 2 and the System Configuration 1 lies in the location of installation of the GNSS antenna 121. In the System Configuration 1 (FIG. 2A), the GNSS antenna 121 is mounted on the top side of the front frame 101. In the System Configuration 2, however, the GNSS antenna 121 is mounted on the cabin roof top 102R.

Computation of the vector $\vec{P}_{12}$ in the System Configuration 2 is performed according to algorithms similar to the ones used in the System Configuration 1. The differences between the algorithms for computation of the pitch angle of the front frame in the System Configuration 2 and the respective algorithms used in the System Configuration 1 are discussed below.

The pitch angle of the front frame 101, denoted as the angle $\theta_f$, is computed relative to the pitch angle of the vector $\vec{P}_{12}$ as follows. The angle $d\theta_{P_{12}X_f}$ is defined as the angle between the vector $\vec{P}_{12}$ and the $X_f$-axis of the coordinate frame $O_fX_fY_fZ_f$ 141. This angle has a constant value and is measured during a calibration procedure.

The pitch angle of the vector $\vec{P}_{12}$ is denoted as the angle $\theta_{P_{12}}$. In one embodiment, the angle $\theta_{P_{12}}$ is computed from GNSS measurements only and is independent of motor grader accelerations. In another embodiment, the angle $\theta_{P_{12}}$ is computed using GNSS measurements and measurements of the Y-gyro of the IMU 122. In this case, the dependence of the angle $\theta_{P_{12}}$ on motor grader accelerations is dependent on the sensitivity of the Y-gyro of the IMU 122 to accelerations; however, the sensitivity for high-end gyros is typically very low.

The pitch angle of the front frame 101 is computed as follows:

$$\theta_f = \theta_{P_{12}} + d\theta_{P_{12}X_f}. \tag{E19}$$

This approach allows for computation of the pitch angle of the front frame, in which the computation is independent of motor grader accelerations.

Computation of the vector $\vec{P}_7{}^n$, illustrated in FIG. 9B, is performed in the System Configuration 2 in the same fashion as in the System Configuration 1, previously described above.

Refer to FIG. 10A and FIG. 10B. FIG. 10A shows a top view (articulated) of the motor grader 100; FIG. 10A and FIG. 10B illustrate the computation of the heading angle of the front frame 101 in the System Configuration 2. The articulation joint 115-R is behind the cabin 102. In an embodiment, the articulation angle (angle of rotation about the articulation joint 115-R) is measured by the sensor 1022 installed on the articulation joint 115-R. In one embodiment, a potentiometric rotation sensor is used. Other types of sensors can be used.

For a motor grader with the articulation joint behind the cabin, the heading angle $\psi_f$ of the front frame 101 can be computed as the heading angle of the vector $\vec{P}_{12}$, as illustrated in FIG. 10B. For a motor grader with the articulation joint behind the cabin, the computation of the heading angle of the front frame 101 in the System Configuration 2 is performed according to algorithms similar to the ones used in the System Configuration 1 described above.

In the System Configuration 2, for a motor grader with the articulation joint in front of the cabin, however, the heading angle of the front frame 101 cannot, in the general case for arbitrary locations of installation of the GNSS antenna 121 on the cabin roof top 102R, be computed as the heading angle of the vector $\vec{P}_{12}$.

Special cases of the location of the installation of the GNSS antenna 121 on the cabin roof top can be considered for a motor grader with the articulation joint in front of the cabin. Refer to FIG. 11A and FIG. 11B. FIG. 11A shows a top view (articulated) of the motor grader 100; FIG. 11A and FIG. 11B illustrate the computation of the heading angle of the front frame 101 in the System Configuration 2. The articulation joint 115-F is in front of the cabin 102. In an embodiment, the articulation angle (angle of rotation about the articulation joint 115-F) is measured by the sensor 1022 installed on the articulation joint 115-F. In one embodiment, a potentiometric rotation sensor is used. Other types of sensors can be used.

The point $P_1$, the phase center of the GNSS antenna 121, is positioned along the rotational axis of the articulation joint 115-F. In this case, the heading angle $\psi_f$ of the front frame 101 can be computed as the heading angle of the vector $\vec{P}_{12}$, as illustrated in FIG. 11B, for any articulation rotation.

In general, the GNSS antenna 121 can be installed at an arbitrary location on the cabin roof top. Refer to FIG. 12A and FIG. 12B. FIG. 12A shows a top view (articulated) of the motor grader 100; FIG. 12A and FIG. 12B illustrate the computation of the heading angle of the front frame 101 in the System Configuration 2. The articulation joint 115-F is in front of the cabin 102. The point $P_1$, the phase center of the GNSS antenna 121, is positioned away from the rotational axis of the articulation joint 115-F.

Refer to FIG. 12B. The articulation angle, denoted as $\psi_f{}^r$, is defined as the heading angle of the front frame 101 relative to the coordinate frame $O_r X_r Y_r Z_r$ 143. The articulation angle $\psi_f{}^r$ can be measured by the sensor 1022 installed on the articulation joint 115-F.

The heading angle $\psi_r$ of the rear frame 103 is defined as the heading angle of the coordinate frame $O_r X_r Y_r Z_r$ 143 relative to the coordinate frame $O_n X_n Y_n Z_n$ 144. The heading angle $\psi_r$ can be computed as the heading angle of the vector of the GNSS velocity $\vec{V}_{GNSS}{}^n$, resolved in the coordinate frame $O_n X_n Y_n Z_n$ 144, computed from measurements obtained from the GNSS antenna 121.

The heading angle $\psi_f$ of the front frame 101 is computed as follows:

$$\psi_f = \psi_f{}^r + \psi_r. \quad (E20)$$

The rest of the algorithms related to computation of the vector representation of the blade position, used for blade elevation control in the System Configuration 2, are the same as the respective algorithms used in the System Configuration 1. The algorithms of computation of the blade slope angle, used for blade slope angle control in the System Configuration 2, are the same as the respective algorithms used in the System Configuration 1. The algorithms related to computation of the blade side shift, used for blade-side shift control in the System Configuration 2, are the same as the respective algorithms used in the System Configuration 1.

Figure 13A:
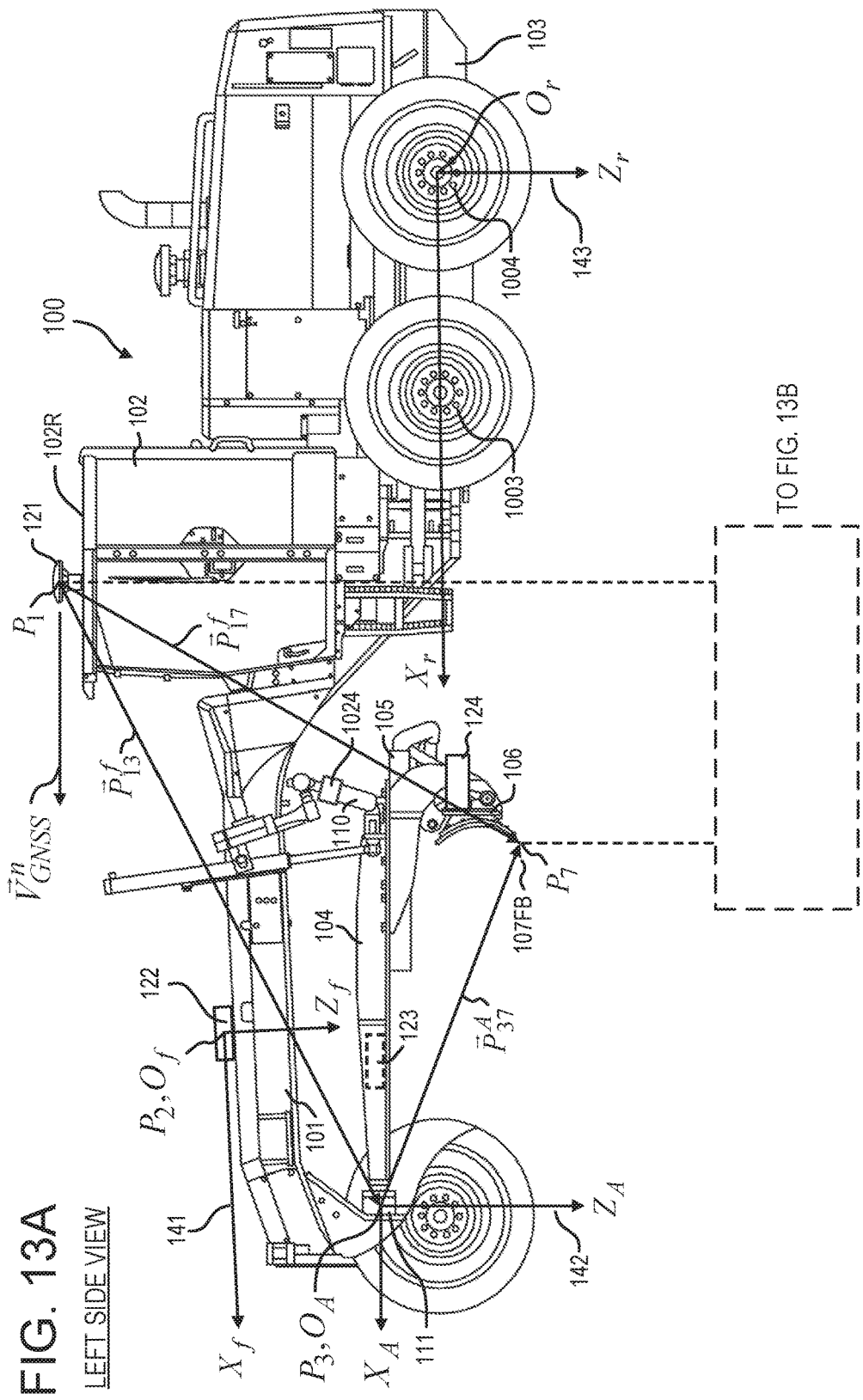
FIG. 13A-FIG. 13C show schematic views of a motor grader outfitted with sensors in a third system configuration.

System Configuration 3 is now described. Refer to FIG. 13A. FIG. 13A shows a left side view of the motor grader 100 with sensors outfitted in the System Configuration 3. In the System Configuration 3, a single GNSS antenna is used. In various embodiments, the single GNSS antenna can be mounted either on the front frame or on the cabin roof top. In the embodiment shown in FIG. 13A, the GNSS antenna 121 is mounted on the cabin roof top 102R.

The origin $O_f$ of the coordinate frame $O_f X_f Y_f Z_f$ 141 is fixed at the origin of the body axes of the IMU 122. The vector $\vec{P}_{13}{}^f$, resolved in the coordinate frame $O_f X_f Y_f Z_f$ 141, represents the location of the point $P_3$ relative to the point $P_1$. For a motor grader with the articulation joint behind the cabin, the vector $\vec{P}_{13}{}^f$ is constant relative to the coordinate frame $O_f X_f Y_f Z_f$ 141 and is measured during a calibration procedure. For a motor grader with the articulation joint in front of the cabin, the vector $\vec{P}_{13}{}^f$ is constant relative to the coordinate frame $O_f X_f Y_f Z_f$ 141, if the GNSS antenna 121 is mounted above the articulation joint; in this instance, the vector $\vec{P}_{13}{}^f$ is measured during a calibration procedure.

The vector $\vec{P}_{17}{}^f$, resolved in the coordinate frame $O_f X_f Y_f Z_f$ 141, represents the location of the point $P_7$, the midpoint of the cutting edge 107FB, relative to the point $P_1$.

The differences in the algorithms for computation of the pitch angle of the front frame in the System Configuration 3 and the respective algorithms used in the System Configuration 2 are the following. The pitch angle of the front frame 101, denoted as the angle $\theta_f$, is computed relative to the pitch angle of the vector of GNSS velocity $\vec{V}_{GNSS}{}^n$, resolved in the coordinate frame $O_n X_n Y_n Z_n$ 144. The angle $\theta_f$ is computed from measurements obtained from the GNSS antenna 121 according to the following algorithm.

Figure 13B:
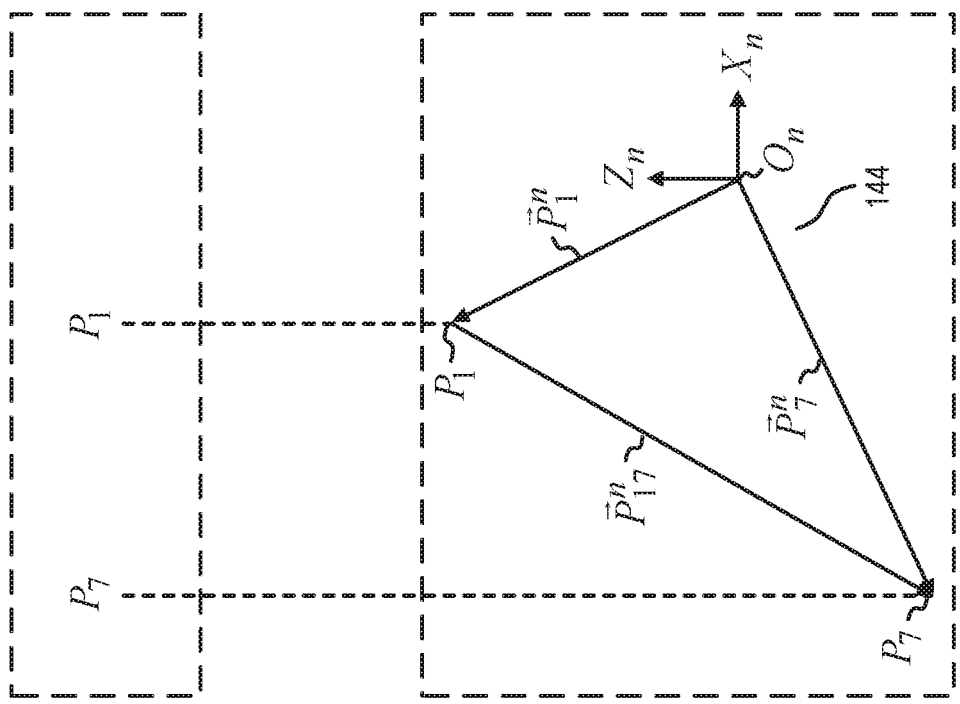
Figure 13C:
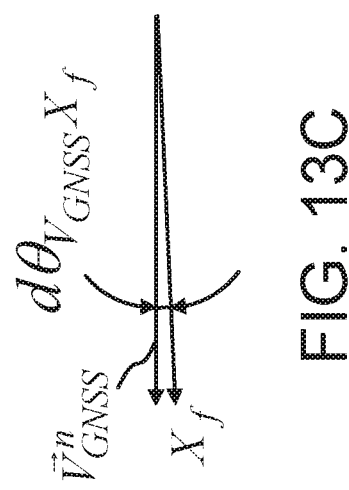

Refer to FIG. 13C. The angle $d\theta_{V_{GNSS} X_f}$ is defined as the angle between the vector $\vec{V}_{GNSS}{}^n$ and the $X_f$-axis of the coordinate frame $O_f X_f Y_f Z_f$ 141. This angle has a constant value and is measured during a calibration procedure. The pitch angle of the vector of GNSS velocity $\vec{V}_{GNSS}{}^n$ is denoted as the angle $\theta_{V_{GNSS}}$; the angle $\theta_{V_{GNSS}}$ is independent of motor grader accelerations.

The pitch angle $\theta_f$ of the front frame 101 is computed as follows:

$$\theta_f = \theta_{V_{GNSS}} + d\theta_{V_{GNSS} X_f}. \quad (E21)$$

This approach allows for computation of the pitch angle of the front frame, in which the computation is independent of motor grader accelerations.

The differences between the algorithms for computation of the vector representation of the blade position used for blade elevation control in the System Configuration 3 and the respective algorithms used in the System Configuration 2 are the following. Computation of the vector $\vec{P}_{37}{}^f$ is performed in a way similar to the one in the System Configuration 1. The vector $\vec{P}_{17}{}^f$ is computed as follows:

$$\vec{P}_{17}{}^f = \vec{P}_{13}{}^f + \vec{P}_{37}{}^f. \tag{E22}$$

Refer to FIG. 13B. The vector $\vec{P}_{17}{}^n$, resolved in the coordinate frame $O_n X_n Y_n Z_n$ 144, is computed as follows:

$$\vec{P}_{17}{}^n = R_f^n \vec{P}_{17}{}^f, \tag{E23}$$

where $R_f^n$ represents the rotation matrix for coordinate transformation from the coordinate frame $O_f X_f Y_f Z_f$ 141 to the coordinate frame $O_n X_n Y_n Z_n$ 144.

The location of the point $P_1$, the phase center of the GNSS antenna 121, relative to the origin $O_n$ of the local navigation frame $O_n X_n Y_n Z_n$ 144 is represented by the vector $\vec{P}_1{}^n$.

The location of the midpoint of the cutting edge of the blade relative to the origin $O_n$ of the local navigation frame $O_n X_n Y_n Z_n$ 144 is represented by the vector $\vec{P}_7{}^n$. The vector $\vec{P}_7{}^n$, is computed as follows:

$$\vec{P}_7{}^n = \vec{P}_1{}^n + \vec{P}_{17}{}^n. \tag{E24}$$

Refer to FIG. 14A and FIG. 14B. FIG. 14A shows a top view (articulated) of the motor grader 100; FIG. 14A and FIG. 14B illustrate the computation of the heading angle of the front frame 101 in the System Configuration 3. The articulation joint 115-R is behind the cabin 102. In an embodiment, the articulation angle (angle of rotation about the articulation joint 115-R) is measured by the sensor 1022 installed on the articulation joint 115-R. In one embodiment, a potentiometric rotation sensor is used. Other types of sensors can be used.

Refer to FIG. 14B. The articulation angle, denoted as the angle $\psi_f^r$, is defined as the heading angle of the front frame 101 relative to the coordinate frame $O_r X_r Y_r Z_r$ 143. The articulation angle $\psi_f^r$ can be measured by the sensor 1022 installed on the articulation joint 115-R.

The heading angle $\psi_r$ of the rear frame 103 is defined as the heading angle of the coordinate frame $O_r X_r Y_r Z_r$ 143 relative to the coordinate frame $O_n X_n Y_n Z_n$ 144. The heading angle $\psi_r$ can be computed as the heading angle of the vector of GNSS velocity $\vec{V}_{GNSS}{}^n$, resolved in the local navigation frame; the heading angle $\psi_r$ can be computed from measurements obtained from the GNSS antenna 121.

The heading angle $\psi_f$ of the front frame 101 is computed as follows:

$$\psi_f = \psi_f^r + \psi_r. \tag{E25}$$

The algorithms for computation of the blade slope angle, used for blade slope angle control in the System Configuration 3, are the same as the respective algorithms used in the System Configuration 1. The algorithms related to computation of the blade side shift, used for blade side shift control in the System Configuration 3, are the same as the respective algorithms used in the System Configuration 1.

Figure 15A:
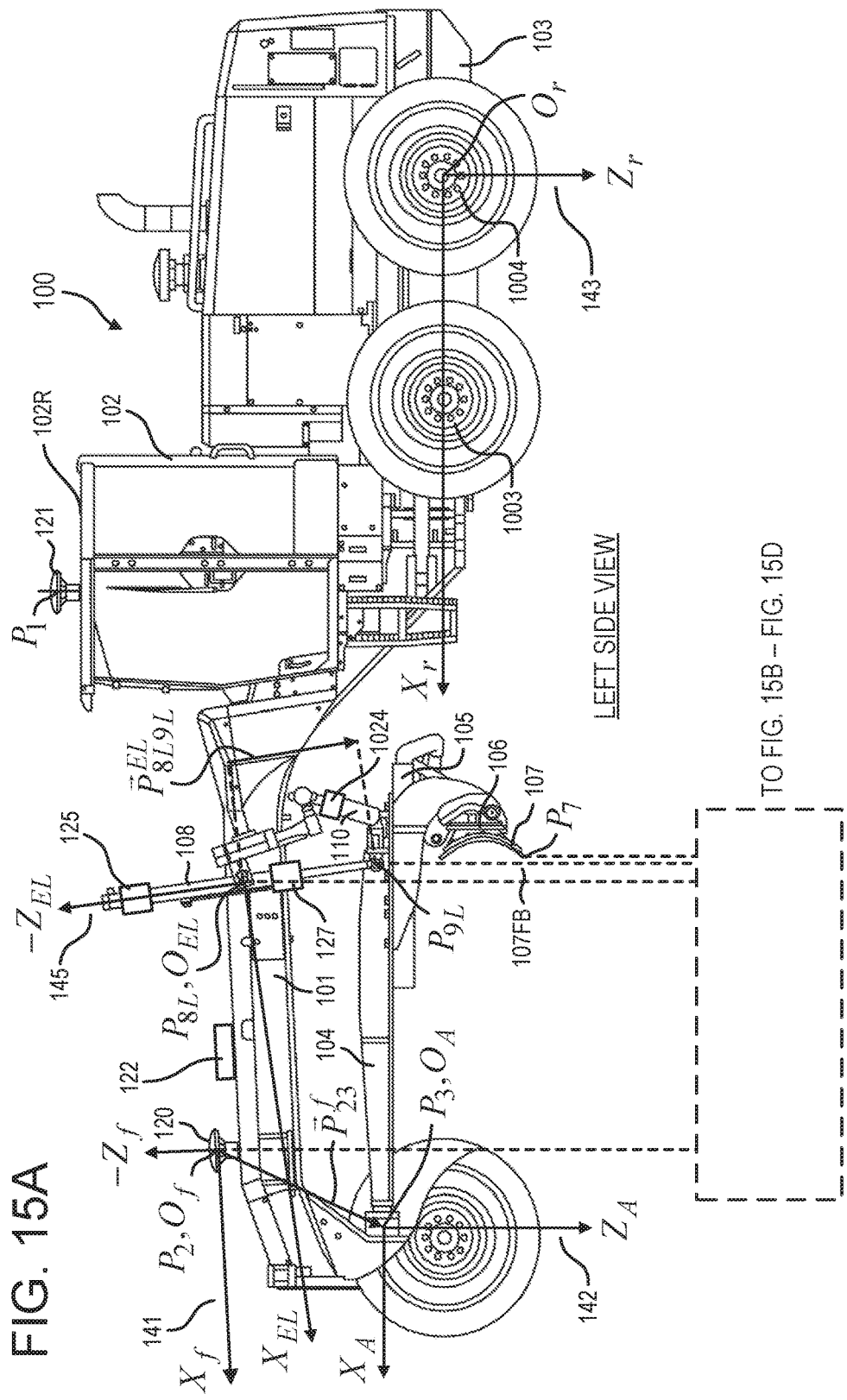
Figure 17:
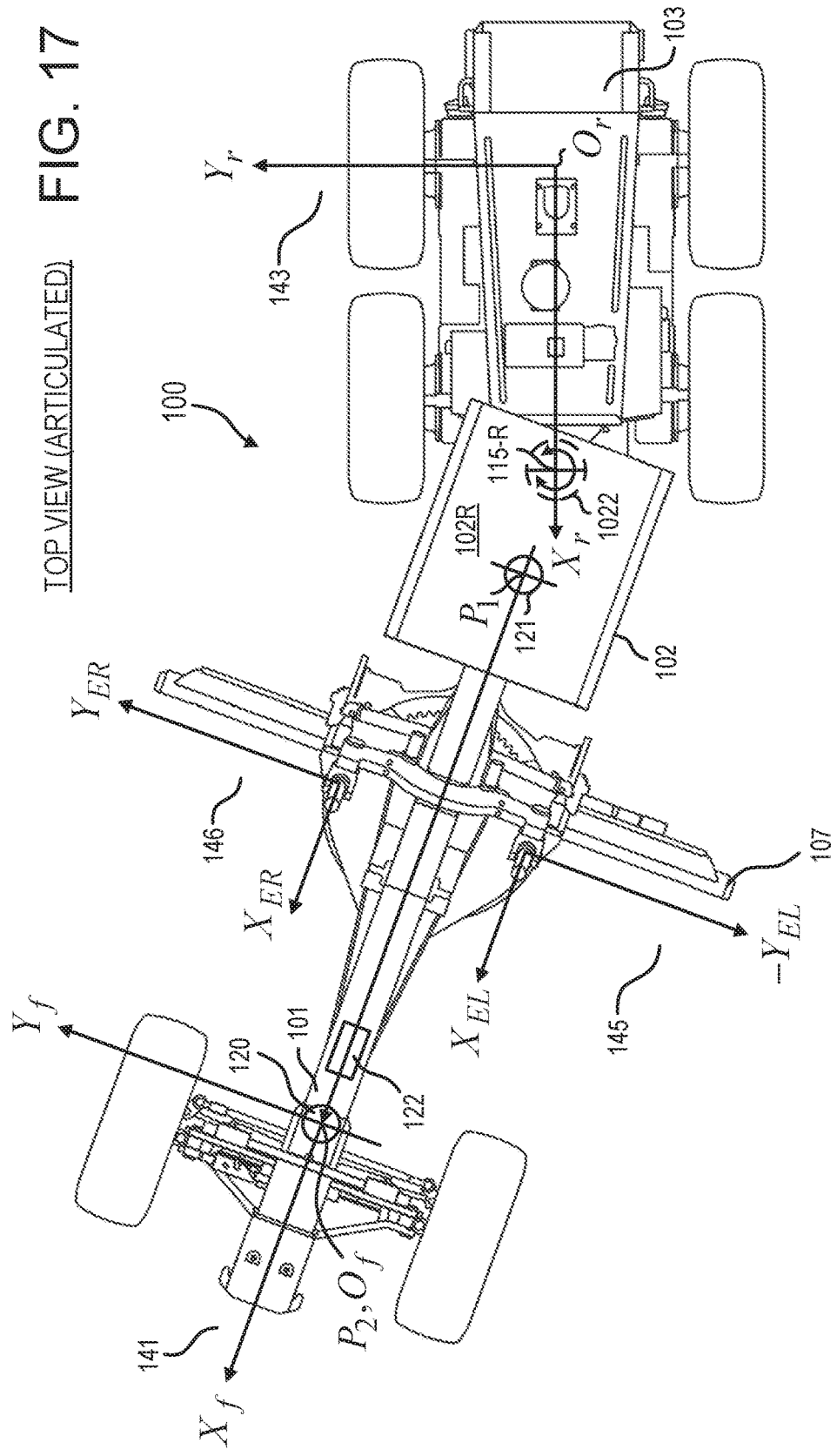
FIG. 17 shows a schematic view (top view) of the motor grader outfitted with sensors in the fourth system configuration.

System Configuration 4 is now described. Refer to FIG. 15A, FIG. 16A, and FIG. 17. FIG. 15A, FIG. 16A, and FIG. 17 show the motor grader 100 with sensors outfitted in the System Configuration 4. FIG. 15A shows a left side view; FIG. 16A shows a front view; and FIG. 17 shows a top view (articulated).

The GNSS antenna 120 is mounted on the top side of the front frame 101. The GNSS antenna 121 is mounted on the cabin roof top 102R. The Inertial Measurement Unit (IMU) 122 is mounted on the top side of the front frame 101. The IMU 125 is mounted on the left blade elevation hydraulic cylinder 108. The IMU 126 is mounted on the right blade elevation hydraulic cylinder 109. The stroke sensor 127 is installed on the left blade elevation hydraulic cylinder 108. The stroke sensor 128 is installed on the right blade elevation hydraulic cylinder 109. The rotation sensor 1020 is installed on the circle/A-frame swivel joint 1012.

The points $P_1$, $P_2$, $P_3$, $P_4$, and $P_7$ are defined in the same way as in the System Configuration 2. The center of the rotation joint that couples the left blade elevation hydraulic cylinder 108 to the front frame 101 is denoted as the point $P_{8L}$. The center of the rotation joint that couples the right blade elevation hydraulic cylinder 109 to the front frame 101 is denoted as the point $P_{8R}$. The center of the rotation joint that couples the extendable rod of the left blade elevation hydraulic cylinder 108 to the A-frame 104 is denoted as the point $P_{9L}$. The center of the rotation joint that couples the extendable rod of the right blade elevation hydraulic cylinder 109 to the A-frame 104 is denoted as the point $P_{9R}$. The vector $\vec{P}_{9L9R}$ is defined by the endpoint $P_{9L}$ and the endpoint $P_{9R}$. The midpoint of the vector $\vec{P}_{9L9R}$ is denoted as the point $P_9$.

The coordinate frame $O_f X_f Y_f Z_f$ 141 is defined in the same way as in the System Configuration 2. The coordinate frame $O_A X_A Y_A Z_A$ 142 is defined in the same way as in the System Configuration 2. The coordinate frame $O_r X_r Y_r Z_r$ 143 is defined in the same way as in the System Configuration 2.

Refer to FIG. 3E. The coordinate frame $O_{EL} X_{EL} Y_{EL} Z_{EL}$ 145 is a Cartesian coordinate frame fixed relative to the left blade elevation hydraulic cylinder 108. It is specified by the origin $O_{EL}$, X-axis $X_{EL}$, Y-axis $Y_{EL}$, and Z-axis $Z_{EL}$. (Note: This coordinate frame will generally be drawn showing the $-Y_{EL}$-axis and the $-Z_{EL}$-axis.) The origin $O_{EL}$ is fixed at the point $P_{8L}$. The $Z_{EL}$-axis is aligned with the longitudinal axis of symmetry of the left blade elevation hydraulic cylinder 108. When the A-frame 104 is aligned with the front frame 101, the $Y_{EL}$-axis is parallel to the $Y_f$-axis of the coordinate frame $O_f X_f Y_f Z_f$ 141 (see FIG. 17).

Refer to FIG. 3F. The coordinate frame $O_{ER} X_{ER} Y_{ER} Z_{ER}$ 146 is a Cartesian coordinate frame fixed relative to the right blade elevation hydraulic cylinder 109. It is specified by the origin $O_{ER}$, X-axis $X_{ER}$, Y-axis $Y_{ER}$, and Z-axis $Z_{ER}$. (Note: This coordinate frame will generally be drawn showing the $-Z_{EL}$-axis.) The origin $O_{ER}$ is fixed at the point $P_{8R}$. The $Z_{ER}$-axis is aligned with the longitudinal axis of symmetry of the right blade elevation hydraulic cylinder 109. When the A-frame 104 is aligned with the front frame 101, the $Y_{ER}$-axis is parallel to the $Y_f$-axis of the coordinate frame $O_f X_f Y_f Z_f$ 141 (see FIG. 17).

In one embodiment, the orientation of the coordinate frame $O_{EL} X_{EL} Y_{EL} Z_{EL}$ 145 relative to the coordinate frame $O_f X_f Y_f Z_f$ 141 is computed using measurements obtained from the IMU 122 and the IMU 125. Similarly, the orientation of the coordinate frame $O_{ER} X_{ER} Y_{ER} Z_{ER}$ 146 relative to the coordinate frame $O_f X_f Y_f Z_f$ 141 is computed using measurements obtained from the IMU 122 and the IMU 126.

Refer to FIG. 15B. The vector $\vec{P}_{28L}{}^f$, resolved in the coordinate frame $O_f X_f Y_f Z_f$ 141, represents the location of the point $P_{8L}$ relative to the origin $O_f$ of the coordinate frame $O_fX_fY_fZ_f$ 141. The vector $\vec{P}_{28L}{}^f$ is constant relative to the coordinate frame $O_fX_fY_fZ_f$ 141 and is measured during a calibration procedure.

Refer to FIG. 15A. The vector $\vec{P}_{8L9L}{}^{EL}$, resolved in the coordinate frame $O_{EL}X_{EL}Y_{EL}Z_{EL}$ 145, represents the location of the point $P_{9L}$ relative to the origin $O_{EL}$ of the coordinate frame $O_{EL}X_{EL}Y_{EL}Z_{EL}$ 145. Refer to FIG. 15B and FIG. 16C. The vector $\vec{P}_{8L9L}{}^f$ resolved in the coordinate frame $O_fX_fY_fZ_f$ 141, is computed as follows:

$$\vec{P}_{8L9L}{}^{EL} = R_{EL}{}^f \vec{P}_{8L9L}{}^{EL} \tag{E26}$$

where $R_{EL}{}^f$ represents the rotation matrix for coordinate transformation from the coordinate frame $O_{EL}X_{EL}Y_{EL}Z_{EL}$ 145 to the coordinate frame $O_fX_fY_fZ_f$ 141.

Refer to FIG. 15B. The vector $\vec{P}_{29L}{}^f$, resolved in the coordinate frame $O_fX_fY_fZ_f$ 141, represents the location of the point $P_{9L}$ relative to the origin $O_f$ of the coordinate frame $O_fX_fY_fZ_f$ 141. The vector $\vec{P}_{29L}{}^f$ is computed as follows:

$$\vec{P}_{29L}{}^f = \vec{P}_{28L}{}^f + \vec{P}_{8L9L}{}^f. \tag{E27}$$

The vector $\vec{P}_{28R}{}^f$ (not shown), resolved in the coordinate frame $O_fX_fY_fZ_f$ 141, represents the location of the point $P_{8R}$ relative to the origin $O_f$ of the coordinate frame $O_fX_fY_fZ_f$ 141. The vector $\vec{P}_{28R}{}^f$ is constant relative to the coordinate frame $O_fX_fY_fZ_f$ 141 and is measured during a calibration procedure.

The vector $\vec{P}_{8R9R}{}^{ER}$ (not shown), resolved in the coordinate frame $O_{ER}X_{ER}Y_{ER}Z_{ER}$ 146, represents the location of the point $P_{9R}$ relative to the origin $O_{ER}$ of the coordinate frame $O_{ER}X_{ER}Y_{ER}Z_{ER}$ 146. Refer to FIG. 16B. The vector $\vec{P}_{8R9R}{}^f$, resolved in the coordinate frame $O_fX_fY_fZ_f$ 141, is computed as follows:

$$\vec{P}_{8R9R}{}^f = R_{ER}{}^f \vec{P}_{8R9R}{}^{ER}, \tag{E28}$$

where $R_{ER}{}^f$ represents the rotation matrix for coordinate transformation from the coordinate frame $O_{ER}X_{ER}Y_{ER}Z_{ER}$ 146 to the coordinate frame $O_fX_fY_fZ_f$ 141.

The vector $\vec{P}_{29R}{}^f$ (not shown), resolved in the coordinate frame $O_fX_fY_fZ_f$ 141, represents the location of the point $P_{9R}$ relative to the origin $O_f$ of the coordinate frame $O_fX_fY_fZ_f$ 141. The vector $\vec{P}_{29R}{}^f$ is computed as follows:

$$\vec{P}_{29R}{}^f = \vec{P}_{28R}{}^f + \vec{P}_{8R9R}{}^f. \tag{E29}$$

Refer to FIG. 15A. As previously discussed for other system configurations, the vector $\vec{P}_{23}{}^f$, which represents the location of the point $P_3$ relative to the origin $O_f$ of the coordinate frame $O_fX_fY_fZ_f$ 141, is constant relative to the coordinate frame $O_fX_fY_fZ_f$ 141 and is measured during a calibration procedure.

Given a known set of vectors $\vec{P}_{23}{}^f$, $\vec{P}_{29L}{}^f$, and $\vec{P}_{29R}{}^f$, the locations of the points $P_3$, $P_{9L}$, and $P_{9R}$ are known relative to the origin $O_f$ of the coordinate frame $O_fX_fY_fZ_f$ 141. These three points uniquely define a plane in three-dimensional space; therefore, the orientation of the A-frame 104 relative to the front frame 101 is known; or, equivalently, the orientation of the coordinate frame $O_AX_AY_AZ_A$ 142 relative to the coordinate frame $O_fX_fY_fZ_f$ 141 is known. The coordinate transformation between the two coordinate frames can then be computed.

Refer to FIG. 16D and FIG. 16E. The vector $\vec{P}_{94}{}^A$, resolved in the coordinate frame $O_AX_AY_AZ_A$ 142, represents the location of the point $P_4$ relative to the point $P_9$. The vector $\vec{P}_{94}{}^A$ is constant relative to the coordinate frame $O_AX_AY_AZ_A$ 142 and is measured during a calibration procedure.

The vector $\vec{P}_{94}{}^f$, resolved in the coordinate frame $O_fX_fY_fZ_f$ 141, is computed as follows:

$$\vec{P}_{94}{}^f = R_A{}^f \vec{P}_{94}{}^A, \tag{E30}$$

where $R_A{}^f$ represents the rotation matrix for coordinate transformation from the coordinate frame $O_AX_AY_AZ_A$ 142 to the coordinate frame $O_fX_fY_fZ_f$ 141.

As previously discussed for other system configurations, the vector $\vec{P}_{47}{}^A$, resolved in the coordinate frame $O_AX_AY_AZ_A$ 142, represents the location of the point $P_7$, the midpoint of the cutting edge 107FB, relative to the origin $O_C$ of the coordinate frame $O_CX_CY_CZ_C$ 241. The computation of the vector $\vec{P}_{47}{}^A$ was described previously. The vector $\vec{P}_{47}{}^f$, resolved in the coordinate frame $O_fX_fY_fZ_f$ 141, is computed as follows:

$$\vec{P}_{47}{}^A = R_A{}^f \vec{P}_{47}{}^A, \tag{E31}$$

where $R_A{}^f$ represents the rotation matrix for coordinate transformation from the coordinate frame $O_AX_AY_AZ_A$ 142 to the coordinate frame $O_fX_fY_fZ_f$ 141.

Refer to FIG. 16C. The vector $\vec{P}_{97}{}^f$, resolved in the coordinate frame $O_fX_fY_fZ_f$ 141, represents the location of the point $P_7$ relative to the point $P_9$. The vector $\vec{P}_{97}{}^f$ is computed as follows:

$$\vec{P}_{97}{}^f = \vec{P}_{94}{}^f + \vec{P}_{47}{}^f. \tag{E32}$$

Refer to FIG. 15C. The vector $\vec{P}_{29}{}^f$, resolved in the coordinate frame $O_fX_fY_fZ_f$ 141, represents the location of the point $P_9$ relative to the origin $O_f$ of the coordinate frame $O_fX_fY_fZ_f$ 141. The vector $\vec{P}_{29}{}^f$ is computed as follows:

$$\vec{P}_{29}^{\,f} = \frac{\vec{P}_{29L}^{\,f} + \vec{P}_{29R}^{\,f}}{2}. \tag{E33}$$

The vector $\vec{P}_{27}{}^f$, resolved in the coordinate frame $O_fX_fY_fZ_f$ 141, represents the location of the point $P_7$ relative to the origin $O_f$ of the coordinate frame $O_fX_fY_fZ_f$ 141. The vector $\vec{P}_{27}{}^f$ is computed as follows:

$$\vec{P}_{27}{}^f = \vec{P}_{29}{}^f + \vec{P}_{97}{}^f. \tag{E34}$$

Refer to FIG. 15D. The vector $\vec{P}_{27}{}^n$, resolved in the coordinate frame $O_nX_nY_nZ_n$ 144, represents the location of the point $P_7$ relative to the origin $O_n$ of the coordinate frame $O_nX_nY_nZ_n$ 144. The vector $\vec{P}_{27}{}^n$ is computed as follows:

$$\vec{P}_{27}{}^n = R_f{}^n \vec{P}_{27}{}^n, \tag{E35}$$

where $R_f{}^n$ represents the rotation matrix for coordinate transformation from the coordinate frame $O_fX_fY_fZ_f$ 141 to the coordinate frame $O_nX_nY_nZ_n$ 144.

The location of the point $P_7$ relative to the origin $O_n$ of the coordinate frame $O_nX_nY_nZ_n$ 144 is represented by the vector $\vec{P}_7{}^n$. The vector $\vec{P}_7{}^n$ is computed as follows:

$$\vec{P}_7{}^n = \vec{P}_2{}^n + \vec{P}_{27}{}^n. \tag{E36}$$

The vector $\vec{P}_7{}^n$ can be used for blade elevation control.

The computation of the vector $\vec{P}_{7L7R}{}^C$, resolved in the coordinate frame $O_C X_C Y_C Z_C$ 241, representing the cutting edge 107FB of the blade 107, was described previously. The vector $\vec{P}_{7L7R}{}^n$, resolved in the coordinate frame $O_n X_n Y_n Z_n$ 144, is computed as follows:

$$\vec{P}_{7L7R}{}^n = R_f^n R_f^A R_A^C \vec{P}_{7L7R}{}^C, \tag{E37}$$

where:
- $R_C^A$ represents the rotation matrix for coordinate transformation from the coordinate frame $O_C X_C Y_C Z_C$ 241 to the coordinate frame $O_A X_A Y_A Z_A$ 142;
- $R_A^f$ represents the rotation matrix for coordinate transformation from the coordinate frame $O_A X_A Y_A Z_A$ 142 to the coordinate frame $O_f X_f Y_f Z_f$ 141; and
- $R_f^n$ represents the rotation matrix for coordinate transformation from the coordinate frame $O_f X_f Y_f Z_f$ 141 to the coordinate frame $O_n X_n Y_n Z_n$ 144.

The orientation of the vector $\hat{P}_{7L7R}{}^n$ in the coordinate frame $O_n X_n Y_n Z_n$ 144 is known; therefore, the roll angle (or, equivalently, the slope angle) of this vector (or, equivalently, of the cutting edge) can be used for blade slope angle control. The algorithms related to computation of the blade side shift, used for blade side shift control in the System Configuration 4, are the same as the respective algorithms used in the System Configuration 1.

Various combinations of the system configurations described above can be used in other embodiments. For example, the blade rotation sensor 1020, used in the System Configuration 4, can additionally be used in System Configurations 1-3 to allow for more robust measurements of the blade rotation angle.

Additional sensors can be used in all system configurations. For example, the stroke sensor 1024 installed on the drawbar hydraulic cylinder 110 can additionally be used to allow for more robust measurements of the heading angle of the A-frame 104 relative to the front frame 101.

For all the system configurations described above, the blade elevation, the blade slope angle, and the blade side shift can be controlled as follows. A schematic of an embodiment of a blade elevation control algorithm is shown in FIG. 18; a schematic of an embodiment of a blade slope angle control algorithm is shown in FIG. 19; and a schematic of an embodiment of a blade side shift control algorithm is shown in FIG. 20.

Figure 18:
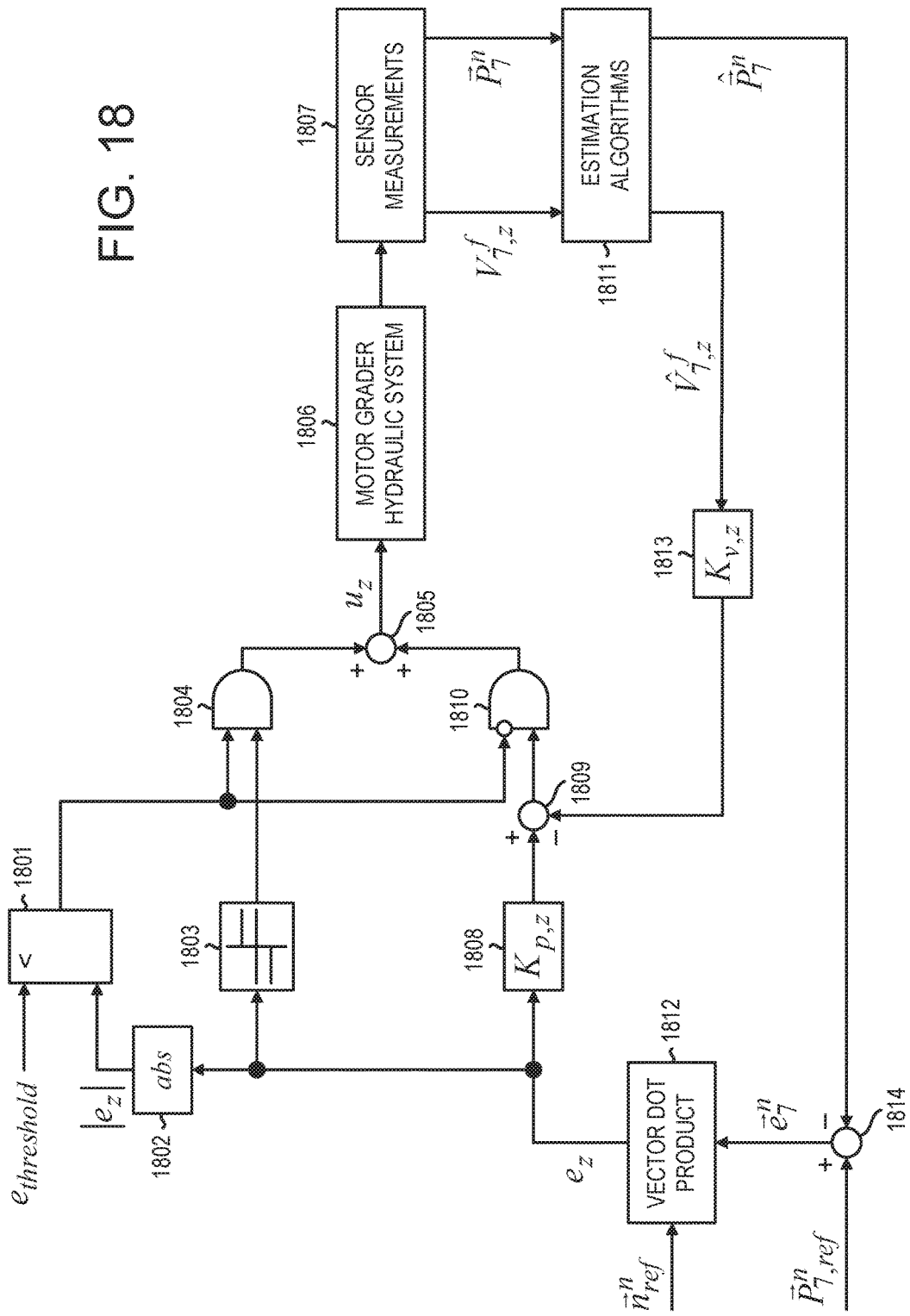
FIG. 18 shows a schematic of an embodiment of a blade elevation control algorithm.
Figure 19:
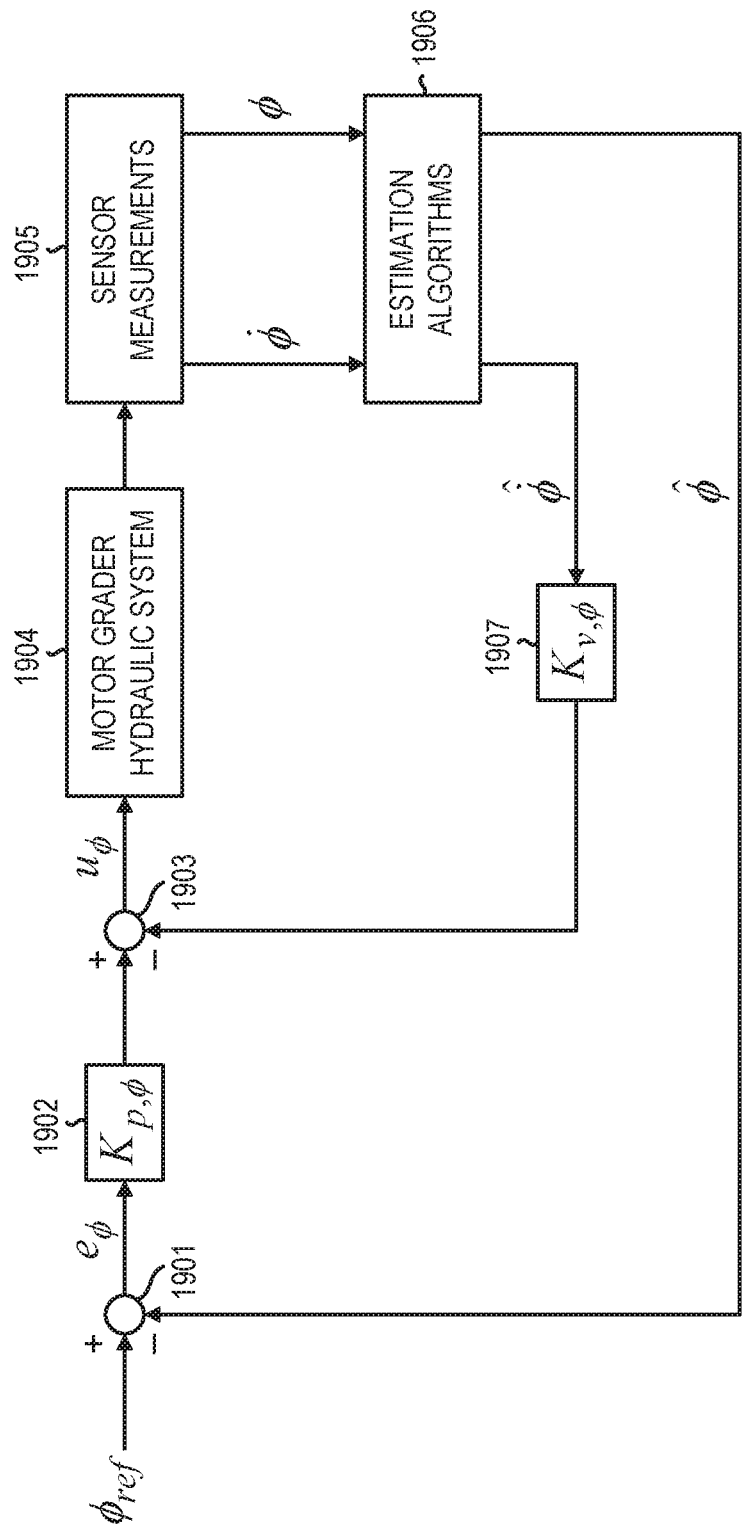
FIG. 19 shows a schematic of an embodiment of a blade slope angle control algorithm.
Figure 20:
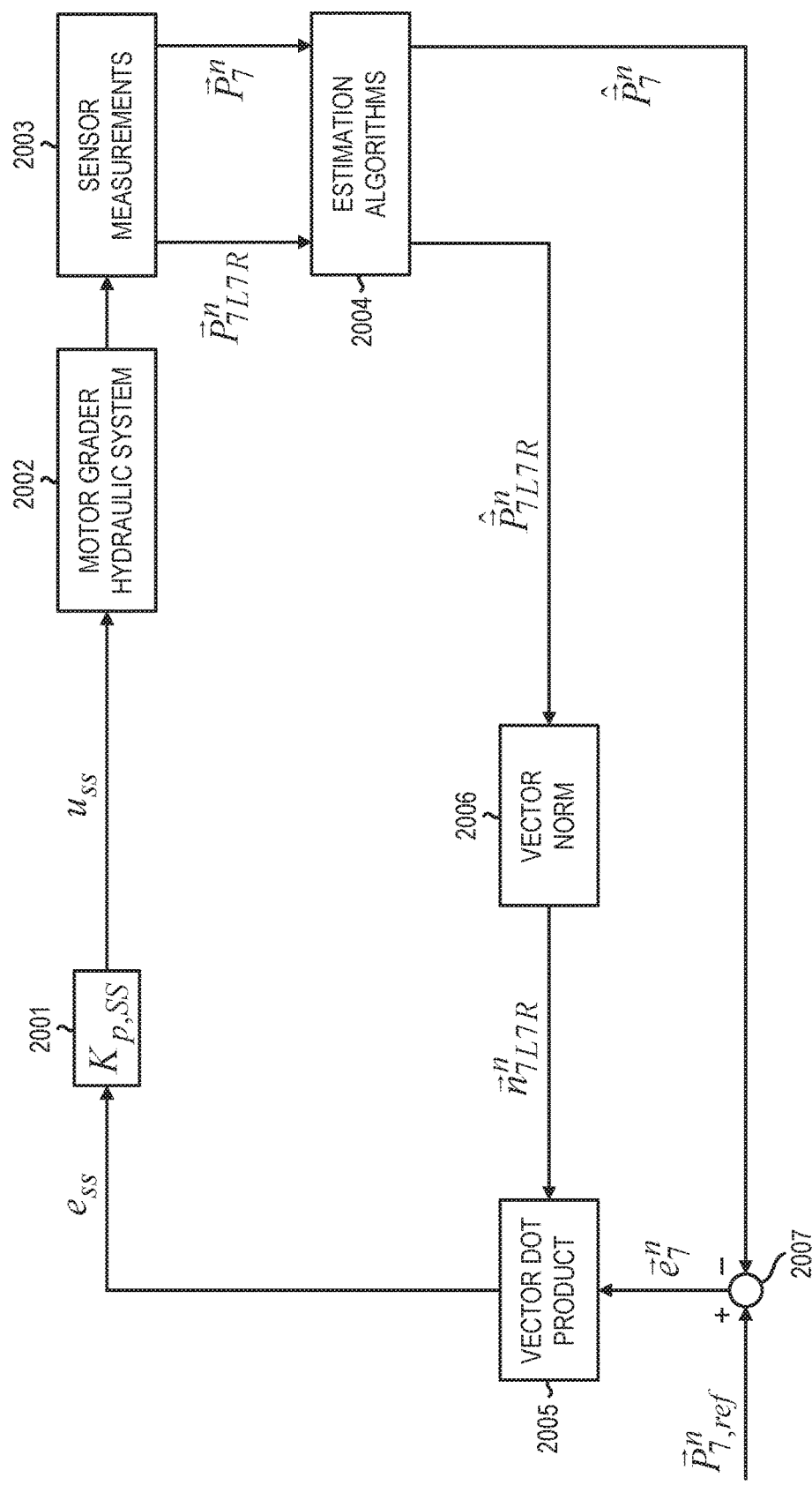
FIG. 20 shows a schematic of an embodiment of a blade side shift control algorithm.

In FIG. 18-FIG. 20, the following notation is used:
- $\vec{e}$ refers to control error vectors [a control error vector is the difference between the reference (or commanded) vector and the estimated vector].
- e refers to control errors [a control error is the difference between the reference (or commanded) value and the estimated value of a parameter].
- The value $\vec{e}_7$ refers to the control error vector in the position of the midpoint of the cutting edge.
- The value $e_z$ refers to the control error in blade elevation.
- The value $e_\phi$ refers to the control error in blade slope angle.
- The value $e_{SS}$ refers to the control error in blade side shift.
- K refers to control gains.
- The value $K_{p,z}$ refers to the proportional control gain for blade elevation.
- The value $K_{v,z}$ refers to the velocity control gain for blade elevation.
- The value $K_{p,\phi}$ refers to the proportional control gain for blade slope angle.
- The value $K_{v,\phi}$ refers to the velocity control gain for blade slope angle.
- The value $K_{p,SS}$ refers to the proportional control gain for blade side shift.
- u refers to control signals.
- The value $u_z$ refers to the control signal for blade elevation.
- The value $u_\phi$ refers to the control signal for blade slope angle.
- The value $u_{SS}$ refers to the control signal for blade side shift.

Refer to FIG. 18. FIG. 18 shows a schematic of an embodiment of a blade elevation control algorithm. The vector $\vec{P}_{7,ref}{}^n$ is the reference (desired) position vector of the midpoint of the cutting edge (also referred to herein as the blade position vector), resolved in the local navigation frame. The measured blade position vector $\vec{P}_7{}^n$, resolved in the local navigation frame, and the blade vertical velocity $V_{7,z}{}^f$, resolved in the front frame coordinate frame, are inputted into the estimation algorithms 1811. Various types of estimation algorithms well known in the art can be used; details are not described herein. The outputs of the estimation algorithms 1811 are the estimate of the blade position vector $\hat{\vec{P}}_7{}^n$ and the estimate of the blade vertical velocity $\hat{V}_{7,z}{}^f$. The value of $\hat{\vec{P}}_7{}^n$ is subtracted from $\vec{P}_{7,ref}{}^n$ (via the summation operator 1814) to yield the blade position error vector $\vec{e}_7{}^n$, resolved in the local navigation frame.

The vector $\vec{n}_{ref}{}^n$ is a unit vector normal to the local flat part of the design surface. The blade elevation error $e_z$ is computed as a dot product of the vectors $\vec{e}_7{}^n$ and $\vec{n}_{ref}{}^n$ by the operator 1812. The normal vector $\vec{n}_{ref}{}^n$ has a unit length; therefore, the dot product represents the projection of the blade position error vector $\vec{e}_7{}^n$ onto the normal vector $\vec{n}_{ref}{}^n$. Consequently, the result of the dot product is the blade position error in the direction normal to the local flat part of the design surface; that is, the blade elevation error.

The blade elevation error $e_z$ is multiplied by the proportional control gain $K_{p,z}$ 1808. The value $\hat{V}_{7,z}{}^f$ is multiplied by velocity control gain $K_{v,z}$ 1813. The value of $K_{v,z} \hat{V}_{7,z}{}^f$ is subtracted from the value of $K_{p,z} e_z$ by the summation operator 1809. The output of the summation operator 1809 is inputted into the AND operator 1810. The error $e_z$ is inputted into the relay element 1803, whose output is inputted to the AND operator 1804.

In an embodiment, two mutually-exclusive control modes (discussed below) can be used, depending on the value of $e_z$. The error $e_z$ is also inputted to the absolute value operator 1802, whose output value $|e_z|$ is compared to an error threshold $e_{threshold}$ (via the comparison operator 1801). The output of the comparison operator 1801 is inputted into the AND operator 1804, and its complement is inputted into the AND operator 1810. The outputs of the AND operator 1804 and the AND operator 1810 are added by the summation operator 1805, whose output, the control signal $u_z$, is inputted into the motor grader hydraulic system 1806, which controls the blade elevation.

If the absolute value of the error $|e_z|$ is greater than a specified error threshold $e_{threshold}$ a relay-type control 1803 is enabled. In this mode, the control signal switches between maximal values depending on the sign of the error. This mode is included in the controller to allow for fast high amplitude disturbance rejection. When the absolute value of the error is smaller than the threshold, a proportional-derivative (PD) control mode is enabled, and the relay mode is disabled. Use of PD control, rather than proportional control, takes advantage of the stabilizing effect of velocity feedback. The motor grader hydraulic system 1806 has a time delay associated with it, which, when a proportional controller is used, can result in blade instability and cause specific wave-like patterns on the ground after grading. Inclusion of velocity feedback in the controller helps to resolve this problem.

In other embodiments, other types of blade elevation control can be used.

Refer to FIG. 19. FIG. 19 shows a schematic of an embodiment of a blade slope angle control algorithm. In one embodiment, for the blade slope angle control algorithm, PD control is used. The value $\phi_{ref}$ is the reference (desired) value of the blade slope angle. The measured blade slope angle $\phi$ and blade slope angular velocity $\dot{\phi}$ are inputted into the estimation algorithms 1906. The outputs of the estimation algorithms 1906 are the estimate of the blade slope angle $\hat{\phi}$ and the estimate of blade slope angular velocity $\hat{\dot{\phi}}$. The value $\hat{\phi}$ is subtracted from the value $\phi_{ref}$ by the summation operator 1901 to yield the error $e_\phi$, which is multiplied by the proportional control gain $K_{p,\phi}$ 1902. The value $\hat{\dot{\phi}}$ is multiplied by the velocity control gain $K_{v,\phi}$ 1907. The value $K_{v,\phi}\hat{\dot{\phi}}$ is subtracted from the value $K_{p,\phi}e_\phi$ by the summation operator 1903 to yield the control signal $u_\phi$, which is inputted into the motor grader hydraulic system 1904.

In other embodiments, other types of blade slope angle control can be used.

Refer to FIG. 20. FIG. 20 shows an embodiment of a blade side shift control algorithm. Dynamic stability problems are usually not present in the motor grader blade side shift control; therefore, in one embodiment, a proportional type of control is sufficient for motor grader blade side shift control. The vector $\vec{P}_{7,ref}^{\,n}$ is the reference (desired) blade position vector, resolved in the local navigation frame. The measured blade position vector $\vec{P}_7^{\,n}$, resolved in the local navigation frame, is inputted into the estimation algorithms 2004. The measured vector $\vec{P}_{7L7R}^{\,n}$, which is the vector along the blade cutting edge, resolved in the local navigation frame, is also inputted into the estimation algorithms 2004. The outputs of the estimation algorithms 2004 are the estimates $\hat{\vec{P}}_7^{\,n}$ and $\hat{\vec{P}}_{7L7R}^{\,n}$. The vector $\hat{\vec{P}}_{7L7R}^{\,n}$ is normalized by the operator 2006 to yield the vector $\vec{n}_{7L7R}^{\,n}$, which has a unit length and is parallel to the blade cutting edge.

The value of $\hat{\vec{P}}_7^{\,n}$ is subtracted from $\vec{P}_{7,ref}^{\,n}$ (via the summation operator 2007) to yield the blade position error vector $\vec{e}_7^{\,n}$, resolved in the local navigation frame. The blade side shift error $e_{SS}$ is computed as a dot product of the vectors $\vec{e}_7^{\,n}$ and $\vec{n}_{7L7R}^{\,n}$ by the operator 2005. The vector $\vec{n}_{7L7R}^{\,n}$ has a unit length; therefore, the dot product represents the projection of the blade position error vector $\vec{e}_7^{\,n}$ onto the vector $\vec{n}_{7L7R}^{\,n}$. Consequently, the result of the dot product is the blade position error in the direction parallel to the cutting edge; that is, the blade side shift error. The error $e_{SS}$ is multiplied by the proportional control gain $K_{p,SS}$ 2001 to yield the control signal $u_{SS}$, which is inputted into the motor grader hydraulic system 2002.

In other embodiments, other types of blade side shift control can be used.

Hydraulic systems are well known in the art, and details are not described herein. The blade parameters are controlled by various hydraulic cylinders. In an embodiment, the control signals ($u_z$, $u_\phi$, and $u_{SS}$) are electrical signals that control electrically-controlled valves in the hydraulic system. The hydraulic system controls the displacements of the hydraulic cylinders.

Figure 21:
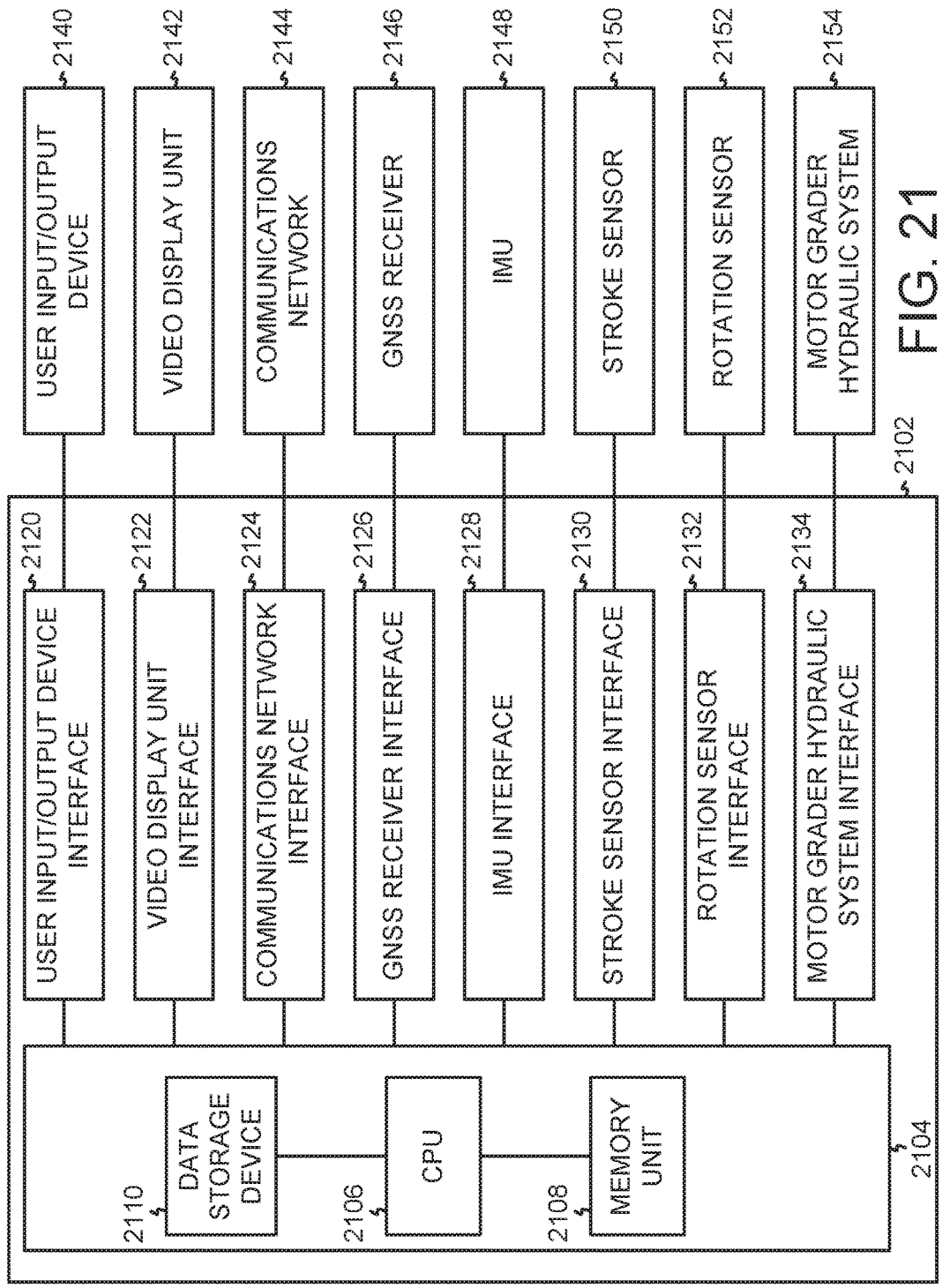
FIG. 21 shows a schematic of a first embodiment of a motor grader blade control system.

FIG. 21 shows one embodiment of the hardware architecture of a motor grader blade control system. The motor grader blade control system includes the computational system 2102. One skilled in the art can construct the computational system 2102 from various combinations of hardware, firmware, and software. One skilled in the art can construct the computational system 2102 from various electronic components, including one or more general purpose microprocessors, one or more digital signal processors, one or more application-specific integrated circuits (ASICs), and one or more field-programmable gate arrays (FPGAs).

The computational system 2102 includes the computer 2104, which includes at least one processor [central processing unit (CPU)] 2106, at least one memory unit 2108, and at least one data storage device 2110. The data storage device 2110 includes at least one persistent, non-transitory, tangible computer readable medium, such as non-volatile semiconductor memory, a magnetic hard drive, or a compact disc read only memory.

The computational system 2102 can further include at least one user input/output device interface 2120, which interfaces the computer 2104 to at least one user input/output device 2140. Examples of a user input/output device include a keyboard, a mouse, and a local access terminal. Data, including computer executable code, can be transferred to and from the computer 2104 via the at least one user input/output device interface 2120.

The computational system 2102 can further include at least one video display unit interface 2122, which interfaces the computer 2104 to at least one video display unit 2142.

The computational system 2102 can further include at least one communications network interface 2124, which interfaces the computer 2104 with at least one communications network 2144. Examples of a communications network include a local area network and a wide area network. A user can access the computer 2104 via a remote access terminal (not shown) communicating with a communications network. Data, including computer executable code, can be transferred to and from the computer 2104 via the at least one communications network interface 2124.

The computational system 2102 can further include at least one GNSS receiver interface 2126, which interfaces the computer 2104 with at least one GNSS receiver 2146. Each GNSS receiver is operably coupled to a corresponding GNSS antenna (not shown).

The computational system 2102 can further include at least one IMU interface 2128, which interfaces the computer 2104 with at least one IMU 2148.

The computational system 2102 can further include at least one stroke sensor interface 2130, which interfaces the computer 2104 with at least one stroke sensor 2150.

The computational system 2102 can further include at least one rotation sensor interface 2132, which interfaces the computer 2104 with at least one rotation sensor 2152.

The computational system 2102 can further include the motor grader hydraulic system interface 2134, which interfaces the computer 2104 with the motor grader hydraulic system 2154.

Each of the interfaces described above can operate over different physical media. Examples of physical media include wires, optical fibers, free-space optics, and electromagnetic waves (typically in the radiofrequency range and commonly referred to as a wireless interface).

As is well known, a computer operates under control of computer software, which defines the overall operation of the computer and applications. The CPU 2106 controls the overall operation of the computer and applications by executing computer program instructions that define the overall operation and applications. The computer program instructions can be stored in the data storage device 2110 and loaded into the memory unit 2108 when execution of the program instructions is desired. The automatic blade control algorithms shown schematically in FIG. 18-FIG. 20 can be defined by computer program instructions stored in the memory unit 2108 or in the data storage device 2110 (or in a combination of the memory unit 2108 and the data storage device 2110) and executed by the CPU 2106 executing the computer program instructions. For example, the computer program instructions can be implemented as computer executable code programmed by one skilled in the art to perform algorithms. Accordingly, by executing the computer program instructions, the CPU 2106 executes the automatic blade control algorithms shown schematically in FIG. 18-FIG. 20.

Figure 22:
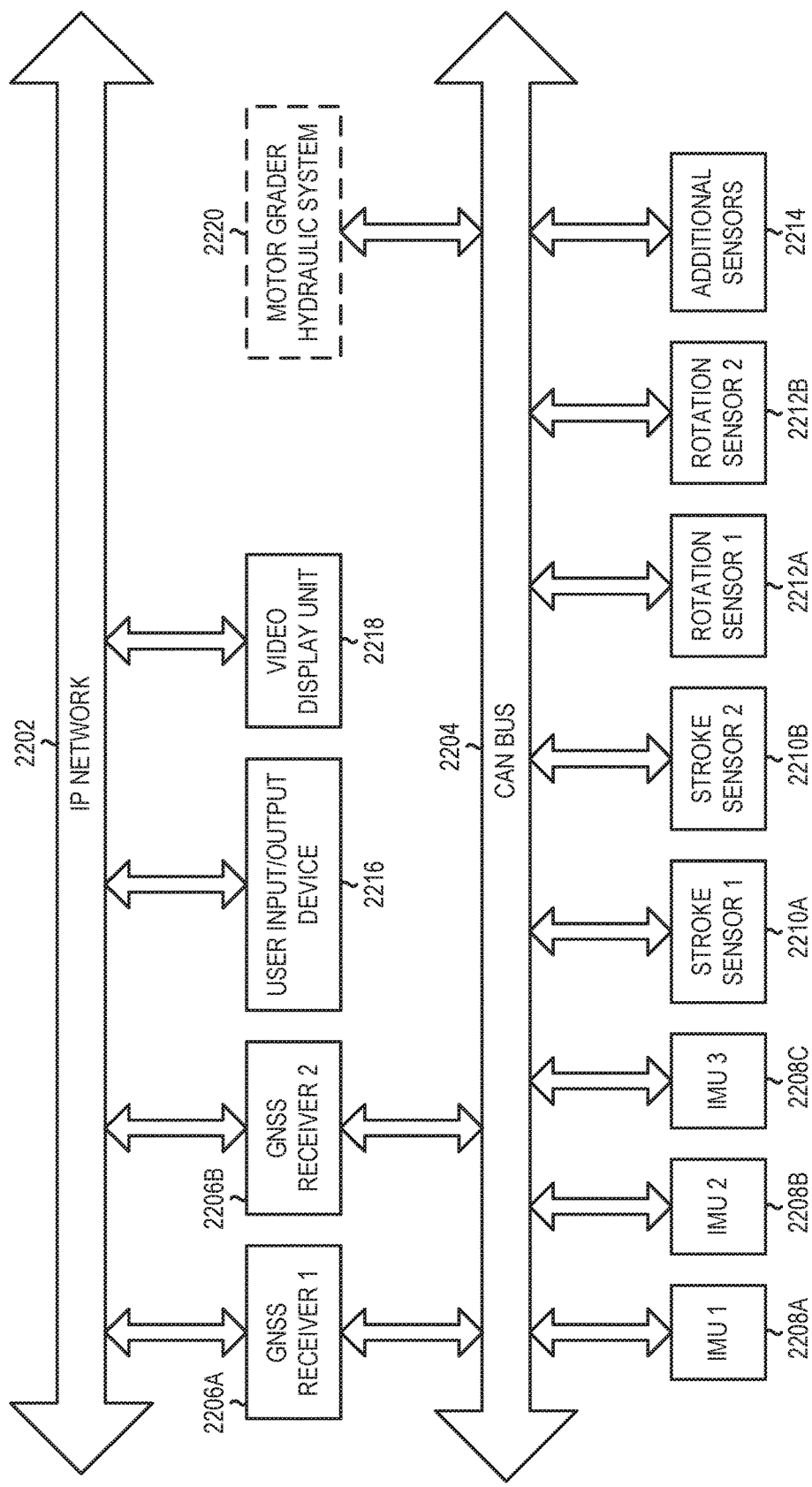
FIG. 22 shows a schematic of a second embodiment of a motor grader blade control system.

FIG. 22 shows another embodiment of the hardware architecture of a motor grader blade control system. The example shown includes:

Two GNSS receivers, referenced as the GNSS receiver 1 2206A and the GNSS receiver 2 2206B [Each GNSS receiver is operably coupled to a corresponding GNSS antenna (not shown).];

Three IMUs, referenced as the IMU 1 2208A, the IMU 2 2208B, and the IMU 3 2208C;

Two stroke sensors, referenced as the stroke sensor 1 2210A and the stroke sensor 2 2210B;

Two rotation sensors, referenced as the rotation sensor 1 2212A and the rotation sensor 2 2212B; and Additional sensors, collectively referenced as the additional sensors 2214.

In general, the number of GNSS receivers, the types of sensors (including IMUs), and the number of each type of sensor are design choices.

The motor grader blade control system uses two communications networks: the Internet Protocol (IP) network 2202 and the controller area network (CAN) bus 2204. The CAN bus was specifically designed for use in vehicles, including various types of construction machines, and is advantageously suited for communications with various devices installed at various locations on the motor grader and integrated into various parts of the motor grader. Examples of devices include sensor units, such as IMUs, stroke sensors, and rotation sensors.

A CAN bus interface is also available in hydraulic system driving units, which can be used for communications between the blade control system and the motor grader hydraulic system 2220. Using a CAN bus allows for making a blade control system, such as the blade control system described herein, an integral part of a motor grader. Using a CAN bus also allows for flexibility and scalability of the system configuration. A variable number of devices, such as different types of sensor units, can be used for communications via a CAN bus. Thus, this type of hardware architecture can be used for implementation of the different types of the blade control system configurations, described herein, that feature different sets of sensors.

In an embodiment, one or both of the GNSS receiver units can be used to execute the blade control system algorithms. GNSS receivers can feature complete computer architectures, including CPU units, memory units, and various types of communications interfaces, including IP network interfaces. Special purpose GNSS receivers are available that additionally have a CAN bus interface for use in various embedded applications. An IP network is an efficient means for communications between computers and is well suited for communications between GNSS receiver units, video display units, and user input/output devices. Video display units, designed for use in embedded applications, are available that feature complete computer architectures, including CPU units, memory units, and various types of communications interfaces, including IP network interfaces. A video display unit can be used to execute digital job site model algorithms that generate various types of reference values for the blade control system. Simultaneous use of two communications networks, such as an IP network and a CAN bus, allows for significant communications traffic reduction in both of the communications networks, thus providing for improved reliability of communications.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for controlling a blade of a motor grader, the method comprising the steps of:
  with each of at least one global navigation satellite system (GNSS) antenna, receiving GNSS navigation signals from a constellation of GNSS satellites, wherein:
    each of the at least one GNSS antenna is mounted on the motor grader;
    each of the at least one GNSS antenna is not mounted on the blade; and
    each of the at least one GNSS antenna is operably coupled to a corresponding GNSS receiver;
  with each GNSS receiver:
    processing the GNSS navigation signals received by the at least one GNSS antenna operably coupled to the GNSS receiver; and
    computing first measurements, wherein the first measurements comprise a position of the at least one GNSS antenna operably coupled to the GNSS receiver;
  with each of at least one inertial measurement unit, measuring second measurements, wherein:
    each of the at least one inertial measurement unit is mounted on the motor grader;
    each of the at least one inertial measurement unit has three corresponding orthogonal measurement axes; and
    the second measurements comprise:
      measurements of accelerations along the three orthogonal measurement axes; and
      measurements of angular rotation rates about the three orthogonal measurement axes; and with a stroke sensor installed on a blade side shift hydraulic cylinder of the motor grader, measuring third measurements comprising measurements of a blade side shift; and
with at least one processor:
  computing a blade position and a blade orientation, wherein the blade position and the blade orientation are based at least in part on the first measurements, the second measurements, and the third measurements;
  controlling a blade elevation and a blade slope angle, wherein the step of controlling the blade elevation and the blade slope angle is based at least in part on the computed blade position, the computed blade orientation, and a digital job site model; and
  controlling the blade side shift based at least in part on the computed blade position, the computed blade orientation, and the digital job site model.

2. The method of claim 1, wherein the at least one GNSS antenna comprises a GNSS antenna mounted on a front frame of the motor grader.

3. The method of claim 1, wherein the at least one GNSS antenna comprises a GNSS antenna mounted on a cabin roof top of the motor grader.

4. The method of claim 1, wherein the at least one GNSS antenna comprises:
  a first GNSS antenna mounted on a front frame of the motor grader; and
  a second GNSS antenna mounted on the front frame of the motor grader.

5. The method of claim 1, wherein the at least one GNSS antenna comprises:
  a first GNSS antenna mounted on a front frame of the motor grader; and
  a second GNSS antenna mounted on a cabin roof top of the motor grader.

6. The method of claim 1, wherein the at least one inertial measurement unit comprises an inertial measurement unit mounted on a front frame of the motor grader.

7. The method of claim 1, wherein the at least one inertial measurement unit comprises:
  a first inertial measurement unit mounted on a front frame of the motor grader; and
  a second inertial measurement unit mounted on an A-frame of the motor grader.

8. The method of claim 1, wherein the at least one inertial measurement unit comprises:
  a first inertial measurement unit mounted on a front frame of the motor grader;
  a second inertial measurement unit mounted on an A-frame of the motor grader; and
  a third inertial measurement unit mounted on a blade support structure of the motor grader.

9. The method of claim 1, wherein the at least one inertial measurement unit comprises:
  a first inertial measurement unit mounted on a front frame of the motor grader;
  a second inertial measurement unit mounted on a left blade elevation hydraulic cylinder of the motor grader; and
  a third inertial measurement unit mounted on a right blade elevation hydraulic cylinder of the motor grader.

10. The method of claim 1, wherein:
the at least one GNSS antenna comprises a GNSS antenna mounted on:
  a front frame of the motor grader; or
  a cabin roof top of the motor grader; and
the at least one inertial measurement unit comprises:
  a first inertial measurement unit mounted on the front frame of the motor grader;
  a second inertial measurement unit mounted on an A-frame of the motor grader; and
  a third inertial measurement unit mounted on a blade support structure of the motor grader.

11. The method of claim 10, wherein:
the at least one GNSS antenna comprises a GNSS antenna mounted on the cabin roof top of the motor grader;
the motor grader comprises an articulation joint in front of a cabin of the motor grader;
the method further comprises the step of:
  with a rotation sensor installed on the articulation joint, measuring fourth measurements, wherein the fourth measurements comprise measurements of an articulation angle; and
the blade position and the blade orientation are further based at least in part on the fourth measurements.

12. The method of claim 1, wherein:
the at least one GNSS antenna comprises:
  a first GNSS antenna mounted on a front frame of the motor grader; and
  a second GNSS antenna mounted on:
    the front frame of the motor grader; or
    a cabin roof top of the motor grader; and
the at least one inertial measurement unit comprises:
  a first inertial measurement unit mounted on the front frame of the motor grader;
  a second inertial measurement unit mounted on an A-frame of the motor grader; and
  a third inertial measurement unit mounted on a blade support structure of the motor grader.

13. The method of claim 1, wherein:
the at least one GNSS antenna comprises a GNSS antenna mounted on:
  a front frame of the motor grader; or
  a cabin roof top of the motor grader;
the at least one inertial measurement unit comprises:
  a first inertial measurement unit mounted on the front frame of the motor grader; and
  a second inertial measurement unit mounted on an A-frame of the motor grader;
the method further comprises the steps of:
  with a stroke sensor installed on a blade pitch rotation hydraulic cylinder of the motor grader, measuring fourth measurements, wherein the fourth measurements comprise measurements of a blade pitch rotation angle; and
  with a rotation sensor installed on a circle/A-frame swivel joint of the motor grader, measuring fifth measurements, wherein the fifth measurements comprise measurements of a blade rotation angle; and
the blade position and the blade orientation are further based at least in part on the fourth measurements and the fifth measurements.

14. The method of claim 13, wherein:
the at least one GNSS antenna comprises a GNSS antenna mounted on the cabin roof top of the motor grader;
the motor grader comprises an articulation joint in front of a cabin of the motor grader;
the method further comprises the step of:
  with a rotation sensor installed on the articulation joint, measuring sixth measurements, wherein the sixth measurements comprise measurements of an articulation angle; and the blade position and the blade orientation are further based at least in part on the sixth measurements.

15. The method of claim 1, wherein:
the at least one GNSS antenna comprises:
    a first GNSS antenna mounted on a front frame of the motor grader; and
    a second GNSS antenna mounted on:
        the front frame of the motor grader; or
        a cabin roof top of the motor grader;
the at least one inertial measurement unit comprises:
    a first inertial measurement unit mounted on the front frame of the motor grader; and
    a second inertial measurement unit mounted on an A-frame of the motor grader; and
the method further comprises the steps of:
    with a stroke sensor installed on a blade pitch rotation hydraulic cylinder of the motor grader, measuring fourth measurements, wherein the fourth measurements comprise measurements of a blade pitch rotation angle; and
    with a rotation sensor installed on a circle/A-frame swivel joint of the motor grader, measuring fifth measurements, wherein the fifth measurements comprise measurements of a blade rotation angle; and
the blade position and the blade orientation are further based at least in part on the fourth measurements and the fifth measurements.

16. The method of claim 1, wherein:
the at least one GNSS antenna comprises a GNSS antenna mounted on:
    a front frame of the motor grader; or
    a cabin roof top of the motor grader;
the at least one inertial measurement unit comprises:
    a first inertial measurement unit mounted on the front frame of the motor grader;
    a second inertial measurement unit mounted on a left blade elevation hydraulic cylinder of the motor grader; and
    a third inertial measurement unit mounted on a right blade elevation hydraulic cylinder of the motor grader;
the method further comprises the steps of:
    with a stroke sensor installed on a blade pitch rotation hydraulic cylinder of the motor grader, measuring fourth measurements, wherein the fourth measurements comprise measurements of a blade pitch rotation angle;
    with a rotation sensor installed on a circle/A-frame swivel joint of the motor grader, measuring fifth measurements, wherein the fifth measurements comprise measurements of a blade rotation angle;
    with a stroke sensor installed on the left blade elevation hydraulic cylinder, measuring sixth measurements, wherein the sixth measurements comprise measurements of a stroke of the left blade elevation hydraulic cylinder; and
    with a stroke sensor installed on the right blade elevation hydraulic cylinder, measuring seventh measurements, wherein the seventh measurements comprise measurements of a stroke of the right blade elevation hydraulic cylinder; and
the blade position and the blade orientation are further based at least in part on the fourth measurements, the fifth measurements, the sixth measurements, and the seventh measurements.

17. The method of claim 16, wherein:
the at least one GNSS antenna comprises a GNSS antenna mounted on the cabin roof top of the motor grader;
the motor grader comprises an articulation joint in front of a cabin of the motor grader;
the method further comprises the step of:
    with a rotation sensor installed on the articulation joint, measuring eighth measurements, wherein the eighth measurements comprise measurements of an articulation angle; and
the blade position and the blade orientation are further based at least in part on the eighth measurements.

18. The method of claim 1, wherein:
the at least one GNSS antenna comprises:
    a first GNSS antenna mounted on a front frame of the motor grader; and
    a second GNSS antenna mounted on:
        the front frame of the motor grader; or
        a cabin roof top of the motor grader;
the at least one inertial measurement unit comprises:
    a first inertial measurement unit mounted on the front frame of the motor grader;
    a second inertial measurement unit mounted on a left blade elevation hydraulic cylinder of the motor grader; and
    a third inertial measurement unit mounted on a right blade elevation hydraulic cylinder of the motor grader;
the method further comprises the steps of:
    with a stroke sensor installed on a blade pitch rotation hydraulic cylinder of the motor grader, measuring fourth measurements, wherein the fourth measurements comprise measurements of a blade pitch rotation angle;
    with a rotation sensor installed on a circle/A-frame swivel joint of the motor grader, measuring fifth measurements, wherein the fifth measurements comprise measurements of a blade rotation angle;
    with a stroke sensor installed on the left blade elevation hydraulic cylinder, measuring sixth measurements, wherein the sixth measurements comprise measurements of a stroke of the left blade elevation hydraulic cylinder; and
    with a stroke sensor installed on the right blade elevation hydraulic cylinder, measuring seventh measurements, wherein the seventh measurements comprise measurements of a stroke of the right blade elevation hydraulic cylinder; and
the blade position and the blade orientation are further based at least in part on the fourth measurements, the fifth measurements, the sixth measurements, and the seventh measurements.

19. The method of claim 1, wherein:
the at least one GNSS antenna comprises a GNSS antenna mounted on:
    a front frame of the motor grader; or
    a cabin roof top of the motor grader;
the at least one inertial measurement unit comprises an inertial measurement unit mounted on the front frame of the motor grader;
the method further comprises the steps of:
    with a stroke sensor installed on a blade pitch rotation hydraulic cylinder of the motor grader, measuring fourth measurements, wherein the fourth measurements comprise measurements of a blade pitch rotation angle;
    with a rotation sensor installed on a circle/A-frame swivel joint of the motor grader, measuring fifth measurements, wherein the fifth measurements comprise measurements of a blade rotation angle;

with a stroke sensor installed on a left blade elevation hydraulic cylinder of the motor grader, measuring sixth measurements, wherein the sixth measurements comprise measurements of a stroke of the left blade elevation hydraulic cylinder;

with a stroke sensor installed on a right blade elevation hydraulic cylinder of the motor grader, measuring seventh measurements, wherein the seventh measurements comprise measurements of a stroke of the right blade elevation hydraulic cylinder; and with a stroke sensor installed on a drawbar hydraulic cylinder of the motor grader, measuring eighth measurements, wherein the eighth measurements comprise measurements of a heading angle of an A-frame of the motor grader relative to the front frame of the motor grader; and the blade position and the blade orientation are further based at least in part on the fourth measurements, the fifth measurements, the sixth measurements, the seventh measurements, and the eighth measurements.

20. The method of claim 19, wherein:
the at least one GNSS antenna comprises a GNSS antenna mounted on the cabin roof top of the motor grader;
the motor grader comprises an articulation joint in front of a cabin of the motor grader;
the method further comprises the step of:
  with a rotation sensor installed on the articulation joint, measuring ninth measurements, wherein the ninth measurements comprise measurements of an articulation angle; and
the blade position and the blade orientation are further based at least in part on the ninth measurements.

21. The method of claim 1, wherein:
the at least one GNSS antenna comprises:
  a first GNSS antenna mounted on a front frame of the motor grader; and
  a second GNSS antenna mounted on:
    the front frame of the motor grader; or
    a cabin roof top of the motor grader;
the at least one inertial measurement unit comprises an inertial measurement unit mounted on the front frame of the motor grader;
the method further comprises the steps of:
  with a stroke sensor installed on a blade pitch rotation hydraulic cylinder of the motor grader, measuring fourth measurements, wherein the fourth measurements comprise measurements of a blade pitch rotation angle;
  with a rotation sensor installed on a circle/A-frame swivel joint of the motor grader, measuring fifth measurements, wherein the fifth measurements comprise measurements of a blade rotation angle;
  with a stroke sensor installed on a left blade elevation hydraulic cylinder of the motor grader, measuring sixth measurements, wherein the sixth measurements comprise measurements of a stroke of the left blade elevation hydraulic cylinder;
  with a stroke sensor installed on a right blade elevation hydraulic cylinder of the motor grader, measuring seventh measurements, wherein the seventh measurements comprise measurements of a stroke of the right blade elevation hydraulic cylinder; and
  with a stroke sensor installed on a drawbar hydraulic cylinder of the motor grader, measuring eighth measurements, wherein the eighth measurements comprise measurements of a heading angle of an A-frame of the motor grader relative to the front frame of the motor grader; and the blade position and the blade orientation are further based at least in part on the fourth measurements, the fifth measurements, the sixth measurements, the seventh measurements, and the eighth measurements.

22. A system for controlling a blade of a motor grader, the system comprising:
at least one global navigation satellite system (GNSS) antenna, wherein each of the at least one GNSS antenna:
  is mounted on the motor grader;
  is not mounted on the blade;
  is configured to receive GNSS navigation signals from a constellation of GNSS satellites; and
  is operably coupled to a corresponding GNSS receiver, wherein the GNSS receiver:
    is configured to process the GNSS navigation signals received by the at least one GNSS antenna operably coupled to the GNSS receiver; and
    is configured to compute first measurements, wherein the first measurements comprise a position of the at least one GNSS antenna operably coupled to the GNSS receiver;
at least one inertial measurement unit, wherein each of the at least one inertial measurement unit:
  is mounted on the motor grader;
  has three corresponding orthogonal measurement axes;
  is configured to measure second measurements, wherein the second measurements comprise:
    measurements of accelerations along the three orthogonal measurement axes; and
    measurements of angular rotation rates about the three orthogonal measurement axes; and
a stroke sensor installed on a blade side shift hydraulic cylinder of the motor grader, wherein the stroke sensor is configured to measure third measurements comprising measurements of a blade side shift; and
at least one processor configured to:
  compute a blade position and a blade orientation, wherein the blade position and the blade orientation are based at least in part on the first measurements, the second measurements, and the third measurements;
  control a blade elevation and a blade slope angle, wherein control of the blade elevation and the blade slope angle is based at least in part on the computed blade position, the computed blade orientation, and a digital job site model; and
  control the blade side shift at least in part on the computed blade position, the computed blade orientation, and the digital job site model.

23. The system of claim 22, wherein the at least one GNSS antenna comprises a GNSS antenna mounted on a front frame of the motor grader.

24. The system of claim 22, wherein the at least one GNSS antenna comprises a GNSS antenna mounted on a cabin roof top of the motor grader.

25. The system of claim 22, wherein the at least one GNSS antenna comprises:
a first GNSS antenna mounted on a front frame of the motor grader; and
a second GNSS antenna mounted on the front frame of the motor grader.

26. The system of claim 22, wherein the at least one GNSS antenna comprises:

a first GNSS antenna mounted on a front frame of the motor grader; and a second GNSS antenna mounted on a cabin roof top of the motor grader.

27. The system of claim 22, wherein the at least one inertial measurement unit comprises an inertial measurement unit mounted on a front frame of the motor grader.

28. The system of claim 22, wherein the at least one inertial measurement unit comprises:

a first inertial measurement unit mounted on a front frame of the motor grader; and a second inertial measurement unit mounted on an A-frame of the motor grader.

29. The system of claim 22, wherein the at least one inertial measurement unit comprises:

a first inertial measurement unit mounted on a front frame of the motor grader;

a second inertial measurement unit mounted on an A-frame of the motor grader; and a third inertial measurement unit mounted on a blade support structure of the motor grader.

30. The system of claim 22, wherein the at least one inertial measurement unit comprises:

a first inertial measurement unit mounted on a front frame of the motor grader;

a second inertial measurement unit mounted on a left blade elevation hydraulic cylinder of the motor grader; and a third inertial measurement unit mounted on a right blade elevation hydraulic cylinder of the motor grader.

31. The system of claim 22, wherein:

the at least one GNSS antenna comprises a GNSS antenna mounted on:
 a front frame of the motor grader; or
 a cabin roof top of the motor grader; and the at least one inertial measurement unit comprises:
 a first inertial measurement unit mounted on the front frame of the motor grader;
 a second inertial measurement unit mounted on an A-frame of the motor grader; and
 a third inertial measurement unit mounted on a blade support structure of the motor grader.

32. The system of claim 31, wherein:

the at least one GNSS antenna comprises a GNSS antenna mounted on the cabin roof top of the motor grader;

the motor grader comprises an articulation joint in front of a cabin of the motor grader;

the system further comprises a rotation sensor installed on the articulation joint;

the rotation sensor installed on the articulation joint is configured to measure fourth measurements, wherein the fourth measurements comprise measurements of an articulation angle; and the blade position and the blade orientation are further based at least in part on the fourth measurements.

33. The system of claim 22, wherein:

the at least one GNSS antenna comprises:
 a first GNSS antenna mounted on a front frame of the motor grader; and
 a second GNSS antenna mounted on:
  the front frame of the motor grader; or
  a cabin roof top of the motor grader; and the at least one inertial measurement unit comprises:
 a first inertial measurement unit mounted on the front frame of the motor grader; and
 a second inertial measurement unit mounted on an A-frame of the motor grader; and a third inertial measurement unit mounted on a blade support structure of the motor grader.

34. The system of claim 22, wherein:

the at least one GNSS antenna comprises a GNSS antenna mounted on:
 a front frame of the motor grader; or
 a cabin roof top of the motor grader;

the at least one inertial measurement unit comprises:
 a first inertial measurement unit mounted on the front frame of the motor grader; and
 a second inertial measurement unit mounted on an A-frame of the motor grader;

the system further comprises a stroke sensor installed on a blade pitch rotation hydraulic cylinder of the motor grader;

the stroke sensor installed on the blade pitch rotation hydraulic cylinder is configured to measure fourth measurements, wherein the fourth measurements comprise measurements of a blade pitch rotation angle;

the system further comprises a rotation sensor installed on a circle/A-frame swivel joint of the motor grader;

the rotation sensor installed on the circle/A-frame swivel joint is configured to measure fifth measurements, wherein the fifth measurements comprise measurements of a blade rotation angle; and the blade position and the blade orientation are further based at least in part on the fourth measurements and the fifth measurements.

35. The system of claim 34, wherein:

the at least one GNSS antenna comprises a GNSS antenna mounted on the cabin roof top of the motor grader;

the motor grader comprises an articulation joint in front of a cabin of the motor grader;

the system further comprises a rotation sensor installed on the articulation joint;

the rotation sensor installed on the articulation joint is configured to measure sixth measurements, wherein the sixth measurements comprise measurements of an articulation angle; and the blade position and the blade orientation are further based at least in part on the sixth measurements.

36. The system of claim 22, wherein:

the at least one GNSS antenna comprises:
 a first GNSS antenna mounted on a front frame of the motor grader; and
 a second GNSS antenna mounted on:
  the front frame of the motor grader; or
  a cabin roof top of the motor grader;

the at least one inertial measurement unit comprises:
 a first inertial measurement unit mounted on the front frame of the motor grader; and
 a second inertial measurement unit mounted on an A-frame of the motor grader;

the system further comprises a stroke sensor installed on a blade pitch rotation hydraulic cylinder of the motor grader;

the stroke sensor installed on the blade pitch rotation hydraulic cylinder is configured to measure fourth measurements, wherein the fourth measurements comprise measurements of a blade pitch rotation angle;

the system further comprises a rotation sensor installed on a circle/A-frame swivel joint of the motor grader;

the rotation sensor installed on the circle/A-frame swivel joint is configured to measure fifth measurements, wherein the fifth measurements comprise measurements of a blade rotation angle; and the blade position and the blade orientation are further based at least in part on the fourth measurements and the fifth measurements.

37. The system of claim 22, wherein:
the at least one GNSS antenna comprises a GNSS antenna mounted on:
   a front frame of the motor grader; or
   a cabin roof top of the motor grader;
the at least one inertial measurement unit comprises:
   a first inertial measurement unit mounted on the front frame of the motor grader;
   a second inertial measurement unit mounted on a left blade elevation hydraulic cylinder of the motor grader; and
   a third inertial measurement unit mounted on a right blade elevation hydraulic cylinder of the motor grader;
the system further comprises a stroke sensor installed on a blade pitch rotation hydraulic cylinder of the motor grader;
the stroke sensor installed on the blade pitch rotation hydraulic cylinder is configured to measure fourth measurements, wherein the fourth measurements comprise measurements of a blade pitch rotation angle;
the system further comprises a rotation sensor installed on a circle/A-frame swivel joint of the motor grader;
the rotation sensor installed on the circle/A-frame swivel joint is configured to measure fifth measurements, wherein the fifth measurements comprise measurements of a blade rotation angle;
the system further comprises a stroke sensor installed on the left blade elevation hydraulic cylinder;
the stroke sensor installed on the left blade elevation hydraulic cylinder is configured to measure sixth measurements, wherein the sixth measurements comprise measurements of a stroke of the left blade elevation hydraulic cylinder;
the system further comprises a stroke sensor installed on the right blade elevation hydraulic cylinder;
the stroke sensor installed on the right blade elevation hydraulic cylinder is configured to measure seventh measurements, wherein the seventh measurements comprise measurements of a stroke of the right blade elevation hydraulic cylinder; and
the blade position and the blade orientation are further based at least in part on the fourth measurements, the fifth measurements, the sixth measurements, and the seventh measurements.

38. The system of claim 37, wherein:
the at least one GNSS antenna comprises a GNSS antenna mounted on the cabin roof top of the motor grader;
the motor grader comprises an articulation joint in front of a cabin of the motor grader;
the system further comprises a rotation sensor installed on the articulation joint;
the rotation sensor installed on the articulation joint is configured to measure eighth measurements, wherein the eighth measurements comprise measurements of an articulation angle; and
the blade position and the blade orientation are further based at least in part on the eighth measurements.

39. The system of claim 22, wherein:
the at least one GNSS antenna comprises:
   a first GNSS antenna mounted on a front frame of the motor grader; and
   a second GNSS antenna mounted on:
      the front frame of the motor grader; or
      a cabin roof top of the motor grader;
the at least one inertial measurement unit comprises:
   a first inertial measurement unit mounted on the front frame of the motor grader;
   a second inertial measurement unit mounted on a left blade elevation hydraulic cylinder of the motor grader; and
   a third inertial measurement unit mounted on a right blade elevation hydraulic cylinder of the motor grader;
the system further comprises a stroke sensor installed on a blade pitch rotation hydraulic cylinder of the motor grader;
the stroke sensor installed on the blade pitch rotation hydraulic cylinder is configured to measure fourth measurements, wherein the fourth measurements comprise measurements of a blade pitch rotation angle;
the system further comprises a rotation sensor installed on a circle/A-frame swivel joint of the motor grader;
the rotation sensor installed on the circle/A-frame swivel joint is configured to measure fifth measurements, wherein the fifth measurements comprise measurements of a blade rotation angle;
the system further comprises a stroke sensor installed on the left blade elevation hydraulic cylinder;
the stroke sensor installed on the left blade elevation hydraulic cylinder is configured to measure sixth measurements, wherein the sixth measurements comprise measurements of a stroke of the left blade elevation hydraulic cylinder;
the system further comprises a stroke sensor installed on the right blade elevation hydraulic cylinder;
the stroke sensor installed on the right blade elevation hydraulic cylinder is configured to measure seventh measurements, wherein the seventh measurements comprise measurements of a stroke of the right blade elevation hydraulic cylinder; and
the blade position and the blade orientation are further based at least in part on the fourth measurements, the fifth measurements, the sixth measurements, and the seventh measurements.

40. The system of claim 22, wherein:
the at least one GNSS antenna comprises a GNSS antenna mounted on:
   a front frame of the motor grader; or
   a cabin roof top of the motor grader;
the at least one inertial measurement unit comprises an inertial measurement unit mounted on the front frame of the motor grader;
the system further comprises a stroke sensor installed on a blade pitch rotation hydraulic cylinder of the motor grader;
the stroke sensor installed on the blade pitch rotation hydraulic cylinder is configured to measure fourth measurements, wherein the fourth measurements comprise measurements of a blade pitch rotation angle;
the system further comprises a rotation sensor installed on a circle/A-frame swivel joint of the motor grader;
the rotation sensor installed on the circle/A-frame swivel joint is configured to measure fifth measurements, wherein the fifth measurements comprise measurements of a blade rotation angle;
the system further comprises a stroke sensor installed on a left blade elevation hydraulic cylinder of the motor grader;

the stroke sensor installed on the left blade elevation hydraulic cylinder is configured to measure sixth measurements, wherein the sixth measurements comprise measurements of a stroke of the left blade elevation hydraulic cylinder;

the system further comprises a stroke sensor installed on a right blade elevation hydraulic cylinder of the motor grader;

the stroke sensor installed on the right blade elevation hydraulic cylinder is configured to measure seventh measurements, wherein the seventh measurements comprise measurements of a stroke of the right blade elevation hydraulic cylinder;

the system further comprises a stroke sensor installed on a drawbar hydraulic cylinder of the motor grader;

the stroke sensor installed on the drawbar hydraulic cylinder is configured to measure eighth measurements, wherein the eighth measurements comprise measurements of a heading angle of an A-frame of the motor grader relative to the front frame of the motor grader; and the blade position and the blade orientation are further based at least in part on the fourth measurements, the fifth measurements, the sixth measurements, the seventh measurements, and the eighth measurements.

41. The system of claim 40, wherein:

the at least one GNSS antenna comprises a GNSS antenna mounted on the cabin roof top of the motor grader;

the motor grader comprises an articulation joint in front of a cabin of the motor grader;

the system further comprises a rotation sensor installed on the articulation joint;

the rotation sensor installed on the articulation joint is configured to measure ninth measurements, wherein the ninth measurements comprise measurements of an articulation angle; and the blade position and the blade orientation are further based at least in part on the ninth measurements.

42. The system of claim 22, wherein:

the at least one GNSS antenna comprises:
   a first GNSS antenna mounted on a front frame of the motor grader; and
   a second GNSS antenna mounted on:
      the front frame of the motor grader; or
      a cabin roof top of the motor grader;

the at least one inertial measurement unit comprises an inertial measurement unit mounted on the front frame of the motor grader;

the system further comprises a stroke sensor installed on a blade pitch rotation hydraulic cylinder of the motor grader;

the stroke sensor installed on the blade pitch rotation hydraulic cylinder is configured to measure fourth measurements, wherein the fourth measurements comprise measurements of a blade pitch rotation angle;

the system further comprises a rotation sensor installed on a circle/A-frame swivel joint of the motor grader;

the rotation sensor installed on the circle/A-frame swivel joint is configured to measure fifth measurements, wherein the fifth measurements comprise measurements of a blade rotation angle;

the system further comprises a stroke sensor installed on a left blade elevation hydraulic cylinder of the motor grader;

the stroke sensor installed on the left blade elevation hydraulic cylinder is further configured to measure sixth measurements, wherein the sixth measurements comprise measurements of a stroke of the left blade elevation hydraulic cylinder;

the system further comprises a stroke sensor installed on a right blade elevation hydraulic cylinder of the motor grader;

the stroke sensor installed on the right blade elevation hydraulic cylinder is configured to measure seventh measurements, wherein the seventh measurements comprise measurements of a stroke of the right blade elevation hydraulic cylinder;

the system further comprises a stroke sensor installed on a drawbar hydraulic cylinder of the motor grader;

the stroke sensor installed on the drawbar hydraulic cylinder is configured to measure eighth measurements, wherein the eighth measurements comprise measurements of a heading angle of an A-frame of the motor grader relative to the front frame of the motor grader; and the blade position and the blade orientation are further based at least in part on the fourth measurements, the fifth measurements, the sixth measurements, the seventh measurements, and the eighth measurements.

* * * * *

UNITED STATES PATENT AND TRADEMARK OFFICE
CERTIFICATE OF CORRECTION

PATENT NO. : 10,428,493 B2
APPLICATION NO. : 15/523543
DATED : October 1, 2019
INVENTOR(S) : Alexander Nikolaevich Omelchenko and Alexey Vladislavovich Zhdanov It is certified that error appears in the above-identified patent and that said Letters Patent is hereby corrected as shown below:

In the Specification

Column 12, Line 47, "SSrepresents" should read --SS represents--;

Column 12, Line 49, "SSis represented" should read --SS is represented--;

Column 12, Line 51, "SSis measured" should read --SS is measured--;

Column 14, Line 51, " $\vec{P}_{45}^{b}$ " should read -- $\vec{P}_{56}^{b}$ --;

Column 15, Line 35, " $\vec{P}_{47}^{C} = R_C^A \vec{P}_{47}^{C}$ " should read -- $\vec{P}_{47}^{A} = R_C^A \vec{P}_{47}^{C}$ --;

Column 25, Line 9, " $\vec{P}_{7L7R}^{n} = R_f^n R_A^f R_C^A \vec{P}_{7L7R}^{C}$ " should read -- $\vec{P}_{7L7R}^{n} = R_f^n R_A^f R_C^A \vec{P}_{7L7R}^{C}$ --;

Column 27, Lines 17-27, " $\dot{\phi}$ " should read -- $\dot{\phi}$ --.

Signed and Sealed this
Twenty-eighth Day of January, 2020

Andrei Iancu
*Director of the United States Patent and Trademark Office*